United States Patent [19]

Hara et al.

[11] Patent Number: 6,046,790
[45] Date of Patent: Apr. 4, 2000

[54] LCD DEVICE HAVING RELATIONSHIP BETWEEN SPONTANEOUS POLARIZATION AND CAPACITANCE

[75] Inventors: Yujiro Hara; Hisao Fujiwara, both of Yokohama; Takeshi Yamaguchi, Machida; Goh Itoh, Yokohama; Masahiko Akiyama, Tokyo; Haruhiko Okumura, Fujisawa, all of Japan

[73] Assignee: Kabushiki Kaisha Toshiba, Kawasaki, Japan

[21] Appl. No.: 09/272,335

[22] Filed: Mar. 19, 1999

[30] Foreign Application Priority Data

Mar. 20, 1998 [JP] Japan .................................... 10-072918
Mar. 17, 1999 [JP] Japan .................................... 11-072802

[51] Int. Cl.[7] .............................. G02F 1/13; G02F 1/133; G02F 1/1343
[52] U.S. Cl. .............................. 349/172; 349/33; 349/38; 349/174
[58] Field of Search ................................ 349/38, 33, 139, 349/172, 179, 133; 395/97

[56] References Cited

U.S. PATENT DOCUMENTS

| 5,251,050 | 10/1993 | Kurematsu et al. | 349/172 |
| 5,396,352 | 3/1995 | Kaneko et al. | 349/173 |
| 5,598,284 | 1/1997 | Kogushi et al. | 349/33 |
| 5,764,327 | 6/1998 | Hanyu et al. | 349/133 |
| 5,831,705 | 11/1998 | Kaneko et al. | 349/133 |

FOREIGN PATENT DOCUMENTS 10-133176  5/1998  Japan .

OTHER PUBLICATIONS

Norio Yamamoto, et al., Ferroelectrics, vol. 149, pp. 295–304, "Full–Color Antiferroelectric Liquid Crystal Display", 1993.

J. Fünfschilling, et al., J. Appl. Phys., vol. 66, No. 8, pp. 3877–3882, "Fast Responding and Highly Multiplexible Distorted Helix Ferroelectric Liquid–Crystal Displays", Oct. 15, 1989.

Jürg Fünfschilling, et al., Jpn. J. Appl. Phys., vol. 33, No. 9A, pp. 4950–4959, "Physics and Electronic Model of Deformed Helix Ferroelectric Liquid Crystal Displays", Sep. 1994.

*Primary Examiner*—William L. Sikes
*Assistant Examiner*—Toan Ton
*Attorney, Agent, or Firm*—Oblon, Spivak, McClelland, Maier & Neustadt, P.C.

[57] ABSTRACT

A liquid crystal display device is constituted so that liquid crystal having an inherent spontaneous polarization or a spontaneous polarization induced by applying an electric field is interposed between a pixel electrode disposed in matrix and a counter electrode, and a display signal is applied to the pixel electrode through a switching element. In the liquid crystal display device constituted mentioned above, when an electrostatic capacitance of one pixel is $C_{LC}$ (F), a spontaneous polarization per unit electrode area of the liquid crystal is $P_s$ (C/m$^2$), a voltage applied between the pixel electrode and the counter electrode is $E$ (V), a pixel electrode area of one pixel is $A$ (m$^2$), and a storage capacitance for one pixel is $C_s$ (F), they satisfy the following equation;

$$P_s \times A \leq 5 \times (C_s + C_{LC}) \times E \tag{1}$$

Thereby, a display of high contrast and high response speed can be obtained. Further, a display of low power consumption and excellent display uniformity, that is, excellent image quality can be obtained.

20 Claims, 25 Drawing Sheets

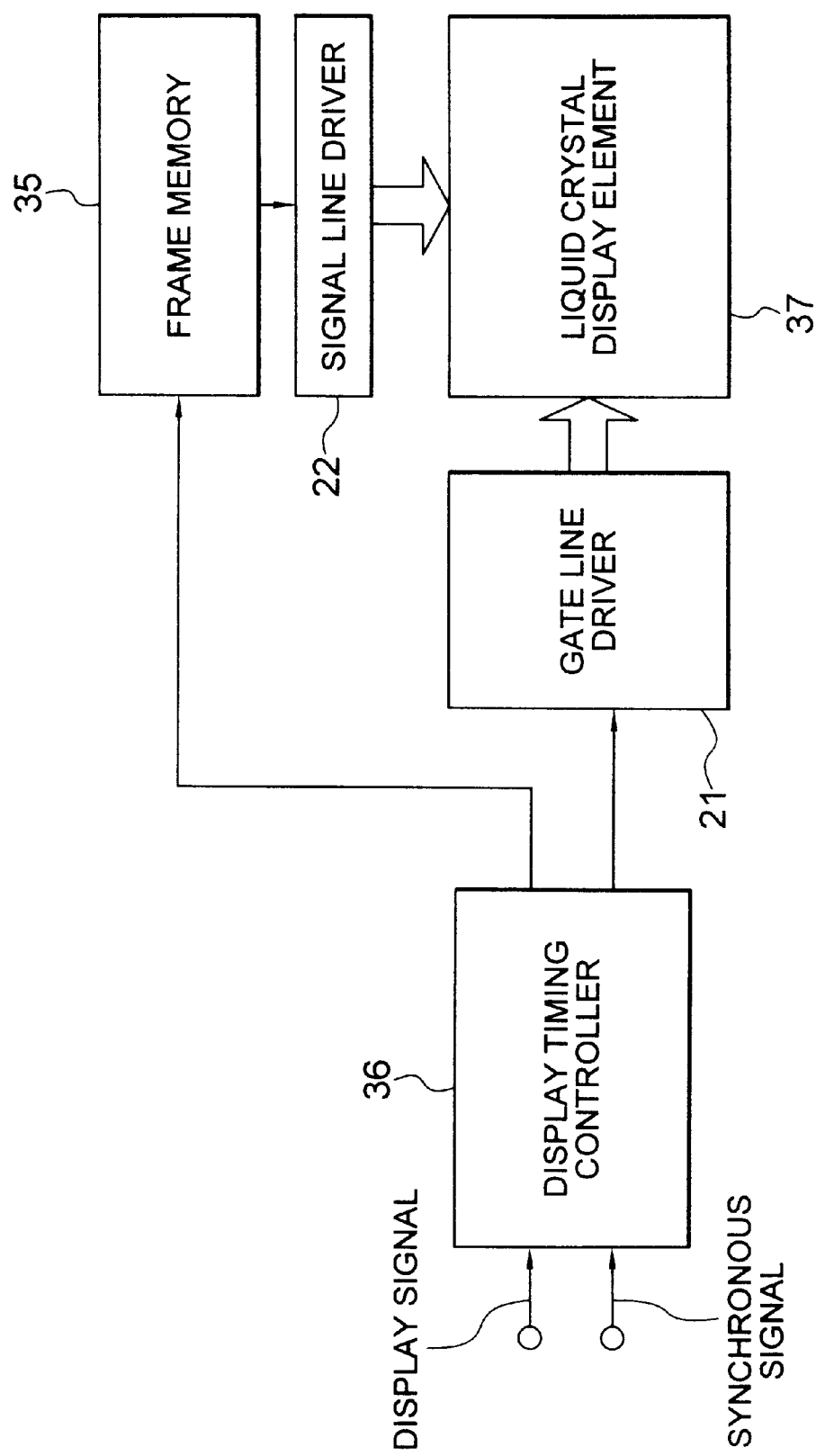

FIG. 12
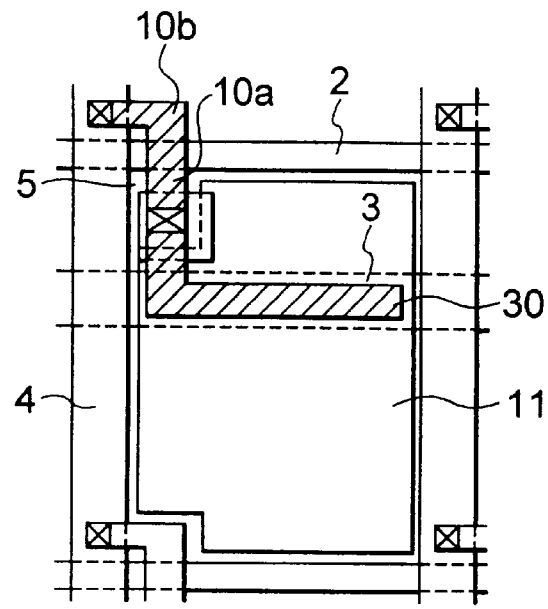
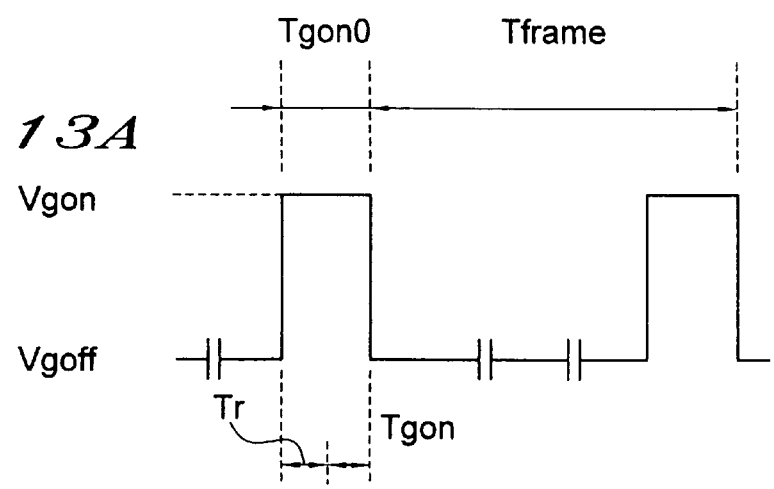
FIG. 13A
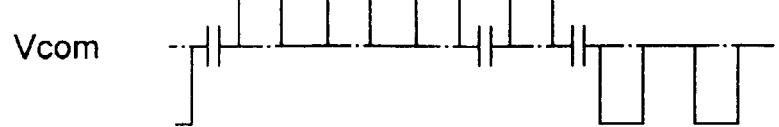
FIG. 13B

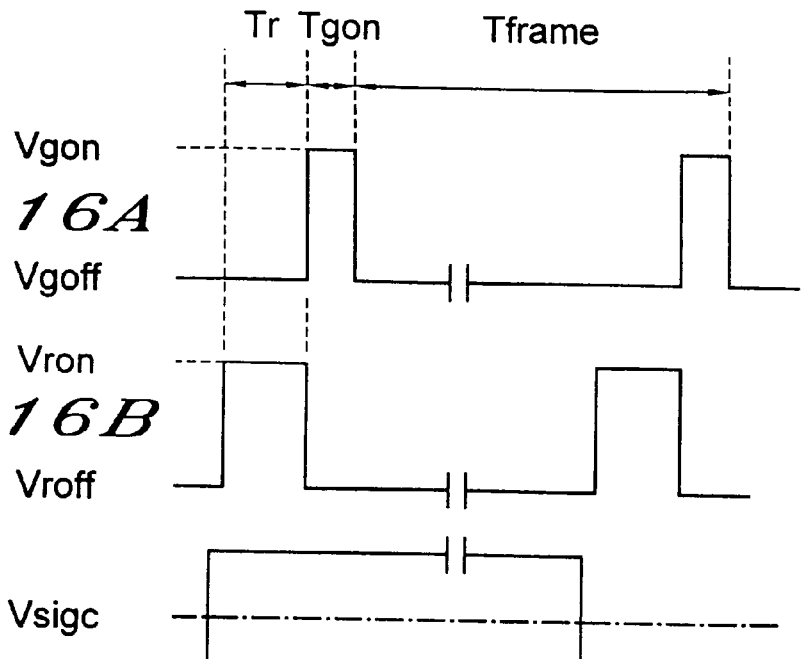
FIG. 16A
FIG. 16B
FIG. 16C
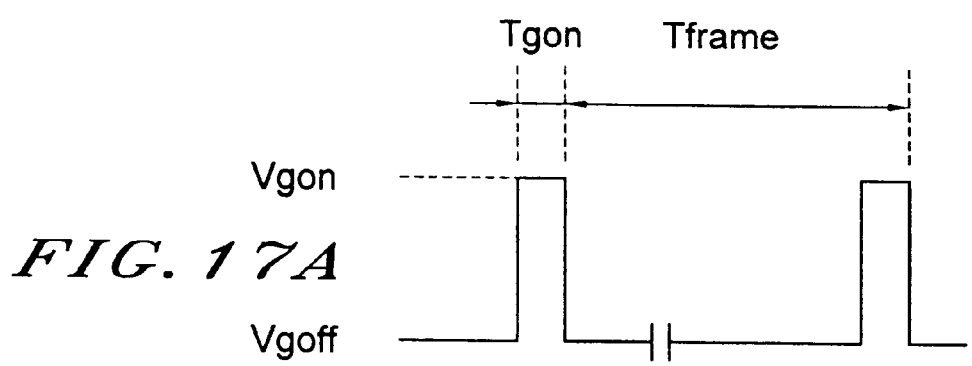
FIG. 17A
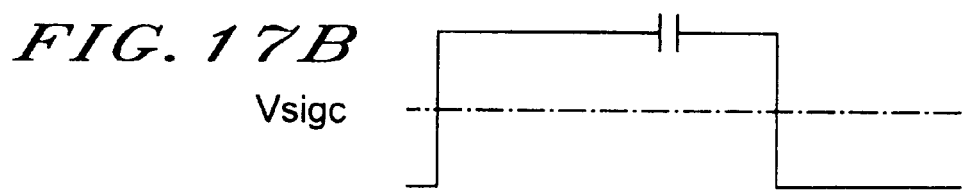
FIG. 17B

FIG. 20
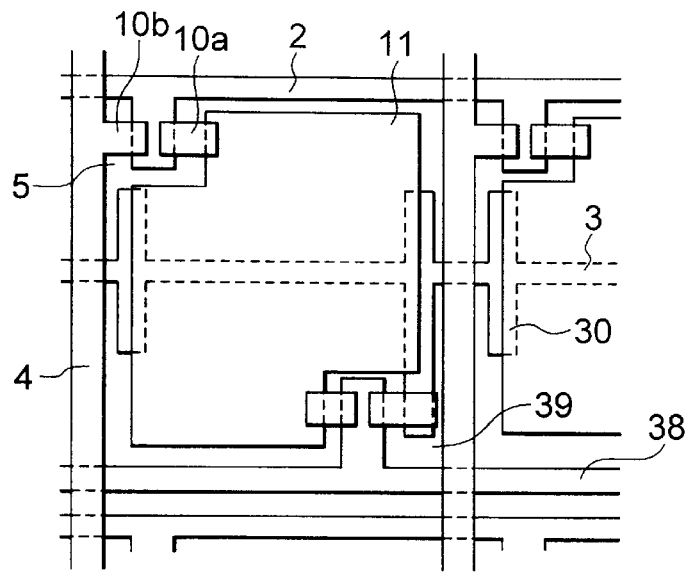
FIG. 21
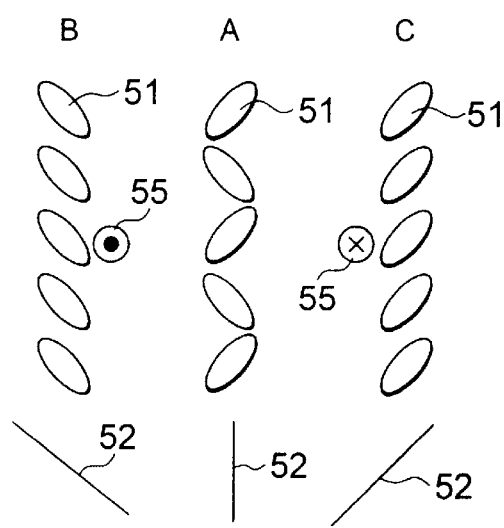
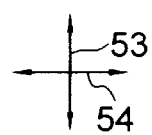

FIG. 24
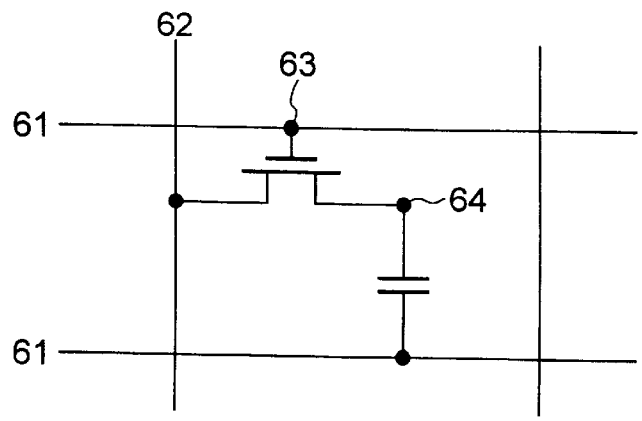
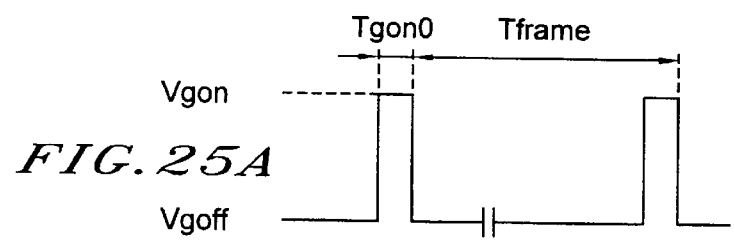
FIG. 25A
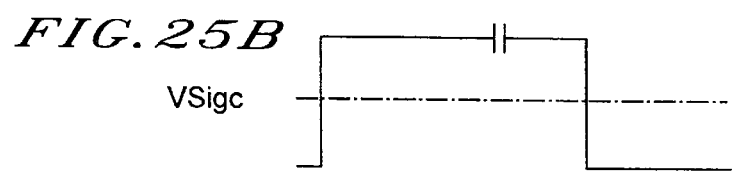
FIG. 25B
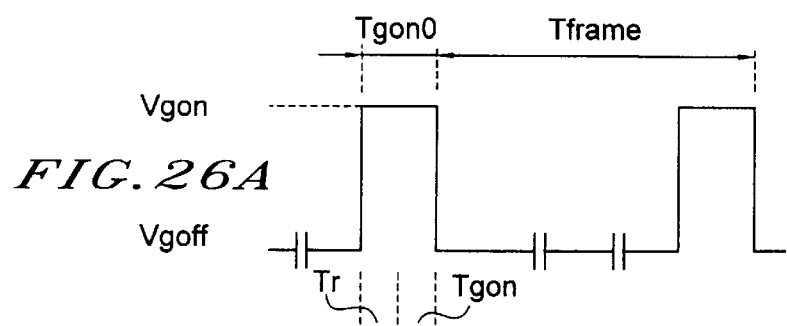
FIG. 26A
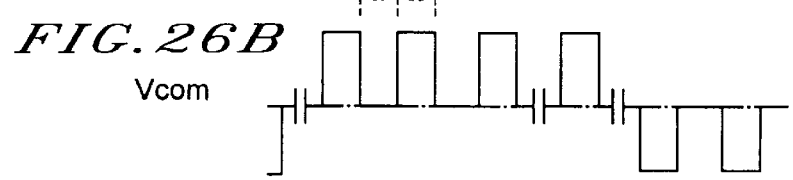
FIG. 26B

FIG. 27
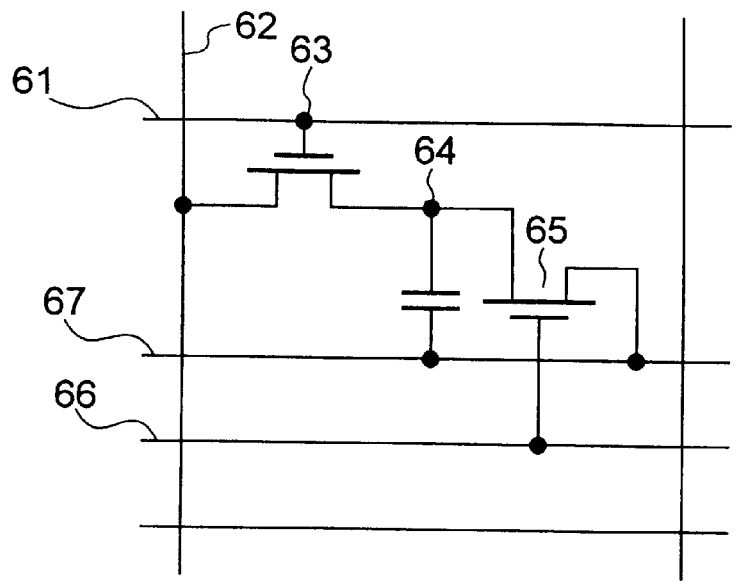
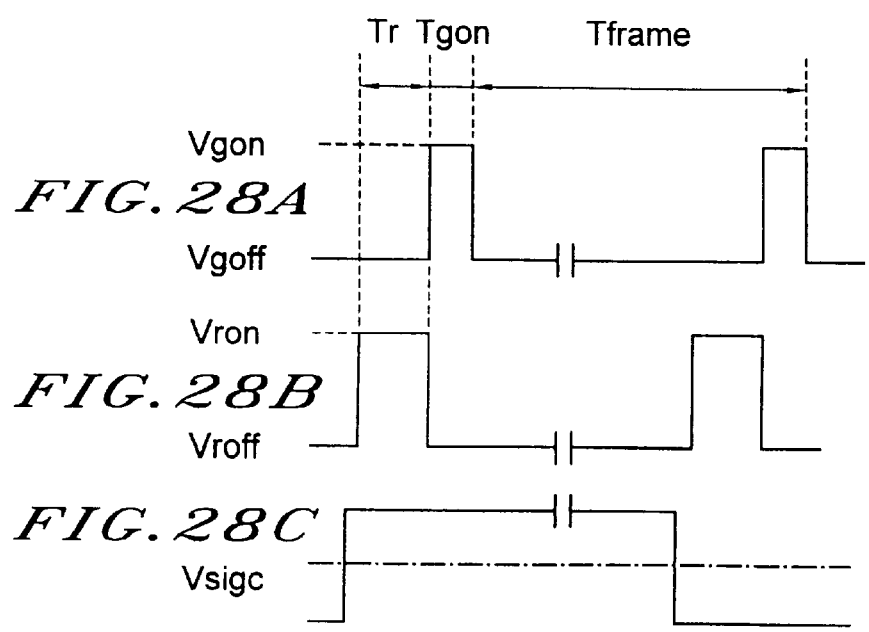
FIG. 28A
FIG. 28B
FIG. 28C

*FIG. 29A*
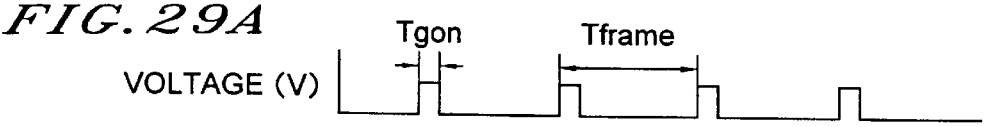
*FIG. 29B*
*FIG. 29C*
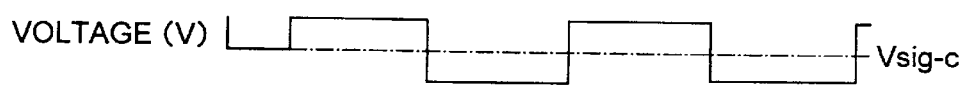
*FIG. 29D*
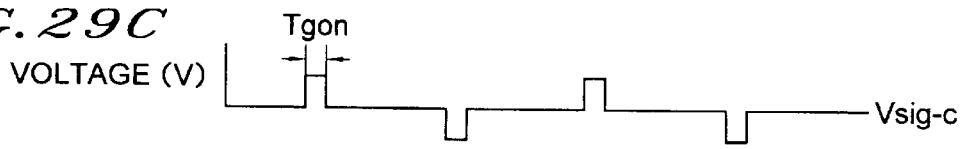
*FIG. 29E*
*FIG. 29F*
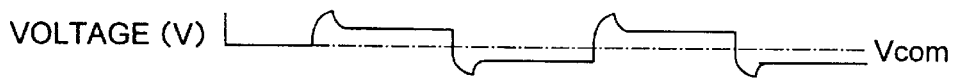
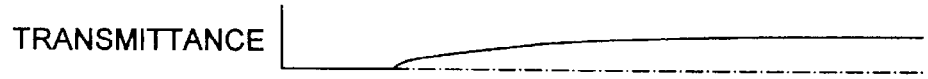
*FIG. 29G*
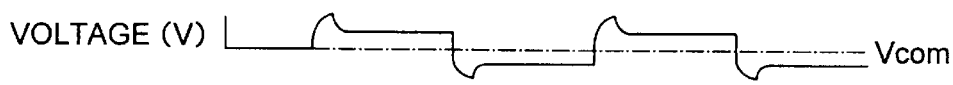
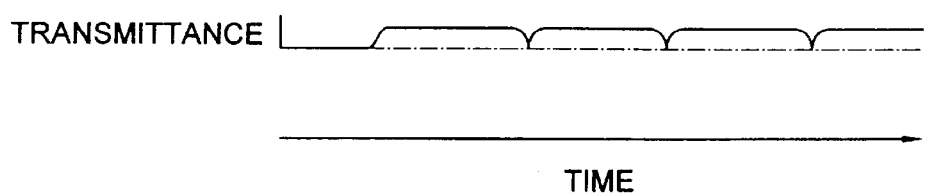
TIME

VOLTAGE (V)

VOLTAGE (V)

Vsig-c

VOLTAGE (V)

Vcom

TRANSMITTANCE

TIME

LCD DEVICE HAVING RELATIONSHIP BETWEEN SPONTANEOUS POLARIZATION AND CAPACITANCE

BACKGROUND OF THE INVENTION

1. Field of the Invention

The present invention relates to a liquid crystal display device, in particular, relates to a liquid crystal display device having liquid crystal and a switching element, the liquid crystal having an inherent spontaneous polarization or a spontaneous polarization induced by application of an electric field.

2. Description of Related Art

The liquid crystal display devices (LCD) are characterized in low power consumption, lightweight or the like. Because of these characteristics, they have been used for display devices of such as note type personal computers, portable display terminals or the like. So far, liquid crystal display devices of TFT-TN scheme that have thin film transistors (TFTs) which use amorphous silicon (a-Si) as switching element, and employ nematic liquid crystal have been used for displays of information terminals of approximately 15 inches.

However, such liquid crystal display devices have narrow viewing angle and slow response speed. Accordingly, they are insufficient for application to large size displays such as monitors or the like.

Recently, as a display method capable of solving these problems of the liquid crystal display devices, a display method that employs liquid crystal having an inherent spontaneous polarization or a spontaneous polarization that is induced by application of an electric field is gaining attention. As such liquid crystals, ferroelectric liquid crystal (FLC), anti-ferroelectric liquid crystal (AFLC), distorted helical ferroelectric liquid crystal (DHFLC), twisted ferroelectric liquid crystal (TFLC) or the like can be cited.

A display method employing surface stabilized ferroelectric liquid crystal (SSFLC), one method using those liquid crystal materials, unwinds a helical structure of chiral smectic C phase of smectic liquid crystal through an interaction between an alignment layer and liquid crystal. Due to the torque generated by the interaction between a spontaneous polarization induced at that time and an electric field, switching is carried out. To display a gray scale by use of these liquid crystals, active elements such as TFTs are necessary to be employed.

On the other hand, a display method that employs a liquid crystal phase (SmCa phase) of an anti-ferroelectric liquid crystal is known. In this method, other than two stable states of the ferroelectric liquid crystal, during zero applied voltage, an anti-ferroelectric liquid crystal structure is taken. Recently, according to this method, there appeared a report disclosing that, without using switching elements, the gray scale can be reproduced (N. Koshoubu, K. Mori, K. Nakamura, and Y. Yamada: Ferroelectrics, 149 (1993), p. 295).

To this method, a method employing chiral smectic C liquid crystal together with switching elements consisting of an active element has been recently proposed (J. Funfschilling and M. Schadt: J. Appl. Phys. 66 (1989), p. 3877).

A display device employing this method has advantages such as shown in the following various points over the aforementioned methods.

(1) Excellent in display capability of gray scale. That is, in this method, the transmittance varies relatively smoothly with respect to an applied voltage. Further, contrary to a liquid crystal display device employing a surface stabilized ferroelectric liquid crystal, there is no difficulty in displaying the gray scale.

(2) The liquid crystal devices of this display method are capable of being driven at a low voltage (0 to 5 V). Accordingly, the liquid crystal display device of low power consumption can be materialized.

(3) The liquid crystal display device of this display method is resistant to a mechanical shock. Accordingly, it is not likely to induce alignment destruction due to the mechanical shock like the surface stabilized ferroelectric liquid crystal.

Here, for an anti-ferroelectric liquid crystal that is one example of a liquid crystal material that has an inherent spontaneous polarization or spontaneous polarization induced by application of an electric field (hereinafter referred to as liquid crystal having a spontaneous polarization), the relationship between an alignment and an electric field is shown in FIG. 21.

Molecules 51 of this anti-ferroelectric liquid crystal in a state A during zero applied voltage align in staggering manner to cancel out the spontaneous polarizations each other. At this time, an average optical axis 52 of liquid crystal molecules 51 align in a longitudinal direction. Therefore, when two polarizers are disposed in the same direction and an orthogonal direction with respect to the optical axis 52 to be in a crossed Nicols state as shown with arrows 53 and 54 in the figure, it becomes a dark state (normally black) in A state. However, in B state or C state realized when a positive or a negative voltage is applied, following the direction of an electric field 55, the molecules 51 of the anti-ferroelectric liquid crystal are aligned in one direction to deviate the optical axis 52 from the polarizing direction of the polarizers, resulting in a highlight state. According to the positive and negative voltages applied to the molecules 51 of the anti-ferroelectric liquid crystal, as B state and C state, the directions of the spontaneous polarization are different each other. Accordingly, during inversion of the polarity, an electric charge is needed to change the direction of the spontaneous polarization. That is, the anti-ferroelectric liquid crystal differs in alignment states of the liquid crystal between under the positive voltage and the negative voltage, and requires an electric charge to change the direction of the spontaneous polarization during the inversion of the polarity. This point differs from the nematic liquid crystal.

Further, in threshold-less anti-ferroelectric liquid crystal (TLAFLC), according to the intensity of the voltage applied between the electrodes, other than three alignment states of a zero applied voltage state (A state), a positive voltage applied state (B state) and a negative voltage applied state (C state), any arbitrary aligning state between these states is possible. Therefore, by applying in a display device of an active matrix scheme in which switching elements such as TFTs are formed in pixels disposed in matrix, and by constituting to maintain the voltage that gives the aforementioned arbitrary alignment state during the non selection time period, gray scale display is made possible.

First, in a display element in which, threshold-less anti-ferroelectric liquid crystal material is sandwiched by electrodes, and, polarizers are disposed crossed-Nicols, the relationship between an electric voltage V applied between electrodes and light transmittance intensity T in an equilibrium is shown in FIG. 22. Incidentally, the applied voltage is a sum of the voltage applied to the liquid crystal material and the voltage applied to an alignment film disposed on the electrodes to align the liquid crystal.

Since the alignment of the liquid crystal varies due to the applied voltage V, as shown in this figure, the intensity of the light transmittance T becomes large approximately in proportion to V. A saturation voltage is set as $V_{sat}$. When V takes $+V_{sat}$ and $-V_{sat}$, the alignment of the liquid crystal becomes B or C state as shown in FIG. 21, respectively, resulting in the maximum light transmittance $T_{max}$. Hereinafter, the maximum value $T_{max}$ of the intensity of the transmitted light is referred to as the maximum brightness.

The DHFLC is known that by expressing with an equivalent circuit, the electrical and electrooptical response can be described with accuracy. The equivalent circuit of the DHFLC is shown in FIG. 23. Here, $C_{LC}$ 56 represents the dielectric response portion of a fast component of the capacitance of the liquid crystal, $C_{hx}$ 57 represents the dielectric response portion of a slow component of the capacitance of the liquid crystal, $C_{series}$ 58 represents a capacitance of the alignment film portion, and $R_{series}$ 59 represents a resistance of an electrode by which a voltage is applied to the liquid crystal material, respectively. As to the slow component, for expressing its delay, a resistance component expressed by $R_{hx}$ 60 is disposed in series with $C_{hx}$ 57. The $C_{hx}$ 57 component is construed as a capacitance component corresponding to the spontaneous polarization $P_s$. The electric charge $Q_{hx}$ accumulated at the both ends of $C_{hx}$ 57 can be construed to be approximately proportional to the angle of rotation of the liquid crystal molecule. In the case of the polarizers being set crossed-Nicols, when the electric charge accumulated at the both ends of $C_{hx}$ 57 is zero, it is a black level. As the electric charge increases, the brightness rises. It is construed that, when the electric charges corresponding to $P_s$ is accumulated, the maximum brightness is reached.

By carrying out a circuit simulation by use of such an equivalent circuit, the electrical and electrooptical response can be obtained accurately. For the circuit simulation, a SPICE (Simulation Program with IC Emphasis, U. C. Berkley) and so on, for instance, can be employed. Further, even when such an equivalent circuit model is applied for a threshold-less anti-ferroelectric liquid crystal, its electrical and electrooptical response can be described accurately.

As a method for driving, by an active-matrix scheme, a liquid crystal display device in which liquid crystal having a spontaneous polarization is sandwiched between a pixel electrode disposed in matrix and a counter electrode, there are a frame inversion driving method, a reset driving method and so on. Further, as a method for driving, by the active-matrix scheme, a liquid crystal display device in which a nematic liquid crystal is sandwiched between a pixel electrode and a counter electrode disposed in matrix, there are a frame inversion driving method and so on.

A constitution of one pixel for the case of the driving by the frame inversion scheme is shown in FIG. 24. The driving waveforms are shown in FIG. 25.

In this array, gate lines 61 and signal lines 62 are disposed orthogonally, and in the neighborhood of the intersection thereof, switching elements (TFTs) 63 are disposed to write in signals. The source of each switching element 63 is connected to a pixel electrode 64, and a drain is connected to the signal line 62, respectively.

A frame period $T_{frame}$ during which the switching element is selected by applying the gate signal is normally 1/60 second. For every period, during the gate selection time $T_{gon}$, the gate line is selected on state. When the number of the gate lines is Ng, the gate selection time $T_{gon}$ corresponds to the time obtained by dividing $T_{frame}$ by Ng. On the other hand, to the signal line, the voltage of which polarity reverses with the period identical as the frame frequency is applied. The voltage of the signal line has a central value of $V_{sig-c}$. When being positive polarity, $V_{sig-p}$ is applied, and when being negative polarity, $V_{sig-n}$ is applied. The potential of the counter electrode is a constant of $V_{com}$. During the gate selection time $T_{gon}$, the TFT becomes on-state, the signal is written in the pixel electrode, and thereby the alignment of the liquid crystal material is controlled. That is to say, the liquid crystal changes the direction of the spontaneous polarization for each frame period. For the signal line inversion drive and the dot inversion drive, similar waveforms are obtained. The polarizers need only be disposed to be normally black.

On the other hand, in a reset driving, to the pixel electrode, the reset signal is written in immediately before the addressing of the signal so that the alignment of the liquid crystal becomes the black level state. By resetting thus the alignment of the liquid crystal, the afterimage can be prevented from occurring. That afterimage is induced by variation of the alignment after the addressing due to the influence of the alignment preceding the addressing. Methods for carrying out the reset driving will be described in the following.

Driving waveforms of the first method of the reset driving are shown in FIG. 26. In FIG. 26, a reference mark (a) shows the potential of the gate line and a reference mark (b) shows the potential of the signal line. As an array structure, the constitution shown in the aforementioned FIG. 24 is adopted.

For every frame period $T_{frame}$, the gate line is selected for an on state during $T_{gon0}$. When the number of the gate lines is Ng, the $T_{gon0}$ corresponds to the time obtained by dividing $T_{frame}$ by Ng. The $T_{gon0}$ during which the gate electrode is on-state is consisting of two parts, the former being the reset time $T_r$, and the latter being the gate selection time during which the display signal is written in the pixel electrode, that is, the signal addressing time $T_{gon}$.

The voltage applied to the signal line, during the reset time $T_r$, is the potential $V_{com}$ of the counter electrode, and during the signal write-in time $T_{gon}$, is the signal voltage that is to be written in the pixel. During the $T_{gon0}$, the TFT is on state. During the former half of $T_{gon0}$, that is, during the reset time $T_r$, the pixel potential becomes approximately equal as the potential of the counter electrode $V_{com}$. During the latter half of $T_{gon0}$, that is, the signal write time $T_{gon}$, the signal is written in the pixel electrode, to control the alignment the liquid crystal. The liquid crystal changes the direction of the spontaneous polarization for every frame period, thereby, the image sticking can be prevented from occurring. The polarizers need only be disposed to be normally black.

An equivalent circuit for one pixel of the second method of the rest driving is shown in FIG. 27. As the array constitution, in addition to the constitution of the frame inversion driving, there are a switching element 65 for resetting consisting of a TFT, and a reset line 66 for controlling on/off switching of the TFT 65. For the TFT 65 for resetting, a source is connected to a storage capacitance line 67, and a drain is connected to a pixel electrode 64.

The driving waveforms of the circuit are shown in FIG. 28. In FIG. 28, reference marks (a), (b) and (c) denote potentials of a gate line, a reset line and a signal line, respectively.

For every frame period $T_{frame}$, during the gate selection time $T_{gon}$, the gate line is selected on state. When the number of the gate line is Ng, the gate selection time $T_{gon}$ corresponds to the time obtained by dividing $T_{frame}$ by Ng. Immediate before the selection of the gate line, the reset line is selected on state during the reset time $T_r$. Since the potential of the storage capacitance line is maintained at the potential approximately equal to $V_{com}$ of the counter electrode, during the reset time $T_r$, the pixel potential becomes approximately equal to that $V_{com}$ of the counter electrode. During the gate selection time $T_{gon}$ thereafter, the signal is written in the pixel electrode and the alignment of the liquid crystal material is controlled. The liquid crystal changes the direction of the spontaneous polarization for every frame period, thereby, the image sticking is prevented from occurring. The polarizers need only be disposed to be normally black.

A liquid crystal display device having a nematic liquid crystal or liquid crystal having a spontaneous polarization that is interposed between a pixel electrode that are disposed in matrix and a counter electrode is driven by an active matrix scheme with a frame inversion method. The voltage applied to one arbitrary pixel and light transmittance thereof in that time are shown in FIG. 29. Incidentally, the polarizers are disposed to be normally black.

First, in a liquid crystal display device that has a nematic liquid crystal interposed, as shown in FIG. 29(a), gate signals are periodically applied from a gate line. At this time, the frequency of the gate signals is a frame frequency Ff and is normally 60 Hz. That is, the period of the gate signal $T_{frame}$ is normally 1/60 second (=16.67 ms). Whereas, to the signal line, as shown in FIG. 29(b), a voltage of which polarity reverses periodically with the same period with the frame period $T_{frame}$ is applied. Here, the voltage of the signal line has the central value of $V_{sig-c}$, for the positive polarity, $V_{sig-p}$ is applied, and for the negative polarity, $V_{sig-n}$ is applied. In addition, to prevent flicker and image sticking from occurring, the potential of the counter electrode is kept at $V_{com}$ that is approximately 1 V lower than $V_{sig-c}$.

Thus, when the voltage is applied on the gate during the gate selection time $T_{gon}$ that is the time during which the gate line is selected on-state for addressing the display signal to the pixel electrode, during the $T_{gon}$, the switching element becomes on-state. The voltage of the aforementioned signal line is supplied to a pixel electrode through a switching element as a write voltage as shown in (c) of the same figure. Then, due to the write voltage supplied to the pixel electrode like this, a liquid crystal cell and a storage capacitance function as condensers. Accordingly, as shown in (d) of the same figure, a holding voltage of the nematic liquid crystal cell hardly shows lowering of the holding rate and is kept at an approximately constant value. That is to say, when an impurity is mixed in the liquid crystal, the holding voltage shows a decrease. However, when a fluorine-based liquid crystal that hardly contains an ionic impurity is employed, the holding voltage is maintained at an approximate constant. The light transmittance of the liquid crystal cell in this case is shown in (e) of the same figure. Since the nematic liquid crystal is low in response speed, the light transmittance builds up slowly. However, whichever positive polarity or negative polarity does the voltage of the pixel electrode have, the alignment of the liquid crystal is not affected, accordingly, the later light transmittance becomes approximately constant.

On the other hand, in the liquid crystal having a spontaneous polarization, when, due to input of the gate signal from the gate line shown in FIG. 29(a) and a voltage applied to the signal line shown fin FIG. 29(b), a write voltage shown in FIG. 29(c) is supplied to the pixel through the switching element, as shown in FIG. 29(f), the holding voltage of the liquid crystal cell decreases after the gate selection time, resulting in an extremely poor holding characteristic. In this case, the light transmittance of the liquid crystal cell becomes as shown in FIG. 29(g).

Thus, when liquid crystal having a spontaneous polarization is active matrix driven (holding drive), the light transmittance does not increase like that in a static drive. As a result of this, the liquid crystal display device that employs liquid crystal having the spontaneous polarization shows a lowering of the contrast and a deterioration of the display quality.

As a result of the detailed study of the problems by the inventors, it is found that the lowering of the contrast is caused by the following reasons.

That is, in the case of active matrix drive, as shown in FIG. 29(c), the voltage supply to write in one frame is executed during only a part of one frame. Normally, in dielectric response of liquid crystal having the spontaneous polarization, there are a fast component and a slow component. The fast component has a saturation time constant of several μs or less. On the contrary, the saturation time constants of the slow components are generally 80 μs is or more in many cases. Further, the saturation time constant of the storage capacitance is also several μs or less. The typical gate selection time $T_{gon}$ is 64 μs or less. Accordingly, the response of the fast component and the storage capacitance completes within the gate selection time. However, the response of the slow component does not complete.

The change of alignment of a liquid crystal molecule corresponds to the response of the slow component of the dielectric response. Accordingly, the change of the alignment of the liquid crystal molecule does not complete within the gate selection time $T_{gon}$. Therefore, during the rest of frame period after the gate selection time, charges accumulated at the dielectric response part of the fast component of the liquid crystal capacitance and at the storage capacitance move to the dielectric response part of the slow component, thus the change of the alignment of the liquid crystal molecules continues to occur. Accordingly, as shown in FIG. 29(d), the holding voltage decreases. At this time, in the case of the holding voltage being the voltage lower than the saturation voltage $V_{sat}$, the transmittance decreases compared with the static driving, accordingly the brightness during white level becomes lower than the maximum brightness $T_{max}$, resulting in the lower contrast.

Incidentally, the response time of liquid crystal normally indicates a time during which, when a voltage is applied to liquid crystal in a certain alignment state to change the alignment state, the amount of the change of the transmittance of the liquid crystal cell from the time of application reaches 90% of the difference of the transmittances of before and after application. Here also adopts this definition. In the liquid crystal having the aforementioned spontaneous polarization, since the optical response is due to the dielectric response of the slow component corresponding to the change of the alignment of the liquid crystal, the response time is in many cases 80 μor more.

In the nematic liquid crystal that does not possess spontaneous polarization, a liquid crystal molecule responds with respect to the absolute value of an applied voltage. That is, +5 V and −5 V applications induce the same alignment. Therefore, even if the first frame upon from off to on switching gives rise to an insufficient alignment change, as goes on to second frame, third frame, and so on, gradually the alignment of the liquid crystal molecules continues to change. Thus, after several to several tens frames, the alignment becomes identical as the case of the same voltage being applied by the static driving scheme. That is, after several to several tens frames, there is the same transmittance with the static-driving scheme.

On the other hand, the liquid crystal possessing a spontaneous polarization differs in alignment of the liquid crystal molecule according to the polarity of the applied voltage. That is, +5 V and −5 V applications give rise to different alignments. Therefore, when driven by a frame inversion scheme, at the first frame upon from off to on switching, the liquid crystal molecule takes on an alignment of either polarity (for instance, positive polarity). However, being slow in the response speed, the alignment of the case where the same voltage is applied by the static drive scheme can not be attained. In the second frame, upon inversion of the polarity, the liquid crystal molecule changes its alignment from the alignment where the first frame is positive polarity through the alignment under zero voltage input. Accordingly, similarly as the first frame that is switched from off state to on-state, the alignment of the static-driving scheme can not be attained. Further, since the polarity is reversed for every frame, even in the later frame, the alignment of the static-driving scheme under the same voltage application can not be attained. As a result of this, the transmittance, compared with the static-driving scheme, largely deteriorates, resulting in low contrast display.

To the liquid crystal having a spontaneous polarization, the reset driving is carried out. For this, the voltage applied to the arbitrary pixel and the light transmittance are shown in FIG. 30.

When the voltages are applied to the gate line and the signal line with the driving waveforms shown in FIG. 30(a) and (b), respectively, the pixel potential varies as shown in FIG. 30(c), and the light transmittance of the liquid crystal cell varies as shown in FIG. 30(d).

When driven by the reset drive, since the state is reset in the black level before the addressing of the signal, the alignment of the liquid crystal molecule varies small during the signal addressing compared with the case of the frame inversion drive. However, as shown in FIG. 30(d), as identical as the frame inversion drive, after the gate selection time, the electric charges move and the holding voltage becomes low, and when this voltage becomes lower than $V_{sat}$, the contrast becomes low.

An equivalent circuit is shown in FIG. 31 wherein a storage capacitance $C_s$ 68 and a TFT 69 are added to the equivalent circuit shown in FIG. 23. This drawing can be construed as an equivalent circuit showing an electrical and electrooptical response of one pixel. As mentioned above, $C_{LC}$ 56 denotes the dielectric response of the fast component of the capacitance of the liquid crystal, and $C_{hX}$ 57 denotes the dielectric response of the slow component of the capacitance of the liquid crystal, respectively.

The source 70 of the TFT 69 is connected to the pixel electrode, and the drain 71 is connected to the signal line. Between the gate 72 and the source 70, a parasitic capacitance $C_{gs}$ 73 exists. In this circuit, corresponding to the reset drive, when an operation is considered where the display preceding the addressing is black level and the display after the addressing is white level, during the gate selection time, the potential of the pixel electrode $V_{pix}$ approaches the potential of the signal line $V_{sig}$. When the addressing capability (that is expressed by a conductance of the TFT 69) during the gate selection time is large, upon completion of the gate selection time, $V_{pix}$ is approximately equal to $V_{sig}$.

However, when the addressing capability is small, the differences of $V_{pix}$ and $V_{sig}$ upon completion of the gate selection time do not become sufficiently small.

Further, even when the addressing capability is large, during the gate selection time, the responses due to $C_s$ 68 and $C_{LC}$ 56 nearly complete but the response due to $C_{hX}$ 57 does not complete. After the gate selection time, the electric charge stored at $C_s$ 68 and $C_{LC}$ 56 moves to $C_{hX}$ 57 to approach an equilibrium. When the electric charge stored at the $C_{hX}$ 57 at the equilibrium is smaller than that equivalent to the spontaneous polarization PS of the liquid crystal, the brightness becomes lower than the maximum brightness $T_{max}$.

From the above, in a liquid crystal display device involving liquid crystal having a spontaneous polarization, the problem that the brightness becomes low during the white display is considered to be induced by combination of the following two factors. One is a part due to the physical properties of the material such as the spontaneous polarization $P_s$ of the liquid crystal and a response time τ, and the other is a part due to the pixel parameter such as the addressing capability of the TFT and the magnitude of the storage capacitance $C_s$.

With an object to obtain a liquid crystal display element of high contrast, in order for the absolute value of the voltage applied between the electrodes sandwiching the liquid crystal layer to be the saturation voltage $V_{sat}$ or more at the equilibrium, the following methods can be thought of.

(I) The gate selection time $T_{gon}$ for addressing the display signal to the pixel electrode is set longer than the response time τ of the liquid crystal cell.

(II) The storage capacitance $C_s$ and the capacitance of the fast component of the dielectric response of the liquid crystal are made large.

(III) The maximum value of the applied voltage between the electrodes sandwiching the liquid crystal layer is made large.

Among them, as to the method of (I), the magnitude of the gate selection time $T_{gon}$ is restricted by the definition of the display element. Accordingly, for the display element of high definition, $T_{gon}$ can not be made large.

Here, the response time τ of a liquid crystal cell is defined, as mentioned above, in the following way. That is, the response time is the time during which after the application of the voltage, the amount of change of the transmittance reaches 90% of the difference between the transmittances of the liquid crystal cell before and after the voltage application. On the other hand, in an electric circuit, the response speed is usually defined as the time during which the voltage becomes 1−exp (−1) times the applied voltage. Accordingly, when that time is set as τe (s), the transmittance can be considered to vary due to the response of the potential, and τ and τe have a relation expressed by the following equation.

$$\tau = \tau e \times \log_e 10.$$

In liquid crystal having a spontaneous polarization, the response time τ of a liquid crystal cell is determined by the physical properties of the liquid crystal material, the capacitance of an alignment layer or the like. At the present time, the condition of (I) that requires to make the response time of a liquid crystal cell smaller than the gate selection time $T_{gon}$ is not yet achieved.

Further, as to the method of (II), the magnitude of the storage capacitance $C_s$, being restricted by the size of one pixel and the array structure, can not be made large without limit. In addition, the capacitance of the fast component of the dielectric response of liquid crystal, being determined by the physical properties of the material, can not be made large exceeding a certain limit. Further, to make large the storage capacitance $C_s$ and the capacitance of the fast component of the dielectric response of the liquid crystal corresponds to that the capacitance to be written by a switching element that is a TFT is large. However, when an on-resistance while a TFT is selected is large and the addressing capability is small, the amount of the current is restricted by the resistance. Accordingly, there occurs a problem that, while the TFT is selected, the electric charge is not fed sufficiently and the potential of the pixel electrode does not sufficiently respond. Therefore, the contrast improvement due to the method of (II) is also difficult.

Further, the voltage of the applied signal is restricted by the voltage resistance of a driver, therefore, there is an upper limit. Accordingly, an improvement of the contrast due to the method of (III) is also difficult.

In addition, since the liquid crystal molecule responds to a torque induced through an interaction between a spontaneous polarization and an electric field, when a response time of liquid crystal having the spontaneous polarization is put as $\tau_{LC}$, the following relation generally holds between the $\tau_{LC}$ and the spontaneous polarization $P_s$, $$\tau_{LC} = \eta / P_s$$

where, the $\eta$ is a constant determined by viscosity of the liquid crystal and so on. That is, when the spontaneous polarization $P_s$ is too small, the response time $\tau_{LC}$ of the liquid crystal becomes large, resulting in a problem that the display of excellent response can not be obtained.

Further, a display device employing liquid crystal having a spontaneous polarization, by making longer a period $T_s$ of polarity inversion of the voltage applied between the pixel electrode and the counter electrode (common electrode) than the frame time $T_{frame}$, can be driven to satisfy the following relation between the response time of the liquid crystal $\tau_{LC}$ and the gate selection time $T_{gon}$, $$T_s \geq T_{frame} \times (\tau_{LC}/T_{gon}),$$

thereby a high contrast display can be obtained. This method that is called a quasi DC drive scheme is proposed (Japanese Patent Application No. 8-235571).

However, in this method, the response of the liquid crystal is not assumed to complete within the time of one frame. Accordingly, there is a problem that the response time is slow.

In addition, the liquid crystal that possesses the spontaneous polarization requires much electric charge to align. Thus, since a capacitance where a TFT that is a switching element has to write in becomes large, in the case of the gate of the TFT being selected, if the electric current flowing to the channel layer is small, enough amount of the electric charge can not be supplied during the selection period. Therefore, there occurs a problem that a write deficient voltage that is the difference between the pixel and the signal line potentials upon completion of the gate selection time $T_{gon}$ becomes large.

In a liquid crystal display device employing a nematic liquid crystal, the write deficient voltage is designed to be 100 to 200 mV at maximum, therefore a display of excellent quality is obtained. However, if the write deficient voltage is large, an angle of rotation of the liquid crystal molecule during the gate selection time $T_{gon}$ becomes small to result in the lowering of the transmittance compared with the static drive. In addition to the lowering of the contrast, the nonuniformity of the amount of the write deficient voltage due to the gate wiring delay and so on in a panel becomes large to result in a problem that the homogeneity of the contrast in a panel deteriorates.

On the other hand, a TFT that is a switching element is constituted of thin insulating films, metallic films and semiconductor films. When a high voltage is applied between the electrodes, due to electrostatic destruction, the element becomes nonfunctional to induce display error. Accordingly, the amount of the current that flows the channel layer of a switching element is required to be suppressed down to a certain value or less. Further, when a storage capacitance $C_s$ is large and a capacitance thereto a TFT writes in is large, there is a problem that the amount of electric charge necessary for charging and discharging increases to result in an increase of power consumption.

Further, in a liquid crystal display device having liquid crystal having a spontaneous polarization, upon changing the voltage applied to the wiring of the gate line and signal line, a large quantity of electric charge moves during the shift of the signal. Accordingly, compared with the device involving the nematic liquid crystal, the applied signal pulse tends to be distorted. The distortion of the signal pulse induces nonuniformity of the electric charge to be written in a plane. Thus, the potential of the common electrode for suppressing the image sticking (due to the direct current component of the voltage applied to the liquid crystal layer) and flickering becomes different in the plane. Therefore, there is a problem that the display uniformity in the plane deteriorates largely.

Still further, the inventors have studied, in a liquid crystal element employing liquid crystal having a spontaneous polarization, a relation between a signal voltage and a pixel potential in an active matrix drive scheme, and obtained the following result.

That is, when a signal voltage $V_{sig}$ is applied as shown in FIG. 32(a), in a holding period ($T_H$) during the off-time of the gate potential shown in FIG. 32(b), the pixel potential $V_{pix}$ becomes lower by a feed-through voltage $\Delta V_p$ as shown in FIG. 32(c). This is considered a phenomenon occurring due to the existence of the parasitic capacitance $C_{gs}$ between the gate and the pixel electrodes in a TFT.

First, when the gate is on-state, the gate potential becomes $V_{gon}$ and to the pixel electrode $V_{sig}$ is written in, and, in parasitic capacitance $C_{gs}$ between gate and pixel electrodes, storage capacitance $C_s$, and capacitance $C_{cell}$ consisting of liquid crystal and an alignment film, the electric charges corresponding to the respective potentials are stored. Thereafter, the gate becomes off state. When the gate potential is $V_{goff}$ and the pixel potential is floating, the stored electric charge is redistributed to $C_{gs}$, $C_s$, $C_{cell}$ under this condition. Thereby, upon the gate becoming off-state, the pixel potential decreases, that is, a feed-through phenomenon occurs.

This phenomenon is also observed in a liquid crystal display device of a TFT-TN mode employing nematic liquid crystal. However, because of the slow response speed of the liquid crystal, the optical response varies smoothly during the holding period, resulting in less discernibility of the time averaged brightness difference between the polarities. On the other hand, in a liquid crystal display device involving liquid crystal having a spontaneous polarization, the liquid crystal instantaneously responds to the voltage put on the liquid crystal and the alignment film. Therefore, according to the polarity of the applied signal voltage, the brightness level differs remarkably. Thus, the difference in the display brightness levels according to the polarity of the signal voltage, though depending on the period of the polarity inversion, causes a problem that the display defect such as flickering and so on occurs. In addition, since the voltage put actually on the liquid crystal and alignment film differs according to the polarity, the deterioration of the display quality such as the so-called image sticking and so on are likely to occur.

The present inventors have studied a relationship between such a feed-through voltage and a signal voltage in detail and found the following result.

FIG. 33 is a diagram showing the signal voltage dependence of the feed-through voltage $\Delta V_P$ in a liquid crystal display device employing liquid crystal having a spontaneous polarization.

As obvious from this figure, the value of the feed-through voltage $V_P$ is always positive, and is symmetrical with respect to the polarity of the signal voltage. Further, as the absolute value of the signal voltage becomes large, the feed-through voltage increases.

This result shows an opposite tendency with respect to the relation of the liquid crystal display device that employs the conventional nematic liquid crystal. Since, as the signal voltage increases, the difference of the pixel potential between the polarities becomes large, the deterioration such as the image sticking or the like is considered to be liable to proceed. Further, it is found that the signal voltage dependence of the feed-through voltage is remarkably large compared with a device that employs nematic liquid crystal, thereby, the difference of the brightness level becomes large between the polarities.

SUMMARY OF THE INVENTION

The present invention is accomplished by considering the aforementioned many problems and the results of investigation and consideration to these problems. The liquid crystal display device of the present invention is constituted so that liquid crystal having an inherent polarization or a spontaneous polarization that is induced by application of an electric field is interposed between pixel electrodes disposed in matrix and counter electrodes, wherein display signal is applied to the pixel electrode through a switching element. An object of the present invention is to provide display of high contrast and high response speed with the aforementioned liquid crystal display device. In addition, another object is to provide display of low power consumption, and excellent homogeneity and image quality.

Still another object of the present invention is to improve display characteristic such as uniformity of display by preventing flickering and deterioration of the display from occurring, wherein the flickering and deterioration of the display are due to the brightness difference caused by the different polarities of the applied voltage.

To solve these problems, the liquid crystal display device of the present invention is constituted as follows.

In the first aspect of the present invention, a liquid crystal display device comprises a first substrate having one major surface, pixel electrodes arranged in matrix fashion on the major surface of the first substrate, storage capacitors connected to the pixel electrodes, switching elements connected to the pixel electrodes, a liquid crystal layer provided close to the pixel electrodes arranged in matrix fashion, the liquid crystal having an inherent spontaneous polarization or a spontaneous polarization induced by application of an electric field, a common electrode formed on the liquid crystal layer, and a second substrate formed on the common electrode, and when an electrostatic capacitance of one pixel in a saturation alignment of the liquid crystal is $C_{LC}$ (F), a spontaneous polarization per unit area of the electrode of the liquid crystal is $P_s$ (C/m²), a voltage applied between the pixel electrode and the common electrode is E (V), an area of pixel electrode for one pixel is A (m²), and a storage capacitance for one pixel is $C_s$ (F), these satisfy the following equation;

$$P_s \times A \leq 5 \times (C_s + C_{LC}) \times E \tag{1}$$

In addition, the liquid crystal display device is constituted to further satisfy the following equation;

$$P_s \geq P_1 = 5 \times 10^{-6} \ (C/m^2) \tag{2}$$

Still further, the liquid crystal display device is constituted to satisfy the following equation;

$$(C_s + C_{LC}) \times E / 5 \leq P_s \times A \tag{3}$$

Still further, the liquid crystal display device is constituted to satisfy the following equations;

$$E \geq V_{sat} \tag{4}$$

and $$F \leq 1 \tag{4'}$$

where, $V_{sat}$ (V) denotes a saturation voltage of a liquid crystal display device. Further, when a time interval during which the switching element is selected for addressing a display signal to the pixel electrode is $T_{gon}$ (s), and a response time of a liquid crystal cell when a voltage E (V) is applied between the pixel electrode and the common electrode is τ (s), $$F = P_s \times A \times \exp(-(T_{gon} \times \log_e 10/\tau))/((C_s + C_{LC}) \times (E - V_{sat})).$$

Further, the liquid crystal display device satisfying the aforementioned equation (4) $E \geq V_{sat}$ and $F \leq 1$ further satisfies the following equation;

$$P_s \geq P_1 = 5 \times 10^{-6} \ (C/m^2) \tag{5}$$

Further, in the first aspect, as a switching element, a thin film transistor (TFT) can be provided with. Here, as the TFT, one that has a polycrystalline silicon film or an amorphous silicon film can be used.

In a liquid crystal display device provided with a TFT, when a time during which the gate electrode of the thin film transistor is selected for addressing the display signal to the pixel electrode in one frame time is $T_{gon}$ (s) and the maximum value of a current that flows between a source and drain electrode of the thin film transistor while the gate electrode is selected is $I_{on}$ (A), the liquid crystal display device is constituted to satisfy the following equation;

$$(P_s \times A + (C_s + C_{LC}) \times E)/(2 \times T_{gon}) \leq I_{on} \tag{6}$$

Further, the liquid crystal display device satisfying the above equation (6) is constituted to further satisfy the following equation;

$$I_{on} \leq I_{max} \text{ and } I_{max} = 3 \times 10^{-4} (A) \tag{7}$$

In the second aspect of the present invention, a liquid crystal display device comprises a first substrate having one major surface, pixel electrodes arranged in matrix fashion on the major surface of the first substrate, storage capacitors connected to the pixel electrodes, switching elements connected to the pixel electrodes, a liquid crystal layer provided close to the pixel electrodes arranged in matrix fashion, the liquid crystal having an inherent spontaneous polarization or a spontaneous polarization induced by application of an electric field, a common electrode formed on the liquid crystal layer, and a second substrate formed on the common electrode, and when an electrostatic capacitance of one pixel in a saturation alignment of the liquid crystal is $C_{LC}$ (F), a spontaneous polarization per unit area of the electrode of the liquid crystal is $P_s$ (C/m$^2$), a voltage applied between the pixel electrode and the counter electrode is E (V), an area of the pixel electrode for one pixel is A (m$^2$), a storage capacitance for one pixel is $C_s$ (F), a time during which the switching element is selected for addressing display signal to the pixel electrode is $T_{gon}$ (s), and a response time of a liquid crystal cell when a voltage E (V) is applied between the pixel electrode and the common electrode is τ (s), the following relations are satisfied;

$$E \geq V_{sat} \quad (4)$$

and $$F \leq 1 \quad (4'').$$

In addition, in such second aspect, the liquid crystal display device is constituted to further satisfy the following equation;

$$P_s \geq P_1 = 5 \times 10^{-6} (C/m^2) \quad (5).$$

Further, in such second aspect, as a switching element, a TFT can be provided with, and as the TFT, one that has a polycrystalline silicon film or an amorphous silicon film can be employed.

A liquid crystal display device provided with a TFT having a polycrystalline silicon film is constituted to satisfy the following equation;

$$F \leq \tfrac{1}{2} \quad (8).$$

Further, a liquid crystal display device that is provided with a TFT having an amorphous silicon film is constituted to satisfy the following equation;

$$F \leq \tfrac{2}{3} \quad (9),$$

and is preferable to be constituted to further satisfy the following equation;

$$F \leq \tfrac{1}{3} \quad (10).$$

When a storage capacitance $C_s$ is made large enough to satisfy the equation (1), after a gate selection time $T_{gon}$, even if electric charge moves from a storage capacitance to a dielectric response portion of a slow component of capacitance of the liquid crystal, the lowering of a holding voltage becomes small, resulting in an alignment of the liquid crystal close to that during static drive. Thereby, in AC drive where a polarity is reversed for each frame time, the contrast can be enhanced. Further, even in a quasi DC drive where the polarity is reversed with a period longer than a frame time, the lowering of the holding voltage can be made small. Since the number of the frames up to saturation of the alignment is decreased, response speed can be made fast.

Further, when a storage capacitance $C_s$ is made large, though the contrast can be improved due to the alignment of the liquid crystal as described above, a capacitance in which a TFT that is a switching element is to address becomes large. Accordingly, a deficient voltage that is a difference of a pixel potential at the completion of the gate selection time $T_{gon}$ and a signal line potential increases to lower the contrast. However, if the maximum value of a current $I_{on}$ that flows between electrodes of a source and a drain of the TFT is designed to satisfy the equation (6), the addressing deficient amount becomes small, resulting in prevention of the lowering of the contrast from occurring.

Further, such a liquid crystal display device can comprise a memory frame for memorizing potential applied to a signal line. Therewith, one frame time is divided into a plurality of sub-frame times and during each sub-frame time, and the gate line is once selected to be on state. Thereby, in one frame time, the number of which the electric charge stored at a dielectric response portion of the fast component of the storage capacitance and capacitance of the liquid crystal moves more frequently to a dielectric response portion of the slow component increases, resulting in an enhancement of the contrast.

In addition, a response time $τ_{LC}$ of liquid crystal is preferable to be several to 10 ms or less. To make small the $τ_{LC}$, a torque caused due to coupling of a spontaneous polarization $P_s$ and an electric field E is required to be held larger than a certain degree.

Between the $τ_{LC}$ and the spontaneous polarization $P_s$, with a constant η determined by a viscosity of a liquid or the like, the following relation holds;

$$τ_{LC} = η/P_s.$$

The value of η is in most cases in the range of from $5 \times 10^{-8}$ to $5 \times 10^{-7}$ C·s/m$^2$. For such liquid crystal material, in order for the $τ_{LC}$ to be 10 ms ($1 \times 10^{-2}$ s) or less, the $P_s$ is preferable to be $5 \times 10^{-6}$ C/m$^2$ (0.5 nC/cm$^2$) or more to make hold the equations (2) and (5).

Further, by constituting the liquid crystal display device to satisfy the equation (3), the magnitude of the storage capacitance $C_s$ can be made small. In a liquid crystal display device of small storage capacitance $C_s$, a capacitance that a TFT has to address becomes small, thereby the electric charge necessary for charging and discharging can be suppressed, resulting in prevention of power consumption from increasing.

Further, in order to prevent the electrostatic destruction of the TFT that is a switching element from occurring, it is required to suppress the voltages being applied between the respective electrodes of the TFT to a certain constant value or less. Further, the value of an electric current that flows between source and drain is also required to be suppressed to a certain constant value or less.

In the case of a TFT of which a channel layer is composed of a polycrystalline silicon film of a channel width W of 3 μm, a channel length L of 10 μm, and a mobility of approximately 100 cm$^2$/(V·s), in order to prevent the electrostatic destruction from occurring, the value of electric current that flows between source-drain is required to be less than $3 \times 10^{-4}$ A. In addition, in the case of a TFT of which a channel layer is composed of an amorphous silicon of the same channel width W and the same channel length L, and a mobility of approximately 0.6 cm$^2$/(V·s), in order to prevent the electrostatic destruction from occurring, the similar value of the electric current is necessary to be less than $2 \times 10^{-5}$ A.

On the other hand, when a voltage of 5 V is applied to a dummy cell that has no TFT and an area A of a pixel electrode of $1 \times 10^{-4}$ m$^2$ the value of the electric current that flows in the pixel electrode, even when liquid crystal having a spontaneous polarization $P_s$ of approximately $1 \times 10^{-3}$ C/m$^2$ (100 nC/cm$^2$) is inserted in a dummy cell, is approximately $2 \times 10^{-2}$ A.

The area of the pixel electrode of a liquid crystal display device, though determined by a screen size and definition or the like, is generally in the range of from $3\times10^{-10}$ to $5\times10^{-8}$ m². If the electric current flows in proportion to the area, the electric current that is to flow to the switching element is in the range of from $6\times10^{-8}$ to $1\times10^{-5}$ A.

Thus, an electric current that is to flow to a TFT of a liquid crystal display device employing liquid crystal having a spontaneous polarization is smaller than the value of the electric current of $3\times10^{-4}$ A that can prevent the electrostatic destruction of the TFT from occurring. Accordingly, as shown in the equation (7), by making smaller the value of the electric current that flows between the source drain of the TFT than $3\times10^{-4}$ A ($=I_{max}$), the electrostatic destruction of the TFT can be prevented from occurring.

Further, in a liquid crystal display device in which liquid crystal having a spontaneous polarization is interposed between pixel electrodes aligned in matrix and a counter electrode and which is provided with a TFT having a polycrystalline silicon layer as a channel layer, by satisfying the equations $$E \geq V_{sat} \quad (4)$$

and $$F \leq 1 \quad (4')$$

where, $$F = P_s \times A \times \exp(-(T_{gon} \times \log_e 10/\tau))/((C_s + C_{LC}) \times (E - V_{sat})),$$

the high brightness can be obtained during white display and the display of high contrast can be attained. By further satisfying the equation of $F \leq \frac{1}{2}$ (8), the display of excellent uniformity in a plane can be obtained.

In addition, in a liquid crystal display device similarly having liquid crystal that has a spontaneous polarization and provided with a TFT having an amorphous silicon layer as a channel layer, by satisfying the equation $$F \leq \frac{2}{3} \quad (9),$$

a high brightness can be obtained during the white display and a display of high contrast is attained. By further satisfying the equation $$F \leq \frac{1}{3} \quad (10),$$

a display of excellent uniformity in a plane can be obtained.

As described above, a problem that, in a display device using liquid crystal having a spontaneous polarization, the brightness becomes low during white display is caused by combination of an element due to physical properties of the liquid crystal material and an element due to pixel parameter. In threshold-less anti-ferroelectric liquid crystal, by carrying out circuit simulation with an equivalent circuit shown in FIG. 31, the relationship between the physical properties of the liquid crystal material and the pixel parameters for attaining a high brightness during the white display can be obtained. Further, by assuming a TFT having an ideal on off characteristic as a switching element, the part due to the addressing capability of a TFT can be removed, thereby a relationship between necessary physical properties of the liquid crystal material and a storage capacitance $C_s$ can be obtained.

Further, by carrying out the simulation by adding a circuit that takes in a delay to the wiring of gate line and signal line, the display uniformity in the wiring direction due to an influence of the wiring delay can be evaluated.

In the case of a switching element having an ideal on/off characteristic being employed, the relationship asked for physical properties of a liquid crystal material and a storage capacitance $C_s$, as shown in FIG. 34, can be considered with an equivalent circuit that takes in a switch. Here, a switch 74 turns on/off with the timings similar to those of selection/non-selection of gate pulse of the TFT.

With such an equivalent circuit, the electrical and electrooptical response of liquid crystal can be analytically obtained. In this circuit, when the waveform of signal is free from distortion, under the rest drive, before the addressing period, the pixel potential $V_{pix}$ is assumed to be equal to the potential of the counter electrode $V_{com}$. At this time, a condition for obtaining the maximum brightness at an equilibrium can be obtained as follows.

Since during the gate selection time $T_{gon}$, when considered that the response of the storage capacitance $C_s$ 68 and $C_{LC}$ 56 is over, and potential down at the alignment film is small, the sum of the electric charge $Q_1$ stored at $C_s$ 68 and $C_{LC}$ 56 due to an applied voltage E is expressed by the following equation (4-1). Here, E is assumed to be positive;

$$Q_1 = (C_s + C_{LC}) \times E \quad (4\text{-}1).$$

During the addressing time period, the liquid crystal molecules response, thereby an amount of electric charge $Q_2$ is stored at $C_{hx}$ 57. The amount of the electric charge $Q_2$ is expressed by the following equation (4-2) with the aforementioned response time $\tau e$ of the liquid crystal;

$$Q_2 = P_s \times A \times (1 - \exp(-T_{gon}/\tau e)) \quad (4\text{-}2).$$

On the other hand, an amount of an electric charge $Q_3$ necessary for obtaining the maximum brightness at an equilibrium can be expressed by the following equation (4-3);

$$Q_3 = (C_s + C_{LC}) \times V_{sat} + P_s \times A \quad (4\text{-}3).$$

To obtain the maximum brightness at equilibrium, the sum of $Q_1$ and $Q_2$ is required to be $Q_3$ or more. Accordingly, the following equation (4) and (4') are required to hold;

$$F = P_s \times A \times \exp(-(T_{gon} \times \log_e 10/\tau))/((C_s + C_{LC}) \times (E - V_{sat})) \leq 1.$$

To the equivalent circuit shown in FIG. 30, by setting various values for the material constants of liquid crystal materials such as a spontaneous polarization, and pixel parameters such as addressing capability of a TFT and the magnitude of the storage capacitance $C_s$, the circuit simulation is carried out with the SPICE.

The area of a pixel electrode A was set at $2\times10^{-4}$ cm² ($2\times10^{-8}$ m²). $P_s$ was in the range of from 1 to 100 nC/cm² ($1\times10^{-5}$ to $1\times10^{-3}$ C/m²), $C_s$ was in the range of from 0 to 2 pF, $C_{LC}$ was in the range of from 0.2 to 1 pF, and $C_{series}$ was in the range of from 5 to 50 pF. Several conditions were also set for other material constants and pixel parameters to evaluate. As the drive condition, the gate pulse voltage was varied in the range of from 30 to 40 V, the applied voltage E was in the range of from 0 to 7 V, and the gate selection time $T_{gon}$ was in the range of from 0.5 to 64 µs. For the channel layer of the TFT, the polycrystalline silicon film or the amorphous silicon film was employed. For each condition, an evaluation was carried out.

Results obtained by such simulation are shown in the following.

In FIG. 35, in the case of a polycrystalline silicon film or an amorphous silicon film being employed as a channel layer of a TFT, for $C_s$ in the range of 0 to 2 pF, the maximum values of $P_s$ for obtaining the maximum brightness at equilibrium after the addressing period was over are shown. In FIG. 35, (a) is for the case of the polycrystalline silicon film, and (b) is for the case of the amorphous silicon film, respectively. In addition, when an ideal switch shown in the equivalent circuit of FIG. 34 is assumed, the maximum values of $P_s$ for obtaining the maximum brightness at equilibrium after the addressing time period was over are analytically obtained and shown in FIG. 35(c). Here, $C_{LC}$ was 0.5, pF, $C_{series}$ was 10 pF, the gate pulse voltage was 40 V, the applied voltage E was 5 V, and the gate selection time $T_{gon}$ was 21 μs. In addition, a voltage $V_{sat-LC}$ put on the liquid crystal when the saturation voltage $V_{sat}$ is applied was 1.25 V, and $P_s$ and $C_{hX}$ have a relation of the following equation (4-4);

$$C_{hX} = P_s \times A / V_{sat-LC} \tag{4-4}$$

According to the result of this evaluation due to the simulation, in the case (a) of the channel layer being a polycrystalline silicon film, the maximum value of $P_s$ at that the maximum brightness is obtained under the equilibrium after the addressing time period was over was found to be approximately identical as the case (c) of the analytical solution. Further, in the case (b) of the channel layer being an amorphous silicon film, the maximum value of the $P_s$ was found to be two thirds or less of the case (c) of the analytical solution. Further, even when the simulation was carried out under the different conditions from the above, the similar results were obtained.

From these results, it was confirmed that in order to obtain the maximum brightness at the equilibrium after the addressing time period was over, in the case of a channel layer of a TFT being a polycrystalline silicon film, the equations (4) and (4') are required to be satisfied. In the case of a channel layer being an amorphous silicon film, the equation (9) is required to be satisfied.

Further, to the equivalent circuit shown in FIG. 31, a circuit that takes in a pulse distortion due to the wiring such as the gate line and signal line was added. With this, the simulation was carried out to study an influence of the wiring delay on the nonuniformity of the display in a wiring direction.

The pixel electrode area A was set at $2 \times 10^{-4}$ cm$^2$ ($2 \times 10^{-8}$ m$^2$), and $P_s$, $C_s$, $C_{CL}$ and $C_{series}$ were set in the ranges of from 1 to 100 nC/cm$^2$ ($1 \times 10^{-5}$ to $1 \times 10^{-3}$ C/m$^2$), from 0 to 2 pF, from 0.2 to 1 pF and from 5 to 50 pF, respectively. Other material constants and the pixel parameters were also studied by setting several conditions. For the driving condition, the gate pulse voltage, the applied voltage E and the gate selection time $T_{gon}$ were varied in the ranges of from 30 to 40 V, from 0 to 7 V and from 0.5 to 64 μs, respectively. For the channel layer, the polycrystalline silicon film or the amorphous silicon film was studied, respectively.

The results due to such simulation are shown in the following.

In the case of the identical signal being applied in the signal line and the gate line, if the charge stored at $C_{hX}$ 57 at equilibrium after the addressing time period was over differs largely depending on the existence of the delay due to the wiring, the potential is not uniform in a direction of the wiring. In addition, image sticking and flickering occur. For the display to be uniform under the application of the identical signal, the difference of the electric charges stored at $C_{hX}$ 57 caused by the existence of the wiring delay is necessary to be 10% or less. The condition realizing this is studied.

In FIG. 36, the results of the case of the polycrystalline silicon film or amorphous silicon film being employed as the channel layer of a TFT are shown. When the $C_s$ is varied in the range of from 0 to 2 pF, depending on whether there is a wiring delay or not, the electric charge stored at $C_{hX}$ at equilibrium after the addressing time period was over differs. The maximum values of the $P_s$ for the difference of the electric charges to be 10% or less are shown in the figure. In the figure, (a) shows the case of the polycrystalline silicon film, and (b) shows the case of the amorphous silicon film. For the case of the ideal switch shown in an equivalent circuit of FIG. 34 being assumed, the maximum values of $P_s$ for obtaining the maximum brightness at equilibrium after the addressing time period was over are obtained analytically and shown in (c) of the same figure. Here, $C_{LC}$, $C_{series}$, the gate pulse voltage, the applied voltage E and the gate selection time $T_{gon}$ were set at 0.5 pF, 10 pF, 40 V, 5 V and 21 μs, respectively. In addition, the voltage $V_{sat-LC}$ put on the liquid crystal when the saturation voltage $V_{sat}$ is applied was set at 1.25 V, and $P_s$ and $C_{hX}$ have the relation expressed by the aforementioned equation (4-4).

According to the results due to this simulation, in the case (a) where the channel layer is the polycrystalline silicon film, depending on the existence of the wiring delay or not, the maximum value of the $P_s$ at which the difference of the electric charges stored at $C_{hX}$ in equilibrium after the addressing time period was over is 10% or less is found to be one half or less of the analytical solution (c) of the maximum value of $P_s$ at which the maximum brightness is obtained. Further, in the case (b) where the channel layer is an amorphous silicon layer, the maximum value of $P_s$ at which the difference of the electric charges due to the wiring delay is 10% or less is found to be one third or less of the analytical solution (c) of the maximum value of $P_s$ at which the maximum brightness is obtained. Further, even when the simulation is carried out under the conditions different from the above, the similar results are obtained.

From these, it was confirmed that even when there is a wiring delay, in order to obtain a uniform display, in the case of the channel layer being a polycrystalline silicon film, the equation (8) is required to be satisfied, and in the case of the channel layer being an amorphous silicon film, the equation (10) is required to be satisfied.

Incidentally, to FIG. 35 and FIG. 36, the values of $P_s$ restricted by the equation (1), equation (3) or equation (5) are added to show in FIG. 37 and FIG. 38, respectively. In these figures, (d) shows the maximum values that satisfy the equation (1), (e) shows the minimum values of $P_s$ satisfying the equation (3), and (f) shows the minimum values of $P_s$ satisfying the equation (5), respectively.

In the third aspect of the present invention, a liquid crystal display device comprises a first substrate having one major surface, pixel electrodes arranged in matrix fashion on the major surface of the first substrate, storage capacitors connected to the pixel electrodes, switching elements connected to the pixel electrodes, a liquid crystal layer provided close to the pixel electrodes arranged in matrix fashion, the liquid crystal having an inherent spontaneous polarization or a spontaneous polarization induced by application of an electric field, a common electrode formed on the liquid crystal layer, and a second substrate formed on the common electrode. In this liquid crystal display device, when a combined capacitance of one pixel consisting of a ferroelectric capacitance due to the spontaneous polarization of the liquid crystal and a capacitance of an alignment film is $C_{cell}$(F), a parasitic capacitance for one pixel between the gate electrode of the thin film transistor and the pixel electrode is $C_{gs}$(F), the storage capacitance for one pixel is $C_s$(F), a potential difference of the gate electrode upon on/off is $\Delta V_g$ (V), and a saturation voltage of a liquid crystal display element is $V_{sat}$ (V), the following equation is satisfied;

$$5 \times C_{gs} \times \Delta V_g \leq (C_s + C_{cell}) \times V_{sat} \qquad (11).$$

In order to obtain knowledge about an electric capacitance of liquid crystal having a spontaneous polarization, the inventors made measurements with an impedance analyzer (HP4192A, a product of Hewlett Packard) and found that as shown in FIG. 39, the electric capacitance of liquid crystal has an applied voltage dependence and a frequency dependence. When the applied voltage is the saturation voltage or less, the electric capacitance of liquid crystal varies according to a bias voltage and is symmetrical with respect to the polarity of the bias voltage. The capacitance shows the maximum value at the bias voltage in the vicinity of approximately 0 V, and as the absolute value of the bias voltage becomes larger, decreases. Further, the lower the frequency is, the larger the electric capacitance of the liquid crystal is, and at approximately 50 Hz or less, the electric capacitance saturates. This is similar to a dielectric dispersion of Debye relaxation type, an increment of the capacitance at low frequency is considered to be a contribution from the inversion of the spontaneous polarization that is slow in response.

With an electric capacitance of a part of slow response obtained from this result, that is, liquid crystal capacitance including a part caused by a inversion of the spontaneous polarization, a feed-through voltage $\Delta V_p$ is calculated and compared with the measured results. Thereby, it was found that there are coincidences in the absolute values and signal voltage dependence thereof.

Therefore, the feed-through voltage was found to be determined with a combined capacitance $C_{cell}$ consisting of the capacitance caused by the spontaneous polarization of the liquid crystal having a spontaneous polarization and the capacitance of alignment layers, a parasitic capacitance $C_{gs}$ between gate pixel electrodes, a storage capacitance $C_s$, and a gate voltage difference $\Delta V_g$ at the on/off state, as shown in the following equation (11-1);

$$\Delta V_p = C_{gs} \Delta V_g / (C_s + C_{cell}) \qquad (11-1).$$

On the other hand, how a displayed image is discerned depending on a magnitude of a feed-through voltage was studied with a moving picture simulator. As an object to be evaluated, a 15 "XGA (768×1024) was assumed. When a display device is observed from a position at three times the display height, an approximately 40 pixels are contained in one direction in a field of a viewing angle of 1°. In addition, by assuming an employment of a polarity inversion due to a dot inversion scheme, the polarity is reversed between neighboring pixels.

Fifty testees observed images displayed by this simulator to judge as to "flickering of the display", "display nonuniformity" and so on. Thereby, the allowed value of the feed-through voltage that renders a display device of high image quality of flicker-free and good uniformity is obtained.

From this evaluation, under the aforementioned conditions, $\Delta V_p / V_{sat} \leq 0.20$ is found to be preferable.

Therefore, in a liquid crystal display employing liquid crystal having a spontaneous polarization, by satisfying the equation (11), a high quality display of flicker-free and good uniformity can be realized.

BRIEF DESCRIPTION OF THE DRAWINGS

FIG. 10 is a plan view showing a rough constitution of a liquid crystal display device of a fourth embodiment of the present invention, FIG. 12 is a plan view showing, by exploding, a pixel portion of the first substrate of the seventh embodiment of the present invention, FIG. 13 is a diagram showing waveforms of driving voltages of a liquid crystal display element in the seventh embodiment, FIG. 16 is a diagram showing waveforms of driving voltages of a liquid crystal display element in the eighth embodiment, FIG. 17 is a diagram showing waveforms of driving voltages of a liquid crystal display element in the ninth embodiment, FIG. 20 is a plan view showing, by exploding, a pixel portion of the first substrate of the eleventh embodiment of the present invention, FIG. 21 is a diagram for explaining a response of liquid crystal having a spontaneous polarization to an electric field, FIG. 24 is a diagram showing a constitution of one pixel of an array in the case of the liquid crystal display element being driven by the frame inversion scheme, FIG. 25 is a diagram showing driving waveforms for the case of the liquid crystal display element being driven by the frame inversion scheme, FIG. 26 is a diagram showing driving waveforms of a first method of reset drive for driving a liquid crystal display element, FIG. 27 is a diagram showing a constitution of one pixel of an array when a liquid crystal display element is reset driven by the second method, FIG. 28 is a diagram showing driving waveforms of the second method of the reset drive for driving a liquid crystal display element, FIG. 29 is a diagram showing electric voltages applied between electrodes and light transmittances when a liquid crystal display device in which a nematic liquid crystal or liquid crystal having a spontaneous polarization is sandwiched is driven.

BRIEF DESCRIPTION OF THE PREFERRED EMBODIMENTS

In the following, with reference to the drawings, preferred embodiments of the present invention will be described.

Incidentally, these embodiments are described with an object to make understanding of the present invention easy. Accordingly, in the range of the intentions of the present invention, various modifications are possible.

Embodiment 1

Figure 1A:
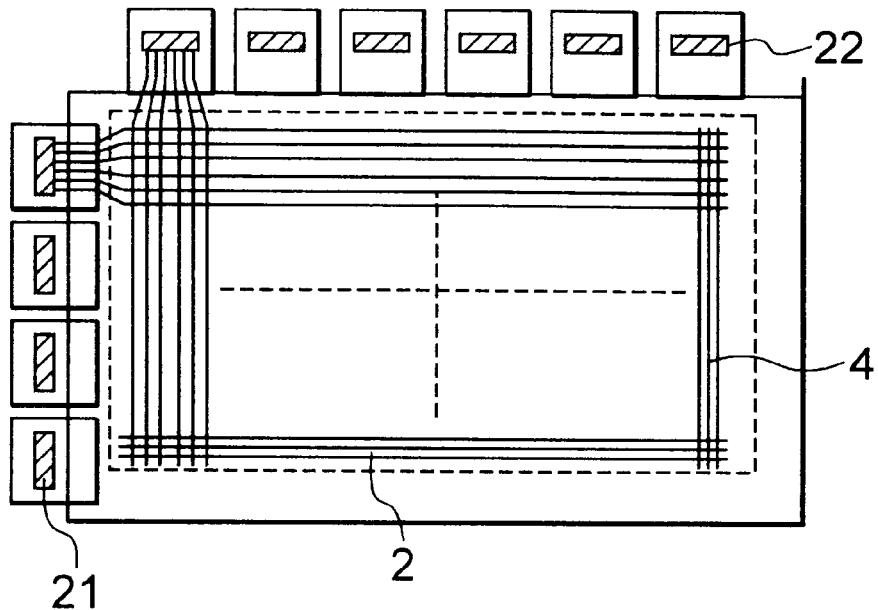
FIG. 1A and FIG. 1B are a plan view and a cross section, respectively, showing a rough constitution of a first embodiment of a liquid crystal display device of the present invention.
Figure 1B:
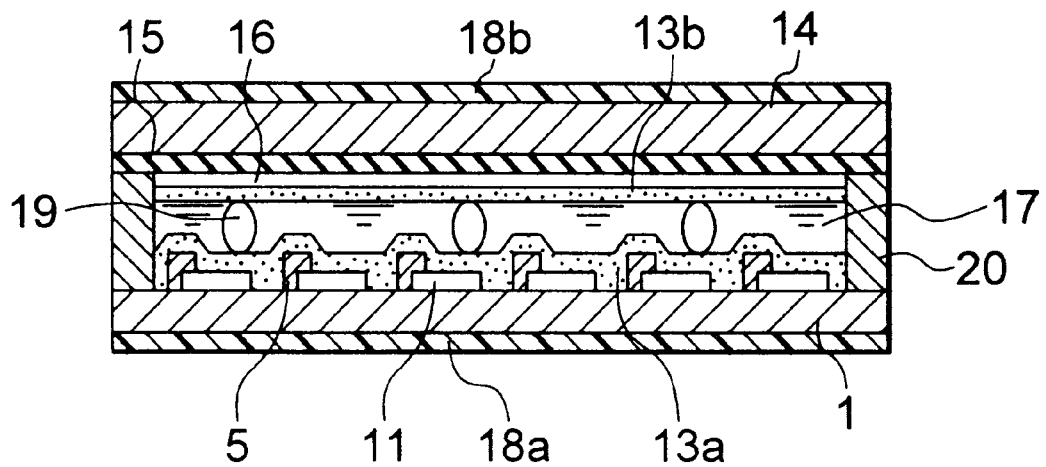
Figure 2A:
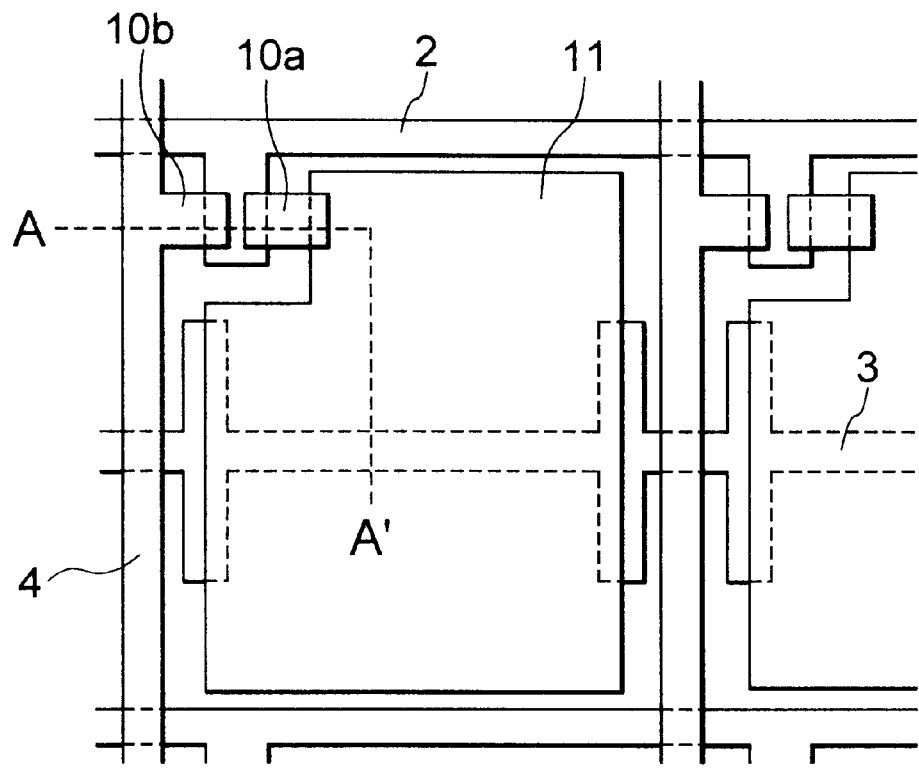
FIG. 2A and FIG. 2B are a plan view and an A–A' cross section, respectively, showing by exploding a pixel portion of a first substrate of the first embodiment.
Figure 2B:
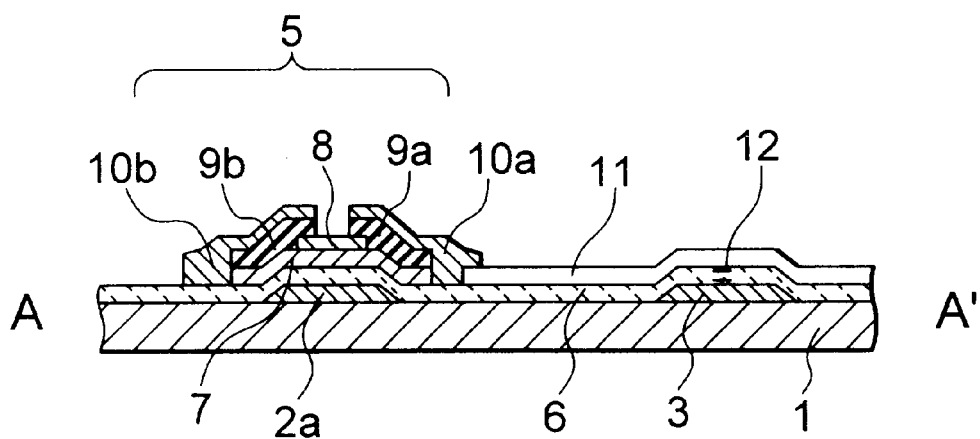

FIGS. 1A and 1B are diagrams showing a rough constitution of a first embodiment of a liquid crystal display device of the present invention. FIG. 1A is a plan view and FIG. 1B is a cross section. Further, FIGS. 2A and 2B are diagrams showing in an exploded manner a pixel portion of the first substrate of the liquid crystal display device. FIG. 2A is a plan view. FIG. 2B is an A–A' cross sectional-view of the pixel portion shown in FIG. 2A.

On a first substrate 1 consisting of a glass or the like, a wiring consisting of a gate line 2, a storage capacitance line 3 and a signal line 4 is formed. The gate line 2 and storage capacitance line 3 are formed at the same time and constituted of a metal such as Al, Al—Y alloy, Al—Nd alloy, Mo—W alloy or the like. The signal line 4 is formed orthogonally to the gate line 2, and constituted of a metal such as Al, Al—Y alloy, Al—Nd alloy or the like.

Then, in the neighborhood of an intersection of the gate line 2 and the signal line 4, a switching element 5 consisting of a TFT is formed in matrix. That is, a gate electrode 2a is formed simultaneously with the gate line 2 and connected to the gate line 2. On the gate line 2, the gate electrode 2a and the storage capacitance line 3, a gate insulating film 6 consisting of $SiO_2$, $Ta_2O_5$ or the like is formed, and a channel layer 7 consisting of an amorphous silicon is formed covering the gate electrode 2a. On the channel layer 7, an etching stopper layer 8 consisting of $SiN_x$ is formed, and the channel layer 7 is connected to contact layers 9a and 9b consisting of P-doped amorphous silicon. In addition, on the contact layers 9a and 9b, a source electrode 10a and a drain electrode 10b are formed, respectively, and the drain electrode 10b is connected to the signal line 4. Further, to the source electrode 10a, a pixel electrode 11 consisting of a transparent conductive film such as ITO (Indium Tin Oxide) or the like is connected, and a storage capacitance 12 is formed between the storage capacitance line 3 and the pixel electrode 11. On these of gate line 2, signal line 4, switching element 5 and pixel electrode 11, an alignment film 13a consisting of such as polyimide is disposed.

On a second substrate 14, disposed opposite to the first substrate 1, consisting of such as glass or the like, a color filter (CF) layer 15, and a counter electrode 16, formed on the CF layer 15, consisting of a transparent conductive film such as an ITO, are formed, respectively, and further on the counter electrode 16, an alignment film 13b consisting of polyimide or the like is disposed. Between the pixel electrode 11 formed on the first substrate 1, and the counter electrode 16 disposed on the second substrate 14, liquid crystal 17 having an inherent spontaneous polarization or a spontaneous polarization induced by application of an electric field such as a ferroelectric liquid crystal FLC, anti-ferroelectric liquid crystals AFLC, a DHF, a TFLC or the like is interposed. Further, on the external surfaces of the first and second substrates 1 and 14, polarizers 18a and 18b are stuck, respectively. Incidentally, in the figure, reference numerals 19 and 20 denote a spacer particle (spherical pearl) and a sealant consisting of ultraviolet light curing resin or the like, respectively.

Further, the gate line 2 and the signal line 4 are connected to peripheral drive circuits such as a gate line driver 21, a signal line driver 22 or the like, respectively. For these peripheral drive circuits, an integrated circuit formed on a single crystal Si can be employed.

In order to evaluate an effect of contrast improvement due to a liquid crystal display element based on the present invention, with various kinds of liquid crystal materials and pixel structures of different performances, liquid crystal display devices of the aforementioned structures were prepared and performances thereof were evaluated. Results are shown in Tables 1 and 2.

Figure 3:
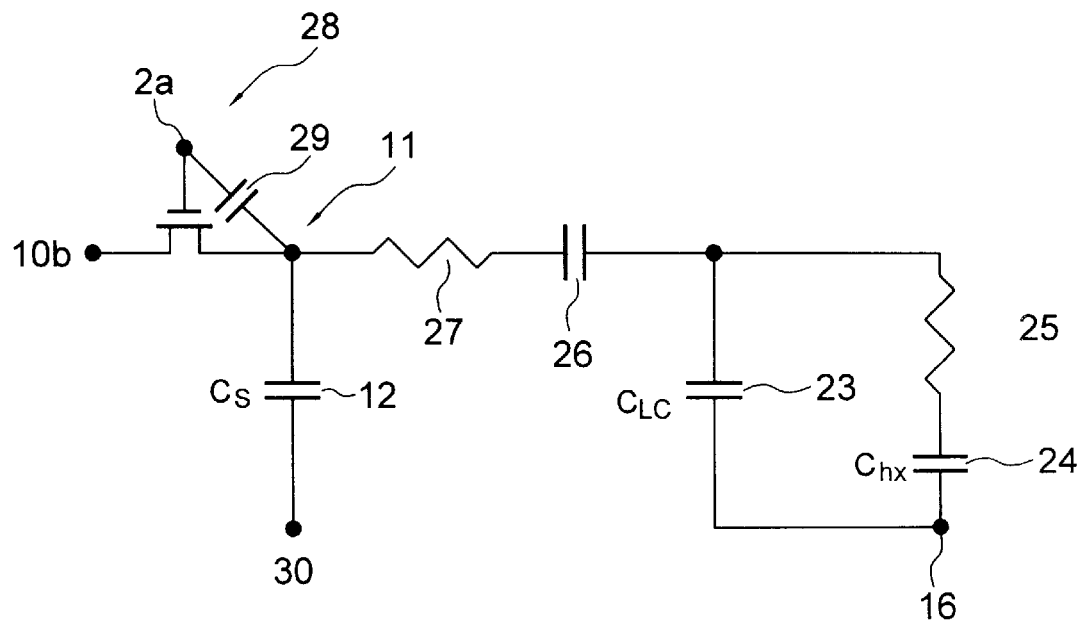
FIG. 3 is a diagram showing an electrical equivalent circuit of the pixel portion of a TFT-LCD employing liquid crystal material having a spontaneous polarization.

An electrical equivalent circuit of a pixel portion of a TFT-LCD having a TFT that employs a TFT as a switching element and employing liquid crystal material having an inherent spontaneous polarization or a spontaneous polarization induced by application of an electric field is shown in FIG. 3.

TABLE 1

| Example | Electrostatic capacitance of liquid crystal $C_{LC}$ (F) | Storage capacitance $C_s$ (F) | Spontaneous polarization $P_s$ (C/m$^2$) | $P_s \times A$ (C) | $5 \times (C_s + C_{LC}) \times E$ (C) |
|---|---|---|---|---|---|
| 1 | $0.3 \times 10^{-12}$ | $1.2 \times 10^{-12}$ | $2.0 \times 10^{-3}$ | $3.6 \times 10^{-11}$ | $3.8 \times 10^{-11}$ |
| 2 | $0.3 \times 10^{-12}$ | $2.0 \times 10^{-12}$ | $2.0 \times 10^{-3}$ | $3.6 \times 10^{-11}$ | $5.8 \times 10^{-11}$ |
| 3 | $0.1 \times 10^{-12}$ | $0.8 \times 10^{-12}$ | $1.1 \times 10^{-3}$ | $2.0 \times 10^{-11}$ | $2.3 \times 10^{-11}$ |
| 4 | $0.1 \times 10^{-12}$ | $1.2 \times 10^{-12}$ | $1.1 \times 10^{-3}$ | $2.0 \times 10^{-11}$ | $3.3 \times 10^{-11}$ |
| 5 | $0.1 \times 10^{-12}$ | $2.0 \times 10^{-12}$ | $1.1 \times 10^{-3}$ | $2.0 \times 10^{-11}$ | $5.3 \times 10^{-11}$ |
| 6 | $0.1 \times 10^{-12}$ | $0.4 \times 10^{-12}$ | $2.0 \times 10^{-4}$ | $3.6 \times 10^{-12}$ | $1.3 \times 10^{-11}$ |
| 7 | $0.1 \times 10^{-12}$ | $0.8 \times 10^{-12}$ | $2.0 \times 10^{-4}$ | $3.6 \times 10^{-12}$ | $2.3 \times 10^{-11}$ |
| 8 | $0.1 \times 10^{-12}$ | $1.2 \times 10^{-12}$ | $2.0 \times 10^{-4}$ | $3.6 \times 10^{-12}$ | $3.3 \times 10^{-11}$ |
| 9 | $1.0 \times 10^{-12}$ | $0.8 \times 10^{-12}$ | $2.4 \times 10^{-3}$ | $4.3 \times 10^{-11}$ | $4.5 \times 10^{-11}$ |
| 10 | $1.0 \times 10^{-12}$ | $1.2 \times 10^{-12}$ | $2.4 \times 10^{-3}$ | $4.3 \times 10^{-11}$ | $5.5 \times 10^{-11}$ |
| 11 | $1.0 \times 10^{-12}$ | $2.0 \times 10^{-12}$ | $2.4 \times 10^{-3}$ | $4.3 \times 10^{-11}$ | $7.5 \times 10^{-11}$ |

TABLE 2

| Example | Electrostatic capacitance of liquid crystal $C_{LC}$ (F) | Storage capacitance $C_s$ (F) | Spontaneous polarization $P_s$ (C/m$^2$) | $P_s \times A$ (C) | $5 \times (C_s + C_{LC}) \times E$ (C) |
|---|---|---|---|---|---|
| 1 | $0.3 \times 10^{-12}$ | $0.4 \times 10^{-12}$ | $2.0 \times 10^{-3}$ | $3.6 \times 10^{-11}$ | $1.8 \times 10^{-11}$ |
| 2 | $0.3 \times 10^{-12}$ | $0.8 \times 10^{-12}$ | $2.0 \times 10^{-3}$ | $3.6 \times 10^{-11}$ | $2.8 \times 10^{-11}$ |
| 3 | $0.1 \times 10^{-12}$ | $0.4 \times 10^{-12}$ | $1.1 \times 10^{-3}$ | $2.0 \times 10^{-11}$ | $1.3 \times 10^{-11}$ |
| 4 | $1.0 \times 10^{-12}$ | $0.4 \times 10^{-12}$ | $2.4 \times 10^{-3}$ | $4.3 \times 10^{-11}$ | $3.5 \times 10^{-11}$ |

Here, for numerical values of the storage capacitance 12, 0.4, 0.8, 1.2, and 2.0 (pF) were selected. Incidentally, Table 1 shows data for liquid crystal display elements satisfying the condition of the equation (1) and Table 2 shows, for comparison, data for liquid crystal display elements not satisfying the condition of the equation (1).

The size of one pixel is 100 $\mu$m×300 $\mu$m, and an area A of pixel electrode for one pixel is $1.8 \times 10^{-8}$ m$^2$. A cell gap is set at 2 $\mu$m by scattering spherical pearls 19 of a diameter of 2 $\mu$m on an alignment film 13$b$. Further, a voltage E applied between the pixel electrode 11 and the common electrode 16 is 5 V. As material of liquid crystal 17, such as LIXON CS2005 of a product of Chisso Co, FLC9807 of a product of Roche Ltd or the like is employed.

Liquid crystal display elements having data satisfying the condition of the equation (1) shown in Table 1 showed contrast ratio values of 30 or more, resulting in an excellent image quality. On the contrary, liquid crystal display elements having data that do not satisfy the condition of the equation (1) shown in Table 2 showed the contrast ratio values of 10 or less, resulting in a poor image quality.

Further, when the condition of the equation (3) is satisfied, an increase of power consumption can be suppressed. Further, when the condition of the equation (5) is satisfied, a response time $\tau_{LC}$ of liquid crystal material can be made 10 ms or less, resulting in a display device of high speed response.

This circuit has a capacitance component ($C_{LC}$) 23 corresponding to ferroelectricity of a liquid crystal material, a capacitance component ($C_{hX}$) 24 expressing equivalently a spontaneous polarization of a liquid crystal material, a resistance component 25 describing equivalently a delay of rotation due to viscosity of liquid crystal, a capacitance component 26 of an alignment film of a liquid crystal molecule, a resistance component 27 of a pixel electrode portion, a switching element 28 consisting of a TFT, a capacitance component 29 between a gate electrode 2$a$ and a drain electrode 10$b$, and a storage capacitance 12 between a pixel electrode 11 and a storage capacitance electrode 30.

When a saturation voltage of liquid crystal material is $V_{sat-LC}$, and an area of pixel electrode for one pixel is A, $C_{hX}$ can be expressed with a value of a spontaneous polarization $P_s$ as $$C_{hX} = P_s \times A / V_{sat-LC}.$$

For such an equivalent circuit, an equivalent circuit simulation was carried out by applying the signals identical with the case of the driving of a liquid crystal display device to the gate electrode 2$a$ of the TFT, the drain electrode 10$b$, the counter electrode 16, and the storage capacitance electrode 30. Thereby, variation of potential of the pixel electrode 11 can be found, and an optical response of the display device can be found.

Figure 4:
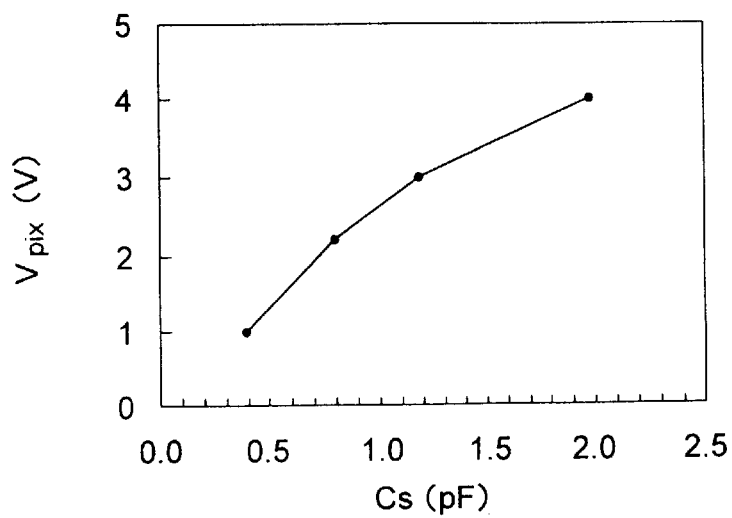
FIG. 4 is a diagram showing, in the first embodiment, a pixel electrode potential when an equilibrium is attained after a signal is applied.

By setting $C_{LC}=0.3\times10^{-12}$ F, $P_s=2.0\times10^{-3}$ C/m², and $A=1.8\times10^{-8}$ m², for a pixel electrode of a potential of 0 V, signal is applied under the condition of E=5 V, $I_{on}=1\times10^{-6}$ A, and $T_{gon}=3\times10^{-5}$ s. The potential of a pixel electrode at the time when an equilibrium is reached after the rotation of the liquid crystal molecule is shown in FIG. 4. Here, the value of the storage capacitance $C_s$ is varied in the range of from 0.4 pF to 2 pF.

From this figure, when the storage capacitance $C_s$ becomes large, the potential of the pixel electrode in equilibrium becomes high. In particular, when the storage capacitance $C_s$ is 1 pF or less, compared with the case of 1 pF or more, the potential was found to decrease largely. Under the above mentioned conditions, the magnitude of the storage capacitance $C_s$ where an equal sign holds in the equation (1), is $C_s=1.14\times10^{-12}$ F=1.14 pF. Also from this simulation, it is confirmed that the contrast becomes high when the equation (1) holds.

Embodiment 2

Figure 5A:
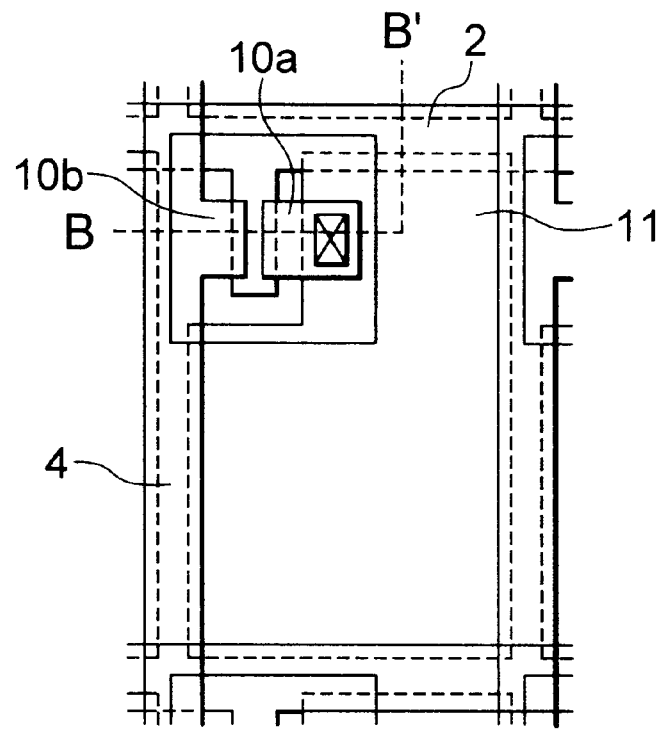
FIG. 5A and FIG. 5B are a plan view and a B–B' cross section, respectively, showing, by exploding, an essential portion of a first substrate of a second embodiment of the present invention.
Figure 5B:
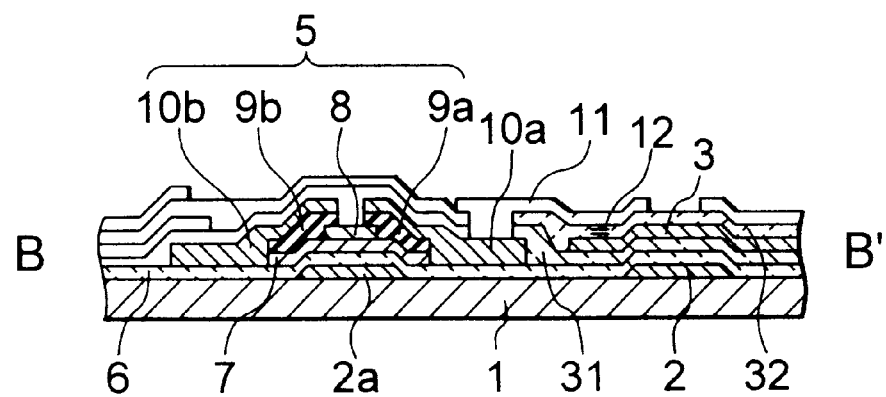

FIGS. 5A and 5 B are diagrams showing, by exploding, an essential portions of a second embodiment of a liquid crystal display device of the present invention. FIG. 5A is a plan view, and FIG. 5B is a B–B' cross-sectional view of the pixel portion shown in FIG. 5A.

On a first substrate 1 consisting of glass or the like, gate lines 2 consisting of a metal such as Al, Al—Y alloy, Mo—Nd alloy, Mo—W alloy or the like are formed in parallel, in the same layer therewith, gate electrodes 2a are formed. On gate lines 2 and gate electrodes 2a, a gate insulating film 6 consisting of $SiO_2$ or $Ta_2O_5$ is formed, further, covering the gate electrode 2a, a channel layer 7 consisting of an amorphous silicon is formed. On the channel layer 7, an etching stopper layer 8 consisting of $SiN_x$ is formed, and the channel layer 7 is connected to contact layers 9a and 9b consisting of P-doped amorphous silicon. Signal lines 4 consisting of a metal such as Al, Al—Y alloy, Al—Nd alloy or the like are formed orthogonally to the gate lines 2, and at the same time the source electrodes 10a and the drain electrodes 10b are formed on the contact layers 9a and 9b, respectively. Thus, in the neighborhood of the intersections of the gate lines 2 and the signal lines 4, the switching elements 5 consisting of TFTs are formed in matrix.

Further, on these of gate lines 2, signal lines 4, and switching elements 5, a first interlayer insulating film 31 consisting of $SiN_x$ or the like is formed, further thereon except for on the switching element 5, storage capacitance lines 3 consisting of a transparent conductive film such as an ITO or the like are formed. On the storage capacitance lines 3, a second interlayer insulating film 32 consisting of $SiN_x$ or the like is formed, further thereon pixel electrodes 11 consisting of a transparent conductive film such as an ITO or the like are formed and connected to source electrodes 10a through through-holes. Between the storage capacitance line 3 and the pixel electrode 11, a storage capacitance 12 is formed. Further on the pixel electrode 11 and the second interlayer insulating film 32, an alignment film 13a consisting of polyimide or the like is disposed.

In addition, though omitted in the figure, as identical as the embodiment 1, on a second substrate disposed opposed to the first substrate and consisting of glass or the like, a CF layer and a counter electrode disposed thereon and consisting of such as an ITO are disposed. Further on the common electrode, an alignment film consisting of polyimide or the like is disposed. Between the switching element and the pixel electrode that are disposed on the first substrate, and the counter electrode disposed on the second substrate, liquid crystal having a spontaneous polarization that is inherent or induced by application of an electric field such as a ferroelectric liquid crystal FLC, anti-ferroelectric liquid crystal AFLC, DHF, TFLC, or the like is interposed. Further, on the external surfaces of the first and second substrates, polarizers are stuck, respectively.

In the liquid crystal display device having a pixel structure as described above, both electrodes forming the storage capacitance 12 are formed of a transparent conductive film. Even if the area thereof is made large, an aperture ratio that is a ratio of area where the light transmits a panel does not become small. Accordingly, without reducing the brightness, the storage capacitance can be adopted large.

Also in a liquid crystal display device having a pixel structure as described above, as identical as the liquid crystal display device of the embodiment 1, in the case of satisfying the equation (1), the contrast ratio shows a value of 30 or more, resulting in an excellent image quality. However, in the case of not satisfying the equation (1), the value of the contrast ratio becomes 10 or less, resulting in a poor image quality.

Further, in the case of satisfying the condition of the equation (3), an increase of power consumption can be suppressed. Further, in the case of satisfying the condition of the equation (5), a response time $\tau_{LC}$ of a liquid crystal material can be made smaller than 10 ms, resulting in a display device of high speed response.

Embodiment 3

Figure 6A:
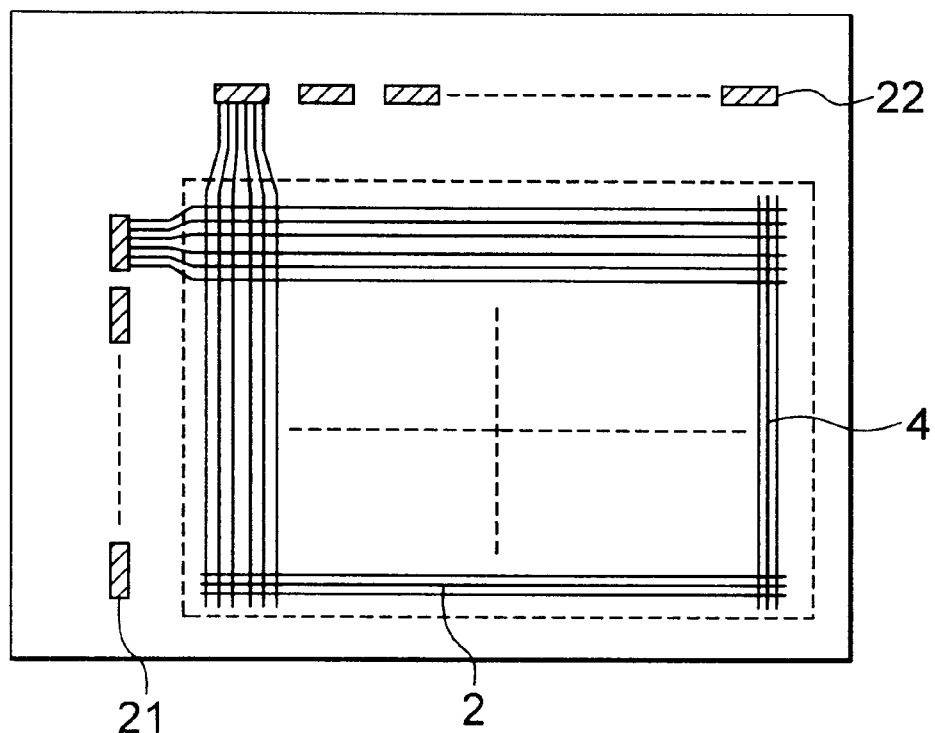
FIG. 6A and FIG. 6B are a plan view and a cross section, respectively, showing a rough constitution of a liquid crystal display device of a third embodiment of the present invention.
Figure 6B:
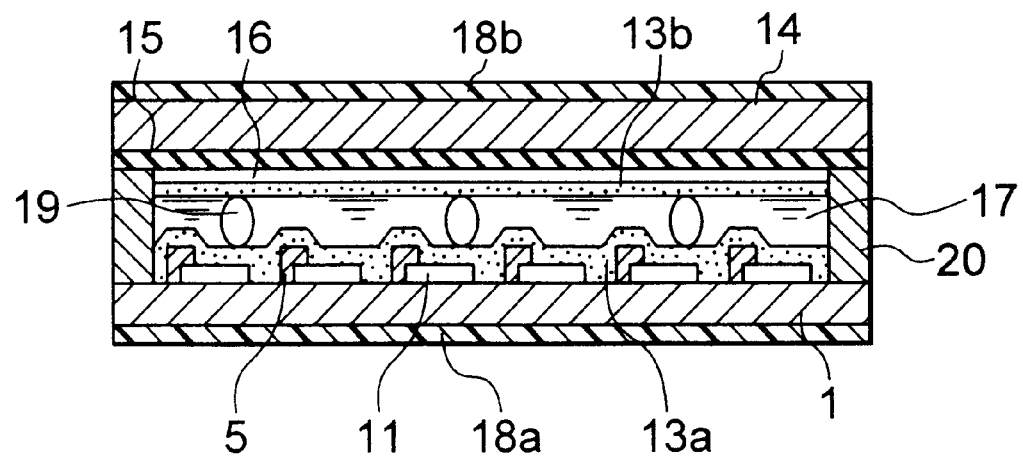
Figure 7A:
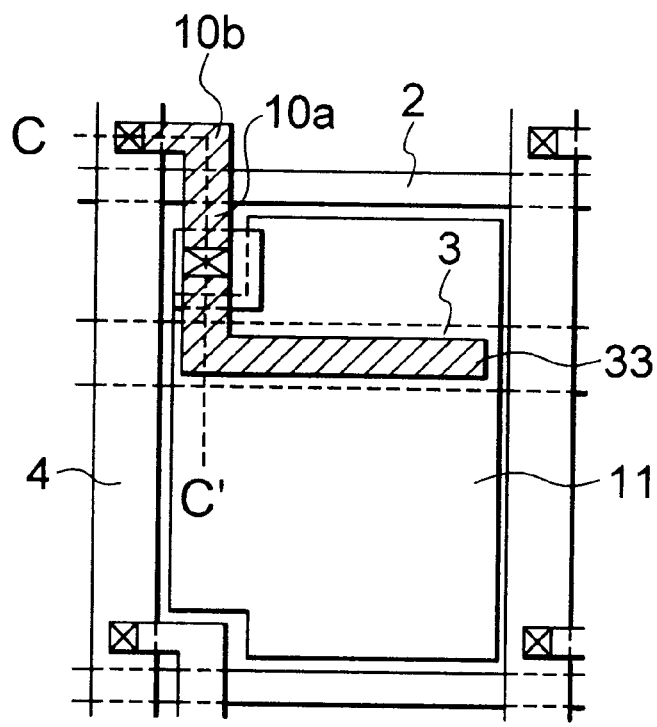
FIG. 7A and FIG. 7B are a plan view and a C–C' cross section, respectively, showing, by exploding, a pixel portion of a first substrate of the liquid crystal display device of the third embodiment.
Figure 7B:
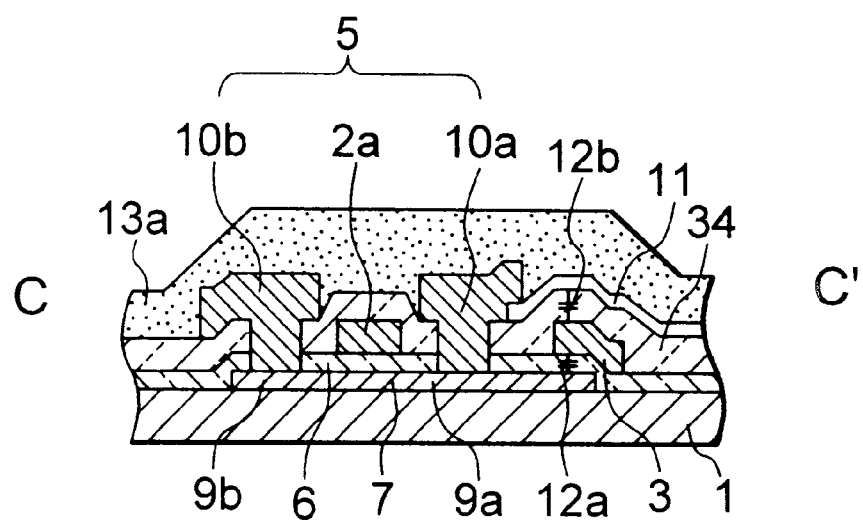

FIGS. 6A and 6B are diagrams showing a rough constitution of a third embodiment of a liquid crystal display device of the present invention. FIG. 6A is a plan view and FIG. 6B is a cross section. Further, FIGS. 7A and 7B are diagrams showing in an exploded manner a pixel portion of the first substrate of the liquid crystal display device. FIG. 7A is a plan view and FIG. 7B is a C–C' cross-sectional view of the pixel portion shown in FIG. 7A.

On a first substrate 1 consisting of glass or the like, a channel layer 7 consisting of a polycrystalline Si film, contact layers 9a and 9b, and a storage capacitance forming portion 33 are formed. On these of the channel layer 7, the contact layers 9a and 9b, and the storage capacitance forming portion 33, a gate insulating film 6 consisting of $SiO_2$, $Ta_2O_5$ or the like is formed. In a region of the channel layer 7, on the gate insulating film 6, a gate electrode 2a consisting of metal such as Al, Al—Y alloy, Al—Nd alloy, Mo—W alloy or the like is formed, and in the same layer therewith a gate line 2 is formed in parallel.

The contact layers 9a and 9b and the storage capacitance forming portion 33 are formed by injecting the V group element such as P or As by ion doping method with the gate electrode 2a as a mask, to be low resistance layers. Further, in the storage capacitance forming portion 33, on the gate insulating film 6, a storage capacitance line 3 consisting of metal such as Al, Al—Y alloy, Al—Nd alloy, Mo—W alloy, or the like is formed.

Further, on the gate line 2, the gate electrode 2a and the storage capacitance line 3, an interlayer insulating film 34 consisting of $SiO_2$, $SiN_x$ or the like is formed. On the interlayer insulating film 34, to be orthogonal with the gate line 2, a signal line 4 consisting of metal such as Al, Al—Y alloy, Al—Nd alloy or the like is formed. Simultaneously, a source electrode 10a and a drain electrode 10b are formed, respectively, and connected to contact layers 9a and 9b through a through hole of the interlayer insulating film 34. Further, also a pixel electrode 11 consisting of a transparent conductive film such as an ITO is formed on the interlayer insulating film 34 and connected to the source electrode 10a.

Thus, in the vicinity of the intersection of the gate line 2 and the signal line 4, a switching element 5 consisting of a TFT is formed in matrix.

Between the storage capacitance line 3 and the storage capacitance forming portion 33, a first storage capacitance 12a is formed, and between the storage capacitance line 3 and the pixel electrode 11, a second storage capacitance 12b is formed. Further, on these of the source electrode 10a, the drain electrode 10b, the pixel electrode 11, and the interlayer insulating film 34, an alignment film 13 a consisting of polyimide or the like is disposed. Incidentally, in such a pixel structure, the magnitude of storage capacitance becomes a sum of the first storage capacitance 12a and the second storage capacitance 12b, accordingly, can take a larger value than the embodiment 1.

On the second substrate 14 that is disposed opposite to the first substrate and consisting of glass or the like, a CF layer 15 and a counter electrode 16 disposed thereon 15 and consisting of a transparent conductive film such as ITO are disposed, respectively, further on the counter electrode 16, an alignment film 13b consisting of polyimide or the like is disposed. Between the switching element 5 and the pixel electrode 11 that are disposed on the first substrate 1, and the counter electrode 16 disposed on the second substrate 14, liquid crystal 17 such as a ferroelectric liquid crystal FLC, anti-ferroelectric liquid crystal AFLC, DHF, TFLC, or the like that has a spontaneous polarization that is inherent or induced by application of an electric field is interposed. Further, on the external surfaces of the first and second substrates 1 and 14, polarizers 18a and 18b are stuck.

Further, the gate line 2 and the signal line 4 are connected to periphery driving circuits such as a gate line driver 21, a signal line driver 22 or the like, respectively. These periphery driving circuits have a channel layer consisting of a polycrystalline Si film and a switching element formed on the first substrate 1 simultaneously with the switching element 5 of the pixel portion.

Incidentally, as a driving method of a liquid crystal panel, there are a dot-sequential scanning method with dividing drive, and a line-sequential driving method. The gate selection time $T_{gon}$ is mostly 1 $\mu$s for the former case and is approximately 15 to 64 $\mu$s for the latter case. In the case of the line-sequential driving method being carried out, as the periphery driving circuits such as the gate line driver 21, the signal line driver 22 or the like, in the place of the switching element employing the polycrystalline Si film, an integrated circuit formed on a single crystal Si may be employed.

In order to evaluate the effect of contrast improvement owing to the liquid crystal display element based on the present invention, with various kinds of liquid crystal materials and pixel structures of different performance, the liquid crystal display devices having the aforementioned structures are prepared and evaluated of their performances. Their results are shown in Table 3 and Table 4.

TABLE 3

| Example | Electrostatic capacitance of liquid crystal $C_{LC}$ (F) | Storage capacitance $C_s$ (F) | Spontaneous polarization $P_s$ (C/m$^2$) | Gate selection time $T_{gon}$ (s) | Electric current $I_{on}$ (A) | $P_s \times A + (C_s + C_{LC}) \times E/2 \times T_{gon}$ (A) |
|---|---|---|---|---|---|---|
| 1 | $0.3 \times 10^{-12}$ | $1.2 \times 10^{-12}$ | $2.0 \times 10^{-3}$ | $1.0 \times 10^{-6}$ | $3.0 \times 10^{-5}$ | $2.2 \times 10^{-5}$ |
| 2 | $0.3 \times 10^{-12}$ | $2.0 \times 10^{-12}$ | $2.0 \times 10^{-3}$ | $1.0 \times 10^{-6}$ | $3.0 \times 10^{-5}$ | $2.4 \times 10^{-5}$ |
| 3 | $0.3 \times 10^{-12}$ | $1.2 \times 10^{-12}$ | $2.0 \times 10^{-3}$ | $1.0 \times 10^{-6}$ | $3.0 \times 10^{-5}$ | $2.2 \times 10^{-5}$ |
| 4 | $0.3 \times 10^{-12}$ | $2.0 \times 10^{-12}$ | $2.0 \times 10^{-3}$ | $1.0 \times 10^{-6}$ | $3.0 \times 10^{-5}$ | $2.4 \times 10^{-5}$ |
| 5 | $0.1 \times 10^{-12}$ | $0.8 \times 10^{-12}$ | $1.1 \times 10^{-3}$ | $1.0 \times 10^{-6}$ | $3.0 \times 10^{-5}$ | $1.2 \times 10^{-5}$ |
| 6 | $0.1 \times 10^{-12}$ | $1.2 \times 10^{-12}$ | $1.1 \times 10^{-3}$ | $1.0 \times 10^{-6}$ | $3.0 \times 10^{-5}$ | $1.3 \times 10^{-5}$ |
| 7 | $0.1 \times 10^{-12}$ | $2.0 \times 10^{-12}$ | $1.1 \times 10^{-3}$ | $1.0 \times 10^{-6}$ | $3.0 \times 10^{-5}$ | $1.5 \times 10^{-5}$ |
| 8 | $0.1 \times 10^{-12}$ | $0.8 \times 10^{-12}$ | $1.1 \times 10^{-3}$ | $0.6 \times 10^{-6}$ | $3.0 \times 10^{-5}$ | $2.0 \times 10^{-5}$ |
| 9 | $0.1 \times 10^{-12}$ | $1.2 \times 10^{-12}$ | $1.1 \times 10^{-3}$ | $0.6 \times 10^{-6}$ | $3.0 \times 10^{-5}$ | $2.2 \times 10^{-5}$ |
| 10 | $0.1 \times 10^{-12}$ | $2.0 \times 10^{-12}$ | $1.1 \times 10^{-3}$ | $0.6 \times 10^{-6}$ | $3.0 \times 10^{-5}$ | $2.5 \times 10^{-5}$ |
| 11 | $0.1 \times 10^{-12}$ | $0.4 \times 10^{-12}$ | $2.0 \times 10^{-4}$ | $0.6 \times 10^{-6}$ | $3.0 \times 10^{-5}$ | $5.1 \times 10^{-6}$ |
| 12 | $0.1 \times 10^{-12}$ | $0.8 \times 10^{-12}$ | $2.0 \times 10^{-4}$ | $0.6 \times 10^{-6}$ | $3.0 \times 10^{-5}$ | $6.8 \times 10^{-6}$ |
| 13 | $0.1 \times 10^{-12}$ | $1.2 \times 10^{-12}$ | $2.0 \times 10^{-4}$ | $0.6 \times 10^{-6}$ | $3.0 \times 10^{-5}$ | $8.4 \times 10^{-6}$ |
| 14 | $1.0 \times 10^{-12}$ | $0.8 \times 10^{-12}$ | $2.4 \times 10^{-3}$ | $1.0 \times 10^{-6}$ | $3.0 \times 10^{-5}$ | $2.6 \times 10^{-5}$ |
| 15 | $1.0 \times 10^{-12}$ | $1.2 \times 10^{-12}$ | $2.4 \times 10^{-3}$ | $1.0 \times 10^{-6}$ | $3.0 \times 10^{-5}$ | $2.7 \times 10^{-5}$ |
| 16 | $1.0 \times 10^{-12}$ | $2.0 \times 10^{-12}$ | $2.4 \times 10^{-3}$ | $1.0 \times 10^{-6}$ | $3.0 \times 10^{-5}$ | $2.9 \times 10^{-5}$ |

TABLE 4

| Example | Electrostatic capacitance of liquid crystal $C_{LC}$ (F) | Storage capacitance $C_s$ (F) | Spontaneous polarization $P_s$ (C/m$^2$) | Gate selection time $T_{gon}$ (s) | Electric current $I_{on}$ (A) | $P_s \times A + (C_s + C_{LC}) \times E/2 \times T_{gon}$ (A) |
|---|---|---|---|---|---|---|
| 1 | $0.3 \times 10^{-12}$ | $1.2 \times 10^{-12}$ | $2.0 \times 10^{-3}$ | $0.6 \times 10^{-6}$ | $3.0 \times 10^{-5}$ | $3.6 \times 10^{-5}$ |
| 2 | $0.3 \times 10^{-12}$ | $2.0 \times 10^{-12}$ | $2.0 \times 10^{-3}$ | $0.6 \times 10^{-6}$ | $3.0 \times 10^{-5}$ | $4.0 \times 10^{-5}$ |
| 3 | $1.0 \times 10^{-12}$ | $0.8 \times 10^{-12}$ | $2.4 \times 10^{-3}$ | $0.6 \times 10^{-6}$ | $3.0 \times 10^{-5}$ | $4.4 \times 10^{-5}$ |
| 4 | $1.0 \times 10^{-12}$ | $1.2 \times 10^{-12}$ | $2.4 \times 10^{-3}$ | $0.6 \times 10^{-6}$ | $3.0 \times 10^{-5}$ | $4.5 \times 10^{-5}$ |
| 5 | $1.0 \times 10^{-12}$ | $2.0 \times 10^{-12}$ | $2.4 \times 10^{-3}$ | $0.6 \times 10^{-6}$ | $3.0 \times 10^{-5}$ | $4.9 \times 10^{-5}$ |

Here, as the value of the sum of the first storage capacitance 12a and the second storage capacitance 12b, 0.4, 0.8, 1.2, and 2.0 (pF) are selected. Incidentally, Table 3 shows data of the liquid crystal display elements satisfying the condition of the equation (6) among the liquid crystal display elements that satisfy the condition of the equation (1). Further, Table 4 shows, for comparison purpose, data of the liquid crystal display elements that do not satisfy the condition of the equation (6) among the liquid crystal display elements that satisfy the condition of the equation (1).

The size of one pixel is 100 $\mu$m×300 $\mu$m, and an area A of pixel electrode for one pixel is $1.8 \times 10^{-8}$ m². A cell gap is set at 2 $\mu$m by scattering spherical pearls 19 of a diameter of 2 $\mu$m on an alignment layer 13b. Further, an electric voltage E applied between the pixel electrode 11 and the counter electrode 16 is 5 V. As a liquid crystal material 17, such as LIXON CS2005 of a product of Chisso Co, FLC9807 of a product of Roche Ltd or the like is employed.

The liquid crystal display elements satisfying the condition of the equation (6) shown in Table 3 showed contrast values of 50 or more, resulting in an excellent image quality. On the contrary, liquid crystal display elements that do not satisfy the condition of the equation (6) shown in Table 4 showed the contrast values of 30 to 50.

Also in this embodiment, as identical as the embodiment 1, an equivalent circuit simulation was carried out. That is, with $C_{LC}=0.3\times10^{-12}$ F, $P_s=2.0\times10^{-3}$ C/m², and $A=1.8\times10^{31.5}$ m², for a pixel electrode potentials of 0 V, the signal was applied under the condition of E=5 V and $T_{gon}=3\times10^{-5}$ s. The liquid crystal molecules rotate to be an equilibrium. The potentials of the pixel electrode at the time of equilibrium are shown in FIG. 8.

Here, the maximum value $I_{on}$ of the current that flows between the source electrode and the drain electrode of a switching element consisting of a TFT was set at $1.0\times10^{-6}$ A and $0.6\times10^{-6}$ A, and the value of the storage capacitance ($C_s$) was varied in the range of from 0.4 to 2 pF.

Figure 8:
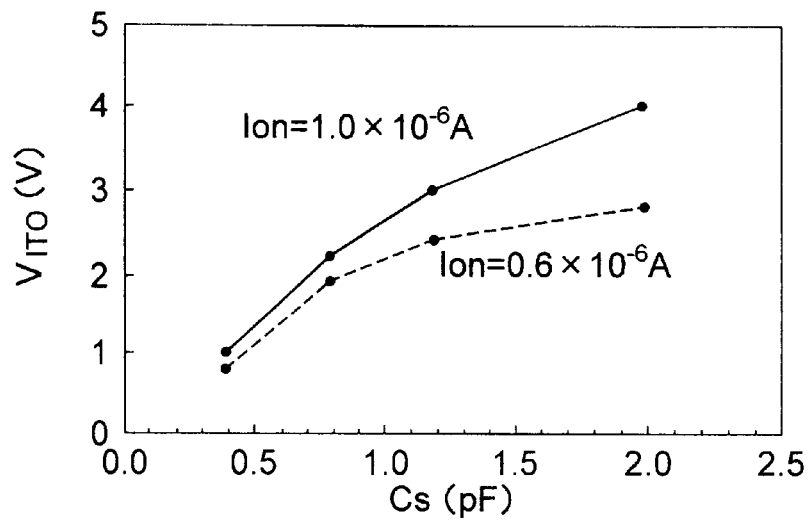
FIG. 8 is a diagram showing, in the third embodiment, a pixel electrode potential when an equilibrium is attained after a signal is applied.
Figure 9:
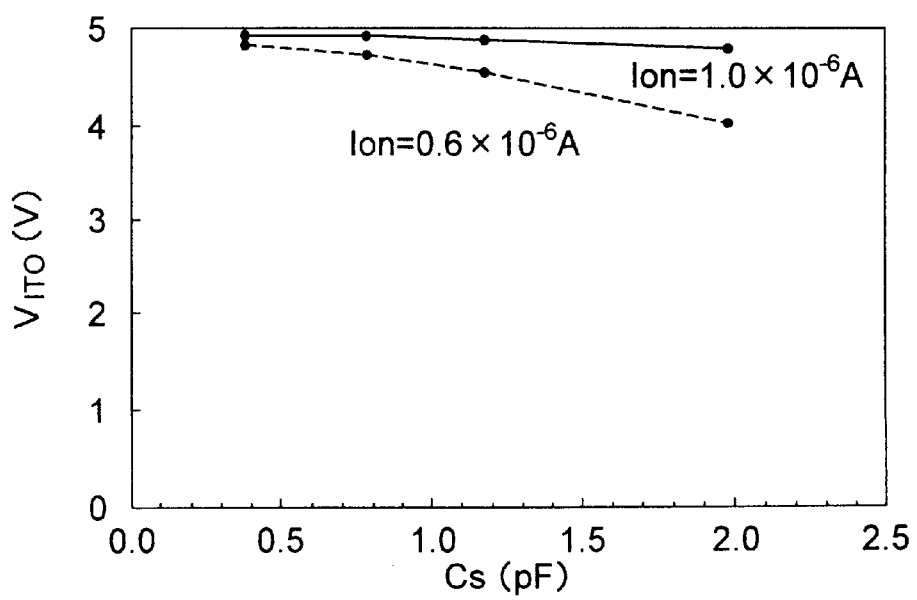
FIG. 9 is a diagram showing, in the third embodiment, a pixel electrode potential immediate after a switching element is turned off.

From FIG. 8, in the case of $I_{on}$ being $0.6\times10^{-6}$ A, compared with the case of $1.0\times10^{-6}$ A, the potential of the pixel electrode under equilibrium is found to be lower. Further, in this simulation, the potential of the pixel electrode immediately after the switch of the switching element consisting of a TFT is turned off are shown in FIG. 9. From FIG. 9, in the case of $I_{on}$ being $0.6\times10^{-6}$ A, compared with the case of $1.0\times10^{-6}$ A, the potential of the pixel electrode is found to be lower. This decrease of the potential occurs because the $I_{on}$ is not sufficiently large in the equivalent circuit compared with a load-carrying capacity therein the switching element consisting of the TFT has to address.

That is, in FIG. 8, in the case of $I_{on}$ being $0.6\times10^{-6}$ A, compared with the case of $1.0\times10^{-6}$ A, the potential of the pixel electrode is low. This is because, due to insufficiency of potential addressing capability to the pixel electrode by the switching element consisting of the TFT, during $T_{gon}$, the potential of the pixel electrode does not build up sufficiently. Therefore, even in the equilibrium after rotation of the liquid crystal molecule, the potential of the pixel electrode is low.

When the storage capacitance $C_s$ is set at $1.0\times10^{-12}$ F (=1.0 pF) and other conditions are the same with the above conditions, the magnitude of the $I_{on}$ at which the equal sign of the equation (6) holds is $0.7\times10^{-6}$ A. Also from the simulation, it is confirmed that, under the condition where the equation (6) holds, the contrast becomes high.

Further, in the liquid crystal display devices satisfying the equation (6), the TFT that is a switching element was not susceptible to the electrostatic destruction.

Embodiment 4

FIG. 10 is a diagram showing a rough constitution of a fourth embodiment of a liquid crystal display device of the present invention.

This liquid crystal display device is constituted by adding a frame memory 35 for storing display signal temporarily to the constitution of an active-matrix-driven liquid crystal display device that employs a conventional nematic liquid crystal.

That is, a gate line driver 21 is directly connected to a display timing controller 36, and the signal line driver 22 is connected to the display timing controller 36 through a frame memory 35. Here, for the gate line driver 21 and the signal line driver 22, for instance, an integrated circuit formed on a single crystal Si can be employed.

In this liquid crystal display device, display signal and synchronizing signal are inputted to the display timing controller 36, according to the inputted synchronizing signal, from the display timing controller 36 to the frame memory 35 and the gate line driver 21, the display signal and scanning signal are supplied, respectively. To the frame memory 35, the display signal for one frame is recorded, and to the signal line driver 22, display signal is supplied. Thus, the liquid crystal display element 37 is driven by the gate line driver 21 and the signal line driver 22.

The constitution of the liquid crystal display element is one that is shown in embodiment 2.

Such a liquid crystal display device is driven in the following manner.

As a method for driving a liquid crystal display element, in which liquid crystal having a spontaneous polarization is interposed between the pixel electrodes disposed in a matrix formation and the counter electrode, with a circuit configuration shown in FIG. 3, the case of having three sub-frames will be described with reference to FIG. 11.

In FIG. 11, (a), (b), (c), and (d) show gate line potential, signal line potential, addressing potential, and pixel potential, respectively. As shown in FIG. 11(a), one frame time $T_{frame}$ (16.67 ms) is divided into three sub-frame times $T_{sub1}$, $T_{sub2}$ and $T_{sub3}$. During each sub-frame time, the gate signal turns on once. The respective gate selection times are $T_{gon1}$, $T_{gon2}$ and $T_{gon3}$. As a method of scanning, the line-sequential scanning method is adopted.

In this case, the sum of $T_{gon1}$, $T_{gon2}$ and $T_{gon3}$ ($T_{gon}=T_{gon1}+T_{gon2}+T_{gon3}$) is determined by the time obtained by dividing the time, which is obtained by subtracting a blanking time $T_b$ from one frame time $T_{frame}$, by the number of the gate lines Ng, and is approximately equal to the gate selection time. In the case of SVGA, since Ng=600 and $T_{gon}=27.7$ $\mu$s, they need only be set as, for instance, $T_{gon1}=T_{gon2}=6$ $\mu$s, and $T_{gon3}=15.7$ $\mu$s. In this case, since $T_{sub1}=T_{sub2}=3.6$ ms, they become longer than the response time of the liquid crystal.

Figure 11A:
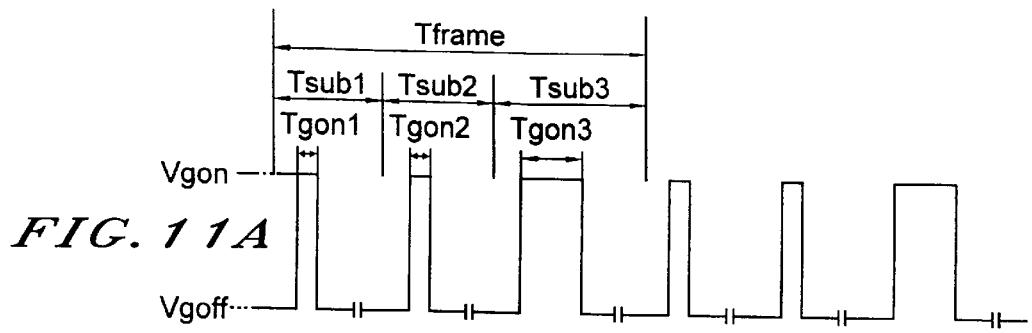
FIG. 11 is a diagram showing waveforms of driving voltages of a liquid crystal display element in the fourth embodiment.
Figure 11B:
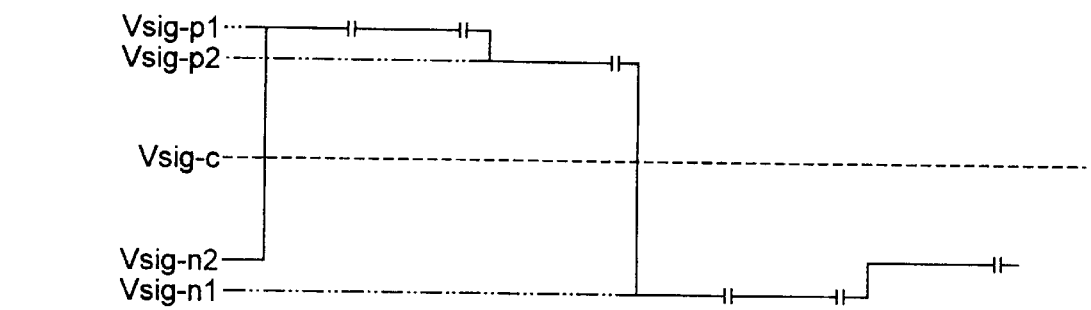
Figure 11C:
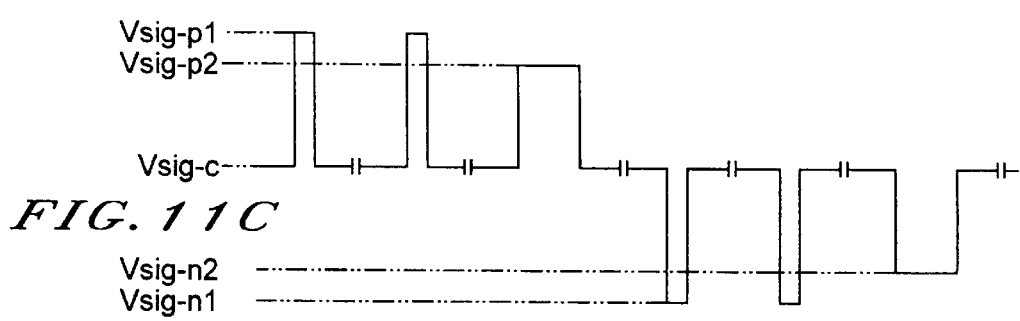

The signal line potential, as shown in FIG. 11(b), changes its polarity for every frame time with $V_{sig-c}$ as a center. The signal line voltage is applied so that the voltage larger than a desired voltage is applied to liquid crystal in the first and the second sub-frames, and only in the third sub-frame that is the final sub-frame, the desired voltage is applied. When the desired voltage in the positive polarity is $V_{sig-p2}$, and the desired voltage in the negative polarity is set $V_{sig-n2}$, as shown in FIG. 11(b), in the third frame that is a final frame, for the positive polarity, $V_{sig-p2}$ is applied, and for the negative polarity, $V_{sig-n2}$ is applied. However, in the first and the second sub-frames, for the positive polarity and negative polarity, $V_{sig-p1}$ ($V_{sig-p1}>V_{sig-p2}$) and $V_{sig-n1}$ ($V_{sig-n1}<V_{sig-n2}$) are applied to the signal line, respectively. In this case, the addressing voltage becomes as shown in FIG. 11(c).

Figure 11D:
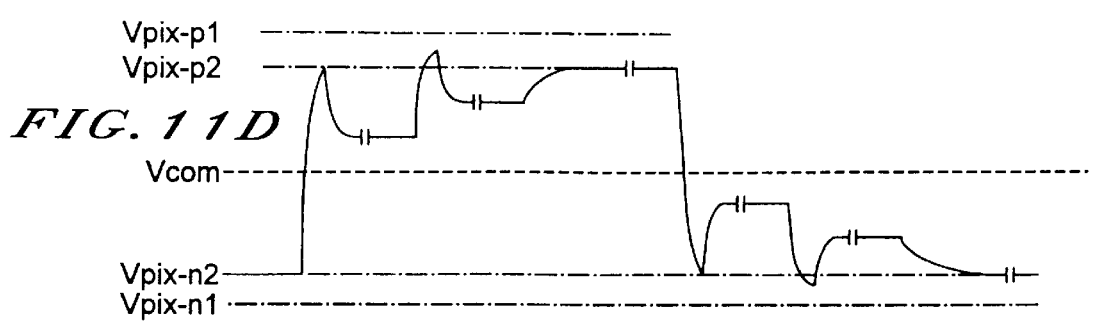

When driven like this, the pixel potential varies as shown in FIG. 11(d). In the first and second sub-frames, so as to apply the voltage larger than the desired voltage to the liquid crystal, the voltage is applied to the signal line. Thereby, in these sub-frames, the liquid crystal during the selection time period is enhanced to change its alignment. At the same time, in the storage capacitance and the dielectric response portion of the fast component of the capacitance of the liquid crystal, more charges are stored. Therefore, upon completion of the selection time period, further more charges can be moved to the dielectric response portion of slow component to enhance the alignment of the liquid crystal.

Therefore, display of fast response speed was obtained.

Embodiment 5

This liquid crystal display device is constituted by adding a frame memory for storing display signal temporarily to the constitution of the active-matrix-driven liquid crystal display device that uses a conventional nematic liquid crystal, similarly with the embodiment 4. Further, the peripheral drive circuits such as the signal line driver and the gate line driver are formed on a first substrate simultaneously with the formation of the switching element of the pixel portion.

The liquid crystal display element is constituted in the constitution as shown in embodiment 3, for instance.

Such a liquid crystal display device is driven in the following way.

That is, as shown in FIG. 11(a), one frame time $T_{frame}$ (16.67 ms) is divided into three sub-frame times $T_{sub1}$, $T_{sub2}$, and $T_{sub3}$. During the respective sub-frame times, the gate signal becomes on-state once, and the respective gate selection times become $T_{gon1}$, $T_{gon2}$, and $T_{gon3}$, respectively. Further, as the scanning method of the pixel electrodes, a dot-sequential scanning method is adopted.

In this case, the sum of $T_{gon1}$, $T_{gon2}$, and $T_{gon3}$ ($T_{gon}=T_{gon1}+T_{gon2}+T_{gon3}$) becomes shorter than the case of line-sequential scanning method. Their lengths vary depending on the dividing way. In the case of $T_{gon}=3$ µs, $T_{gon1}=T_{gon2}=0.6$ µs and $T_{gon3}=1.8$ µs will be enough. Since $T_{sub1}=T_{sub2}=3.3$ ms, they are longer than the response time of the liquid crystal.

The potential applied to the signal line, as identical as the drive in embodiment 4, is shown in FIG. 11(b).

When driven in this manner also, the pixel potential varies as shown in FIG. 11(d). In the first and second subframes, the voltage is applied to the signal line so that the voltage larger than the desired voltage is applied to the liquid crystal. Thereby, in these sub-frames, the alignment of the liquid crystal during the selection time is enhanced to change. At the same time, to the storage capacitance and the dielectric response portion of the fast component of the capacitance of the liquid crystal, more charges are stored. Accordingly, after the selection time period, more charges can be moved to the dielectric response portion of the slow component, to accelerate the alignment of the liquid crystal.

Therefore, the display of high speed response can be obtained.

Embodiment 6

In this embodiment, the case where a contribution due to the addressing capability of a TFT is removed is assumed.

With a driving waveform of an applied voltage of 5 V and a pulse width of 34 µs, when a cell having a saturation voltage $V_{sat}$ of 2.5 V, an electrostatic capacitance $C_{LC}$ in saturation alignment of 2 nF, and a response speed of 0.3 ms, and a storage capacitance $C_s$ of 3 nF is driven, if the electrodes sandwiching the liquid crystal are the same voltages at the initial state, from the equation (1), for the value of the spontaneous polarization $P_s$ of $1.62\times10^{-4}$ C/m² (=16.2 nC/cm²) or less, the brightness at equilibrium after application of the pulse becomes the maximum.

These results were checked with actual test cells. The size of the pixel electrode of the test cell was 1 mm square ($1\times10^{-6}$ m²), the distance between electrodes sandwiching the liquid crystal was 2 µm, and a storage capacitance $C_s$ of 2 nF is connected in parallel with the cell. The polarizers were disposed to be crossed Nicols. A parallel light of 2000 nit was irradiated from the one side of the cell, and on the other side thereof, a photodetector for measuring the intensity of the transmitted light was disposed.

To this cell, a threshold-less anti-ferroelectric liquid crystal material, which has a saturation voltage of approximately 2.5 V, an electrostatic capacitance $C_{LC}$ in the saturation alignment of approximately 2 nF, and a response speed of approximately 0.3 ms when the saturation voltage was applied, was injected to prepare a test cell. With an applied voltage E of 5 V and an applied pulse of a width of $3.4\times10^{-5}$, for the liquid crystal materials, three materials A, B, and C of which values of spontaneous polarization $P_s$ are $1.0\times10^{-4}$, $2.0\times10^{-4}$, and $3.0\times10^{-4}$ C/m², respectively, were employed. The saturation voltages and the maximum brightnesses that were the brightnesses in saturation were obtained by applying the voltage for the time duration enough longer than the response time of the liquid crystal.

With these cells, the relationship between the spontaneous polarization and the brightness at the equilibrium were studied and the results are shown in Table 5. Incidentally, at the initial state preceding application of the pulse, the electrodes sandwiching the liquid crystal were made the equal potential. Among these cells, in the liquid crystal cell employing A, the brightness at the equilibrium was the maximum brightness. However, in the liquid crystal cell employing B or C, the brightness at the equilibrium was lower than the maximum brightness.

TABLE 5

| Liquid crystal material | Spontaneous polarization $P_s$ (C/m²) | F | Display state |
| --- | --- | --- | --- |
| A | $1.0 \times 10^{-4}$ | 0.62 | good |
| B | $2.0 \times 10^{-4}$ | 1.23 | poor |
| C | $3.0 \times 10^{-4}$ | 1.85 | poor |

Embodiment 7

A liquid crystal display device of a seventh embodiment has a rough constitution shown in FIG. 6A and FIG. 6B. Further, a pixel portion of a first substrate is shown in FIG. 12 by exploding.

On a first substrate 1 consisting of glass or the like, a wiring consisting of a gate line 2, a storage capacitance line 3 and a signal line 4 is formed. The gate line 2 and storage capacitance line 3 are formed as the same layer and consisting of a metal such as Al, Al—Y alloy, Al—Nd alloy, Mo—W alloy or the like. The signal line 4 is formed orthogonally to the gate line 2, and consisting of a metal such as Al, Al—Y alloy, Al—Nd alloy or the like.

Then, in the neighborhood of an intersection of the gate line 2 and the signal line 4, a switching element 5 consisting of a TFT is formed. A gate electrode thereof is formed as the same layer with the gate line 2 and connected to the gate line 2. The channel layer of the switching element 5 is consisting of a polycrystalline Si film and connected, through a contact layer, to a signal line 4 and a pixel electrode 11 consisting of a transparent conductive film such as ITO or the like. The storage capacitance line 3 is connected to a storage capacitance electrode 30 consisting of a metal or silicon of low resistance, and forms a storage capacitance between with the pixel electrode 11. Further, on the pixel electrode 11, an alignment film 13a consisting of polyimide or the like is disposed.

On a second substrate 14 consisting of such as glass or the like and disposed opposite to the first substrate 1, a CF layer 15, and a counter electrode 16 consisting of a transparent conductive film such as ITO and formed on the CF layer 15 are disposed, and further on the counter electrode 16, an alignment film 13b consisting of polyimide or the like is disposed. A cell gap is set at 2 μm by scattering spherical pearls 19 of a diameter of 2 μm on the alignment film 13b. Between the switching element 5 and the pixel electrode 11 disposed on the first substrate 1, and the counter electrode 16 disposed on the second substrate 14, a threshold-less antiferroelectric liquid crystal 17 is interposed. Further, on the exterior surfaces of these first and second substrates 1 and 14, polarizers 18a and 18b are stuck.

Further, the gate line 2 and the signal line 4 are connected to peripheral drive circuits such as a gate line driver 21, a signal line driver 22 or the like. These peripheral drive circuits have switching elements formed on the first substrate 1 simultaneously with the switching elements 5 of the pixel portions, and the channel layers thereof are composed of a polycrystalline Si film. Incidentally, for these peripheral drive circuits, instead of the switching element employing the polycrystalline Si film, an integrated circuit formed on a single crystal Si can be employed.

The number of the wiring disposed in matrix, for the signal line 4 of longitudinal direction, was 640×3 (RGB) lines, and for the gate line 2 of transversal direction, was 480 lines, respectively. The disposition period of the adjacent gate lines 2 was 300 μm, and the disposition period of the signal lines 4 was 100 μm. In this constitution, the area A of the pixel electrode 11 was approximately $2 \times 10^{-10}$ m².

To the gate lines 2 and the signal lines 4 of a liquid crystal display device of such a structure, the voltage waveforms such as shown in FIG. 13 were applied. Incidentally, in FIG. 13, (a) and (b) denote the voltage applied to the gate line and the voltage applied to the signal line, respectively.

The frame period $T_{frame}$ with which the signal is applied to the gate is $1.67 \times 10^{-2}$ s (1/60 s). The gate selection time $T_{gon0}$ is $3.4 \times 10^{-5}$ s (34 μs), the reset selection time $T_r$ of the former half of which is $2.0 \times 10^{-5}$ s (20 μs), and the $T_{gon}$ of the latter half is $1.4 \times 10^{-5}$ s (14 μs).

The voltage applied to the signal line becomes the voltage corresponding to the counter electrode potential $V_{com}$ during the period of $T_r$, and the addressing voltage corresponding to the display level during the period of $T_{gon}$, and during the period of $T_r$, the resetting to the black-level is carried out. For the gate pulse voltage, $V_{gon}$ is set at +30 V, $V_{goff}$ is set at −10 V, $V_{sig-c}$ is set at 5 V, and $V_{com}$ is set at 5 V, the amplitude of the voltage applied to the signal line is set at 5 V, and storage capacitance is set at 0.5 pF. In this case, the maximum voltage E applied between the pixel electrode and the counter electrode is 5 V. The mobility of the channel layer consisting of the polycrystalline silicon was 100 cm²/(V·s).

In the liquid crystal display device of the aforementioned constitution, under the conditions of the electrostatic capacitance $C_{LC}$ of one pixel in the saturation alignment of the liquid crystal being 0.5 pF, the saturation voltage $V_{sat}$ of the liquid crystal display device being 2.5 V, and application of 5 V between the pixel electrode and the counter electrode, the response time τ of the liquid crystal was approximately 0.6 ms.

In order to obtain the maximum brightness, the above values were substituted in the equation (4), thereby, it is confirmed that the spontaneous polarization $P_s$ is required to be 13.9 nC/cm² or less. Further, by substituting the above values in the equation (8), for the display to be uniform, the spontaneous polarization $P_s$ is found necessary to be 6.9 nC/cm² or less.

Based on this result, with liquid crystal materials of different spontaneous polarization, the liquid crystal display devices were driven. When driven with the liquid crystal material of $P_s$ of 6 nC/cm², the maximum brightness was obtained and the display of excellent in-plane uniformity was obtained. On the other hand, when driven with the liquid crystal material of the $P_s$ of 10 nC/cm², at the portion close to the peripheral circuits and free of the wiring delay, the maximum brightness was obtained. However, the image sticking and flickering occur, resulting in the display of poor in-plane uniformity. Further, when driven with a liquid crystal material of $P_s$ of 20 nC/cm², over the whole plane, only the brightness of lower than the maximum brightness was obtained. Further, the image sticking and the flickering occur, resulting in poor in-plane uniformity.

Embodiment 8

Figure 14:
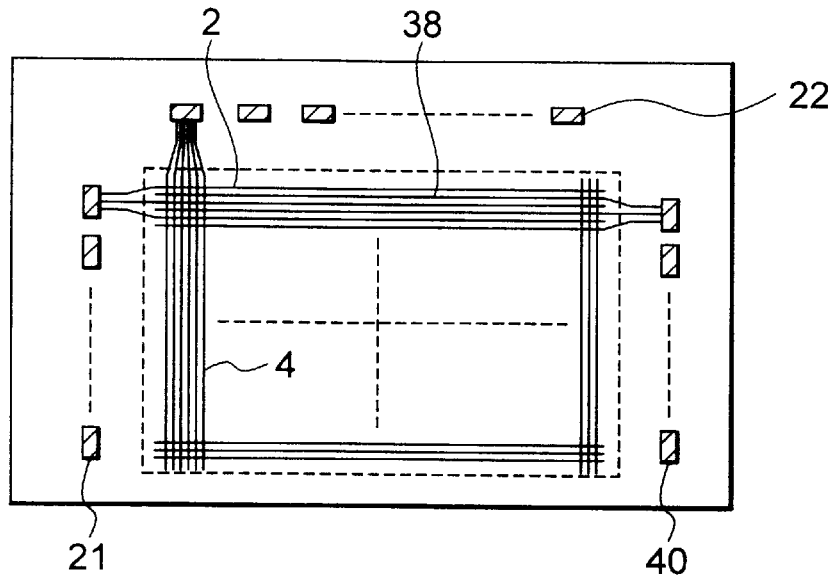
FIG. 14 is a plan view showing a rough constitution of a liquid crystal display device of the eighth embodiment of the present invention.
Figure 15:
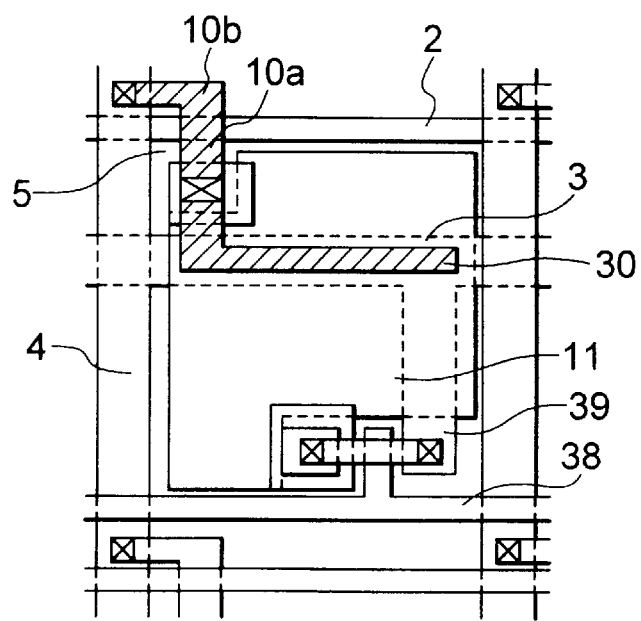
FIG. 15 is a plan view showing, by exploding, a pixel portion of the first substrate of the eighth embodiment of the present invention.

FIG. 14 is a diagram showing a rough constitution of a liquid crystal display device involving an eighth embodiment of the present invention. Further, FIG. 15 shows a pixel portion of the first substrate by exploding.

On a first substrate 1 consisting of a glass or the like, a wiring consisting of a gate line 2, a storage capacitance line 3, a reset line 38 and a signal line 4 is formed. The gate line 2, the storage capacitance line 3 and a reset line 38 are formed in the same layer and consisting of a metal such as Al, Al—Y alloy, Al—Nd alloy, Mo—W alloy or the like. The signal line 4 is formed to be orthogonal to the gate line 2, and consisting of a metal such as Al, Al—Y alloy, Al—Nd alloy or the like.

Then, in the neighborhood of an intersection of the gate line 2 and the signal line 4, a switching element 5 consisting of a TFT is formed for addressing the signal, and a gate electrode thereof is formed as the same layer with the gate line 2 and connected to the gate line 2. The channel layer of the switching element 5 for addressing the signal is consisting of a polycrystalline Si film and connected through the contact layer to the signal line 4 and the pixel electrode 11 consisting of a transparent conductive film such as ITO or the like. The storage capacitance line 3 is connected with the storage capacitance electrode 30 consisting of metal or low resistance silicon, and forms a storage capacitance between with the pixel electrode 11. In addition, another switching element 39 for resetting different from the switching element 5 for signal addressing is formed, and the gate electrode thereof is connected to the reset line 38. The channel layer of the switching element 39 for resetting is consisting of a polycrystalline Si film and connected with the storage capacitance line 3 and the pixel electrode 11 through the contact layer. Further, on the pixel electrode 11, an alignment film consisting of polyimide or the like is disposed.

The opposite substrate is constituted as identical as embodiment 7, therefore the description thereof will be omitted.

Further, the gate line 2, the rest line 38 and the signal line 4 are connected to the peripheral drive circuits such as the gate line driver 21, the reset line driver 40 and the signal line driver 22, respectively. These peripheral drive circuits have the switching elements formed on the first substrate 1 simultaneously with the switching elements 5 of the pixel portions, and the channel layers thereof are composed of a polycrystalline Si film. Incidentally, as the peripheral drive circuits, in the place of the switching element that employs the polycrystalline Si film, an integrated circuit formed on a single crystal Si may be used.

The number of the wiring disposed in matrix, for the signal line 4 of longitudinal direction was 640×3 (RGB) lines, and for the gate line 2 of transversal direction was 480 lines. The disposition period of the adjacent gate lines 2 was 300 $\mu$m, and the disposition period of the signal lines 4 was 100 $\mu$m. In this constitution, the area A of the pixel electrode 11 was approximately $2 \times 10^{-10}$ m$^2$.

To the gate line 2, reset line 38 and the signal line 4 of a liquid crystal display device of such a structure, the voltage waveforms such as shown in FIG. 16 were applied. Incidentally, in FIG. 16, (a) denotes the voltage applied to the gate line, (b) denotes the voltage applied to the rest line, and (c) denotes the voltage applied to the signal line, respectively.

The frame period $T_{frame}$ with which the signal is applied to the gate is $1.67 \times 10^{-2}$ s ($\frac{1}{60}$ s). The gate selection time $T_{gon}$ is $3.4 \times 10^{-5}$ s (34 $\mu$s), and the reset selection time $T_r$ is set at 5 times the $T_{gon}$, that is, $1.7 \times 10^{-4}$ s (170 $\mu$s) and designed to be immediately before the gate selection time.

The voltage addressed to the pixel electrode is the voltage of the storage capacitance line that is identical to the counter electrode potential $V_{com}$ during the period of $T_r$, and the voltage for addressing corresponding to the display level during the period of $T_{gon}$, and during the period of $T_r$, the resetting to the black-level is carried out. For the gate pulse voltage, $V_{gon}$ is +30 V, $V_{goff}$ is −10 V, $V_{sig-c}$ is 5 V, and $V_{com}$ is 5 V, the amplitude of the voltage applied to the signal line is 5 V, and storage capacitance is 0.5 pF. In this case, the maximum voltage E applied between the pixel electrode and the counter electrode becomes 5 V. The mobility of the channel layer consisting of the polycrystalline silicon was 100 cm$^2$/(V·s).

In the liquid crystal display device of the aforementioned constitution, the electrostatic capacitance $C_{LC}$ of one pixel in the saturation alignment of the liquid crystal material was 0.5 pF, the saturation voltage $V_{sat}$ of the liquid crystal display device was 2.5 V, and when 5 V is applied between the pixel electrode and the counter electrode, the response time $\tau$ of the liquid crystal was approximately 0.3 ms.

In order to obtain the maximum brightness, by substituting the above values in the equation (4), it is confirmed that the spontaneous polarization $P_s$ is required to be 16.2 nC/cm$^2$ or less. Further, by substituting the above values in the equation (8), for the display to be uniform, the $P_s$ is found necessary to be 8.1 nC/cm$^2$ or less.

Based on this result, with liquid crystal materials of different spontaneous polarization, the liquid crystal display devices were driven. When driven with the liquid crystal material of $P_s$ of 6 nC/cm$^2$, the maximum brightness was obtained and the display of excellent in-plane uniformity was obtained. On the other hand, when driven with the liquid crystal material of the $P_s$ of 10 nC/cm$^2$, on the portion close to the peripheral circuits and free of the wiring delay, the maximum brightness was obtained. However, the image sticking and flickering occur, resulting in the display of poor in-plane uniformity. Further, when driven with a liquid crystal material of $P_s$ of 20 nC/cm$^2$, over the whole plane, only the brightness of lower than the maximum brightness was obtained. Further, the image sticking and the flickering occur, resulting in poor in-plane uniformity.

Embodiment 9

The liquid crystal display device of the ninth embodiment has the same constitution as the liquid crystal display device of embodiment 7. Accordingly, description thereof is omitted.

A liquid crystal display device having the constitution as described above was driven by frame inversion driving method.

The number of the wiring disposed in matrix, for a signal line of longitudinal direction was 640×3 (RGB) lines, and for a gate line of transversal direction was 480 lines. The disposition period of adjacent gate lines was 300 $\mu$m, and the disposition period of the signal lines was 100 $\mu$m. In this constitution, the area A of a pixel electrode was approximately $2 \times 10^{-10}$ m$^2$.

To the gate line and the signal line of the liquid crystal display device of such the structure, the voltage waveforms such as shown in FIG. 17 were applied. Incidentally, in FIG. 17, (a) denotes the voltage applied to the gate line, and (b) denotes the voltage applied to the signal line, respectively.

The frame period $T_{frame}$ with which the signal is applied to the gate is $1.67 \times 10^{-2}$ s ($\frac{1}{60}$ s). The gate selection time $T_{gon}$ is $3.4 \times 10^{-5}$ s (34 $\mu$s). To the signal line, the voltage that reverses polarity for every $T_{frame}$ is applied, and during the gate selection time Tgon, the voltage corresponding to the display level is written in the pixel. Then, the gate pulse voltages $V_{gon}$, $V_{goff}$, $V_{sig-c}$, $V_{com}$, the amplitude of the voltage applied to the signal line, and storage capacitance are set at +30 V, −10 V, 5 V, 5 V, 5V and 0.5 pF, respectively. In this case, the maximum voltage E applied between the pixel electrode and the counter electrode becomes 5 V. The mobility of the channel layer consisting of the polycrystalline silicon was 100 cm$^2$/(V·s).

In the liquid crystal display device of the aforementioned constitution, when the electrostatic capacitance $C_{LC}$ of one pixel in the saturation alignment of the liquid crystal material is 0.5 pF, the saturation voltage $V_{sat}$ of the liquid crystal display device is 2.5 V, and 5 V is applied between the pixel electrode and the counter electrode, the response time $\tau$ of the liquid crystal was approximately 0.3 ms.

By substituting the above values in the equation (4), to obtain the maximum brightness, it is confirmed that the spontaneous polarization $P_s$ is required to be 16.2 nC/cm$^2$ or less. Further, by substituting the above values in the equation (8), for the display to be uniform, the $P_s$ is found necessary to be 8.1 nC/cm$^2$ or less.

Based on this result, with liquid crystal materials of different spontaneous polarization, the liquid crystal display devices were driven. When driven with the liquid crystal material of $P_s$ of 3 nC/cm$^2$, the maximum brightness was obtained and the display of excellent in-plane uniformity was obtained. On the other hand, when driven with the liquid crystal material of the $P_s$ of 20 nC/cm$^2$, over the whole plane, only the brightness lower than the maximum brightness was obtained. Further, the image sticking and flickering occur, resulting in the display of poor in-plane uniformity.

Embodiment 10

Figure 18:
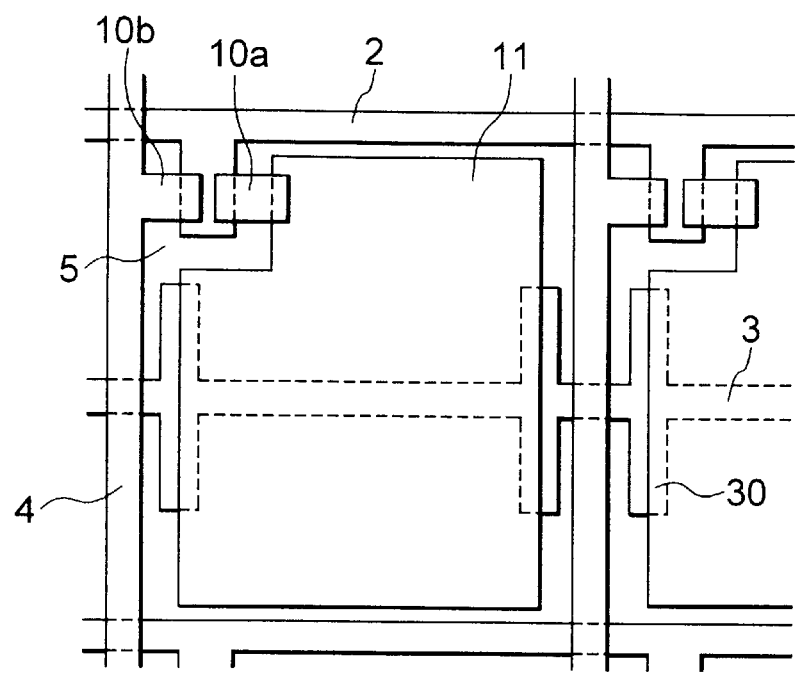
FIG. 18 is a plan view showing, by exploding, a pixel portion of the first substrate of the tenth embodiment of the present invention.

A liquid crystal display device shown in a tenth embodiment has a rough constitution shown FIG. 1A and FIG. 1B. Further, in this embodiment, a plan view of the pixel portion of the first substrate is shown in FIG. 18.

On a first substrate 1 consisting of a glass or the like, a wiring consisting of a gate line 2, a storage capacitance line 3 and a signal line 4 is formed. The gate line 31 and a storage capacitance line 32 are formed as the same layer and consisting of a metal such as Al, Al—Y alloy, Al—Nd alloy, Mo—W alloy or the like. The signal line 4 is formed to be orthogonal to the gate line 2, and consisting of a metal such as Al, Al—Y alloy, Al—Nd alloy or the like.

In the neighborhood of an intersection of the gate line 2 and the signal line 4, a switching element 5 consisting of a TFT is formed, and the gate electrode 2$a$ thereof is formed as the same layer with the gate line 2 and connected to the gate line 2. The channel layer of the switching element 5 is composed of an amorphous Si film and, connected, through a contact layer, to the signal line 4 and the pixel electrode 11 consisting of a transparent conductive film such as ITO. A storage capacitance line 3 is connected to a storage capacitance electrode 30 consisting of a metal or silicon of low resistance and forms a storage capacitance between with the pixel electrode 11. Further, on the pixel electrode 11, an alignment film 13a consisting of such as polyimide is disposed.

On a second substrate 14 consisting of such as a glass or the like and disposed opposite to the first substrate 1, a CF layer 15, and a counter electrode 16 consisting of a transparent conductive film such as ITO and formed on the CF layer 15 are disposed, and further on the counter electrode 16, an alignment film 13b consisting of polyimide or the like is disposed. The cell gap is set at 2 µm by scattering the spherical pearls 19 of a diameter of 2µm on the alignment film 13b. Between the switching element 5 and pixel electrode 11 disposed on the first substrate 1, and the counter electrode 16 disposed on the second substrate 14, a threshold-less anti-ferroelectric liquid crystal 17 is interposed. Further, on the external surfaces of these first and second substrates 1 and 14, the polarizers 18a and 18b are stuck.

Further, the gate line 2 and the signal line 4 are connected to peripheral drive circuits such as a gate line driver 21, a signal line driver 22, respectively. For these peripheral drive circuits, an integrated circuit formed on a single crystal Si can be employed.

The number of the wiring disposed in matrix, for the signal line 4 of longitudinal direction was 640×3 (RGB) lines, and for the gate line 2 of transversal direction was 480 lines. The disposition period of the adjacent gate lines 2 was 300 µm, and the disposition period of the signal lines 4 was 100 µm. In this constitution, the area A of the pixel electrode 11 was approximately $2 \times 10^{-10}$ m².

To the gate line 2 and the signal line 4 of the liquid crystal display device of such a structure, the voltage waveforms such as shown in FIG. 13 were applied. The frame period $T_{frame}$ with which the signal is applied to the gate is $1.67 \times 10^{-2}$ s (1/60 s). The gate selection time $T_{gon0}$ is $3.4 \times 10^{-5}$ (34 µs), the former part thereof, that is, the reset selection time $T_r$, is $2.0 \times 10^{-5}$ s (20 µs), and the latter half thereof $T_{gon}$ is $1.4 \times 10^{-5}$ s (14 µs).

The voltage applied to the signal line is the counter electrode potential $V_{com}$ during $T_r$ and the voltage with which the addressing is carried out corresponding to the display level during $T_{gon}$, and the resetting to the black level is carried out during the $T_r$. Then, the gate pulse voltages $V_{gon}$, $V_{goff}$, $V_{sig-c}$, $V_{com}$, the amplitude of the voltage applied to the signal line, and storage capacitance were set at +30 V, −10 V, 5 V, 5 V, 5V and 0.5 pF, respectively. In this case, the maximum voltage E applied between the pixel electrode and the counter electrode becomes 5 V. The mobility of the channel layer consisting of the amorphous silicon was 0.6 cm²/(V·s).

In the liquid crystal display device of the aforementioned constitution, when the electrostatic capacitance $C_{LC}$ of one pixel in the saturation alignment of the liquid crystal material is 0.5 pF, the saturation voltage $V_{sat}$ of the liquid crystal display device is 2.5 V, and 5 V is applied between the pixel electrode and the counter electrode, the response time τ of the liquid crystal was approximately 0.3 ms.

By substituting the above values in the equation (9), to obtain the maximum brightness, it is confirmed that the spontaneous polarization $P_s$ is required to be 9.2 nC/cm² or less. Further, by substituting the above values in the equation (10), for the display to be homogeneous, the spontaneous polarization $P_s$ is found necessary to be 4.6 nC/cm² or less.

Based on this result, with liquid crystal materials of different spontaneous polarization, the liquid crystal display devices were driven. When driven with the liquid crystal material of $P_s$ of 4 nC/cm², the maximum brightness was obtained and the display of excellent in-plane uniformity was obtained. On the other hand, when driven with the liquid crystal material of the $P_s$ of 6 nC/cm², though the maximum brightness was obtained for the wiring delay-free portion close to the peripheral circuits, the image sticking and flickering occur, resulting in poor in-plane uniformity. Further, when driven with the liquid crystal material of $P_s$ of 20 nC/cm², over the whole plane, only the brightness of lower than the maximum brightness was obtained. Further, the image sticking and flickering occur, resulting in the display of poor in-plane uniformity.

Embodiment 11

Figure 19:
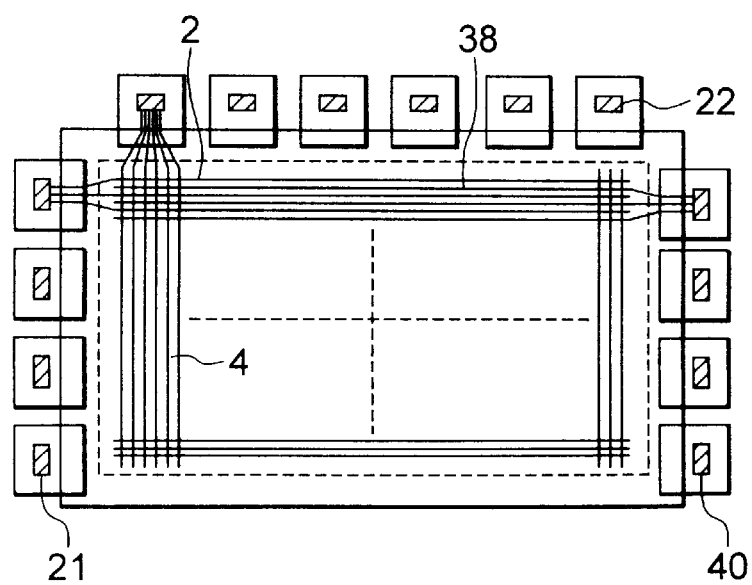
FIG. 19 is a plan view showing a rough constitution of a liquid crystal display device of the eleventh embodiment of the present invention.
Figure 22:
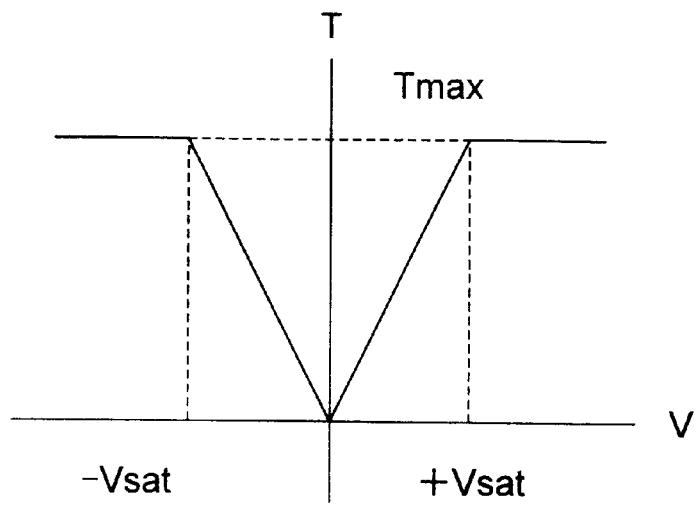
FIG. 22 is a diagram showing the relationship between an electric voltage V applied between electrodes and an intensity T of transmitted light of liquid crystal cell.
Figure 23:
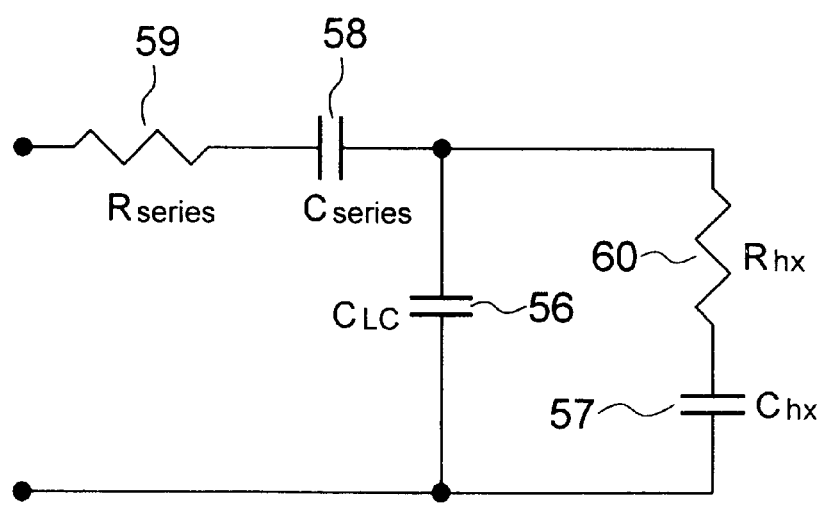
FIG. 23 is a diagram showing an equivalent circuit of a DHFLC.
Figure 30A:
FIG. 30 is a diagram showing electric voltages applied between electrodes and light transmittances when the frame inversion scheme and the reset drive are performed on the liquid crystal display element in which liquid crystal having a spontaneous polarization is sandwiched.
Figure 30B:
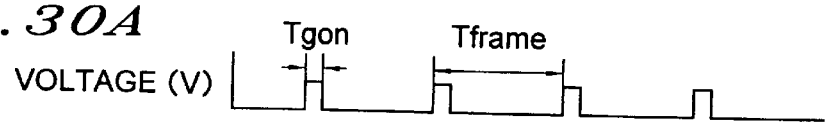
Figure 30C:
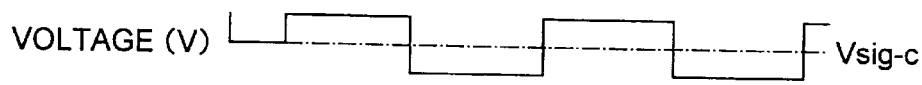
Figure 30D:
Figure 31:
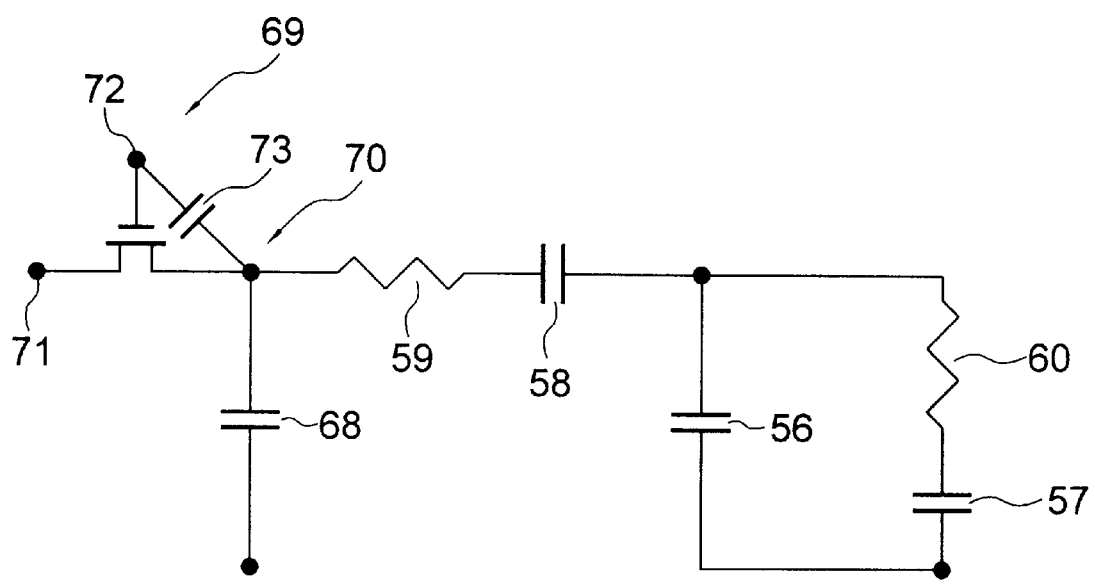
FIG. 31 is a diagram showing an equivalent circuit wherein a storage capacitance and a TFT are added to a liquid crystal display element employing liquid crystal having a spontaneous polarization.
Figure 32A:
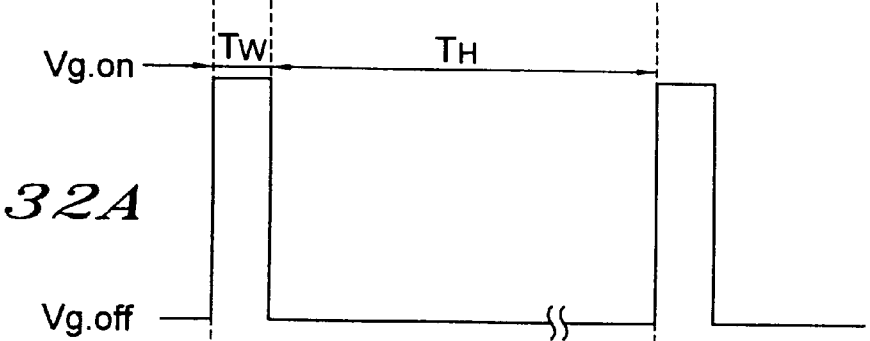
FIG. 32 is a diagram showing respective waveforms of gate voltage, signal voltage and pixel voltage in an active matrix drive scheme.
Figure 32B:
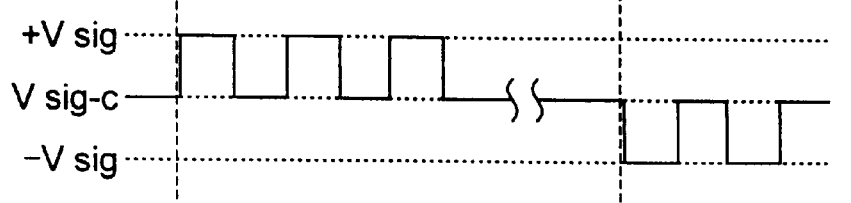
Figure 32C:
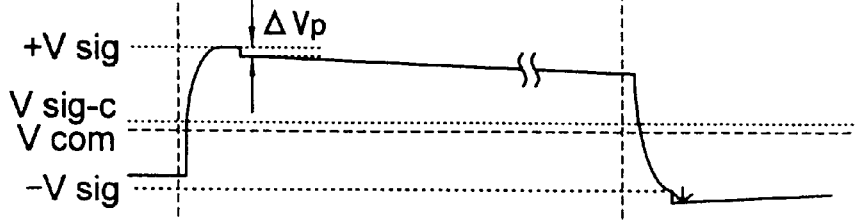
Figure 33:
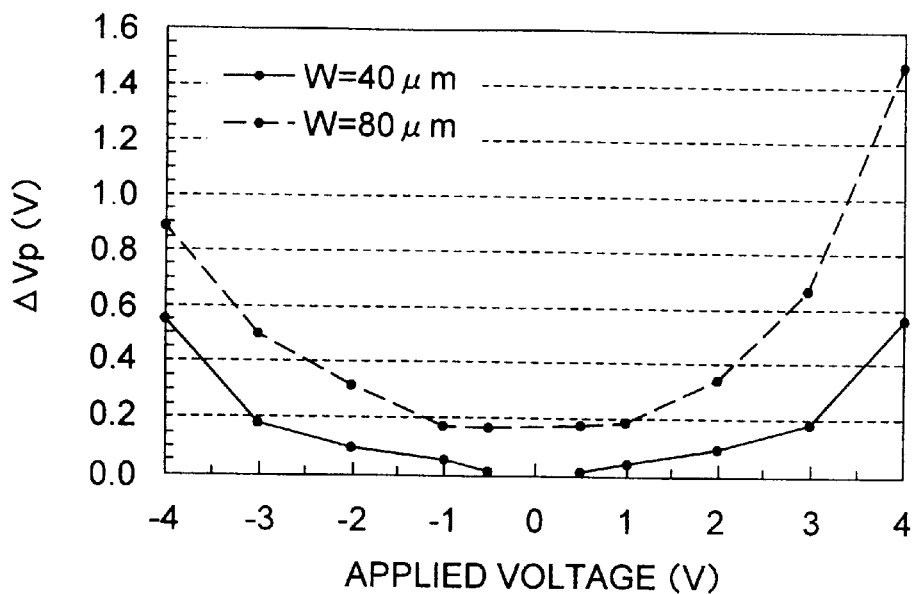
FIG. 33 is a diagram showing a signal voltage dependence of feed-through voltage $\Delta V_P$ in a liquid crystal display device employing liquid crystal having a spontaneous polarization.
Figure 34:
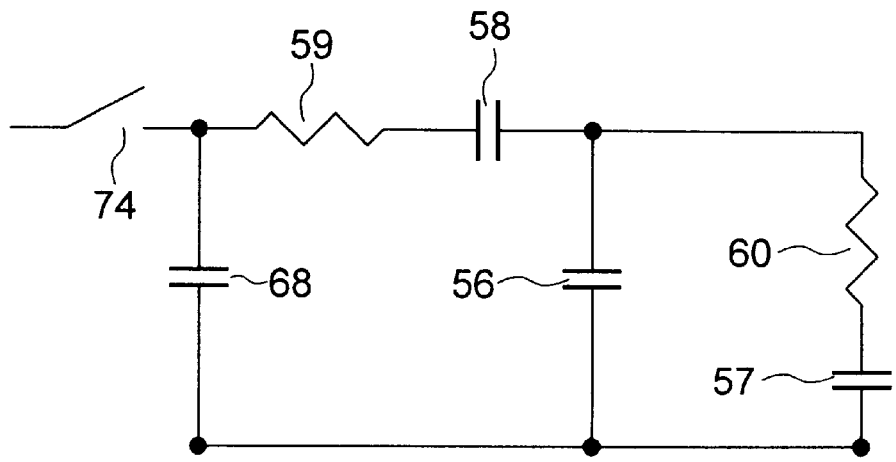
FIG. 34 is a diagram showing an equivalent circuit in which a switch is integrated in a liquid crystal display element employing liquid crystal having a spontaneous polarization.
Figure 35:
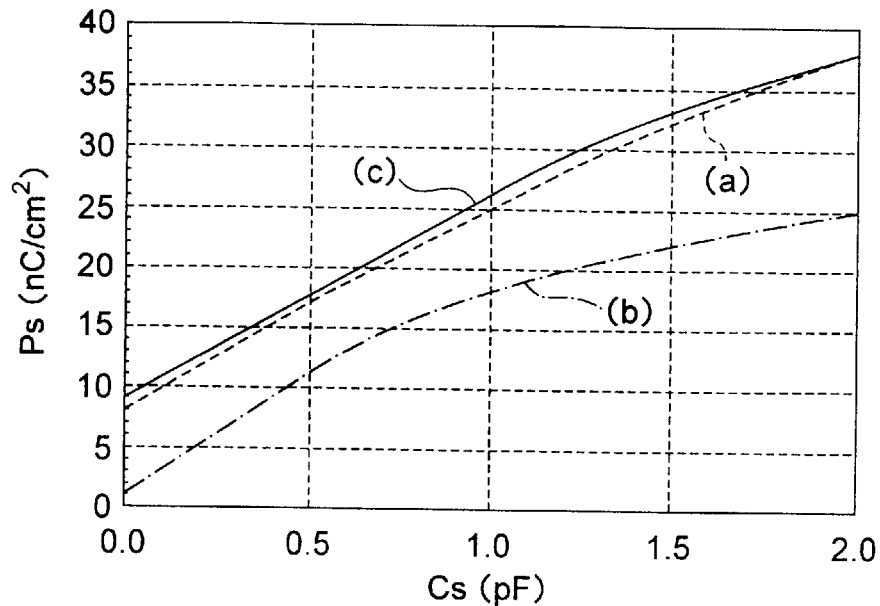
FIG. 35 is a diagram showing, for a liquid crystal display element having a spontaneous polarization and $C_s$ of 0 to 2 pF, the maximum value of $P_s$ for obtaining the maximum brightness in equilibrium after a addressing period is over.
Figure 36:
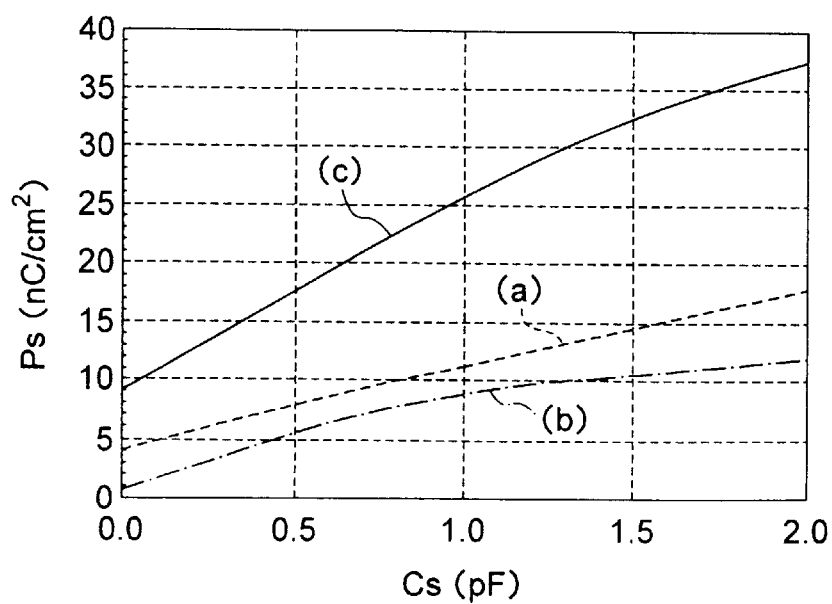
FIG. 36 is a diagram showing, for $C_s$ of 0 to 2 pF, the maximum value of $P_s$ for lowering the difference of electric charges stored at $C_{hx}$ due to existence of a wiring delay to 10% or less.
Figure 37:
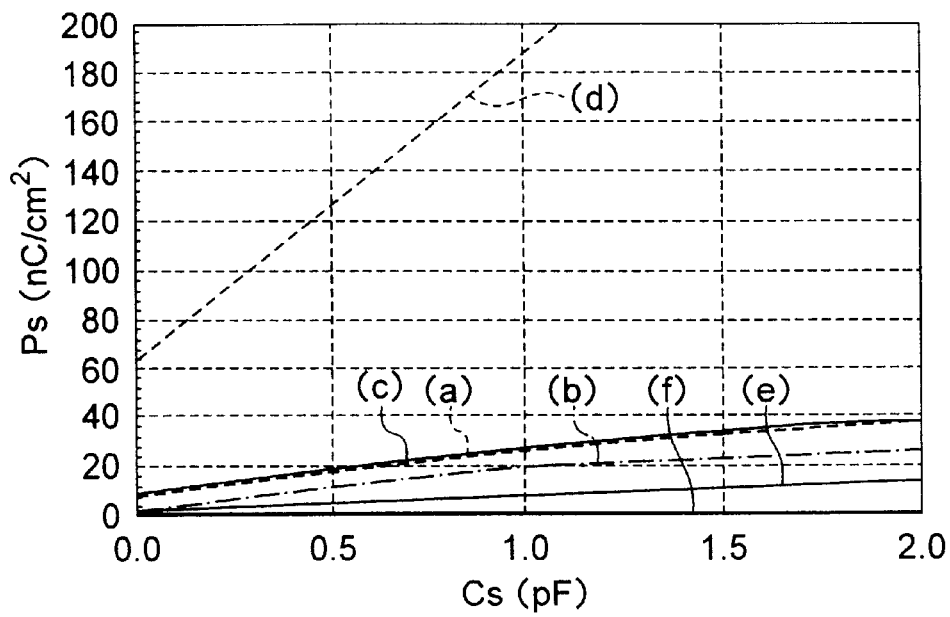
FIG. 37 is a diagram showing FIG. 35 thereto the values of $P_s$ restricted by equation (1), equation (3) or equation (5) are added.
Figure 38:
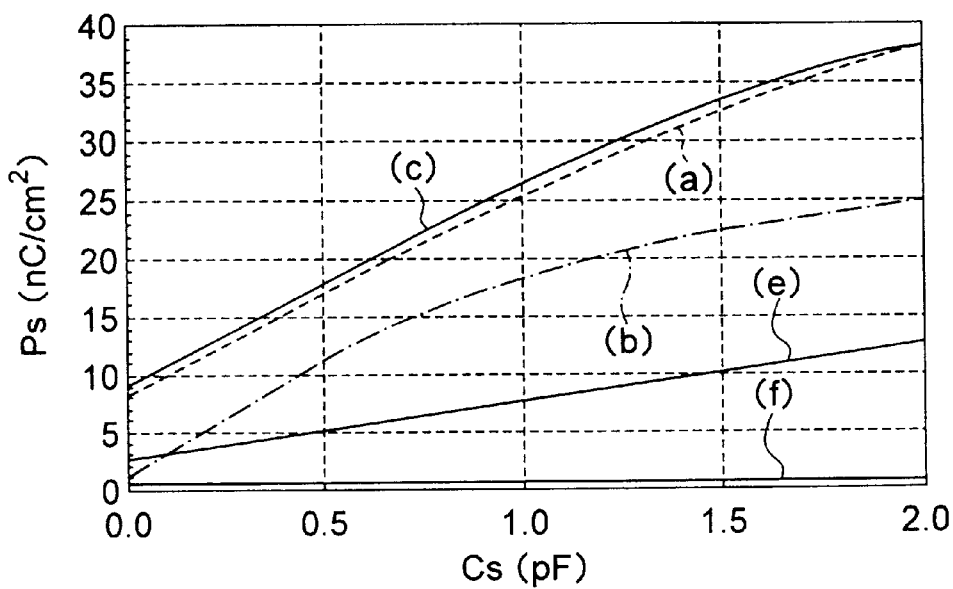
FIG. 38 is a diagram showing FIG. 36 thereto the values of $P_s$ restricted by equation (1), equation (3) or equation (5) are added.
Figure 39:
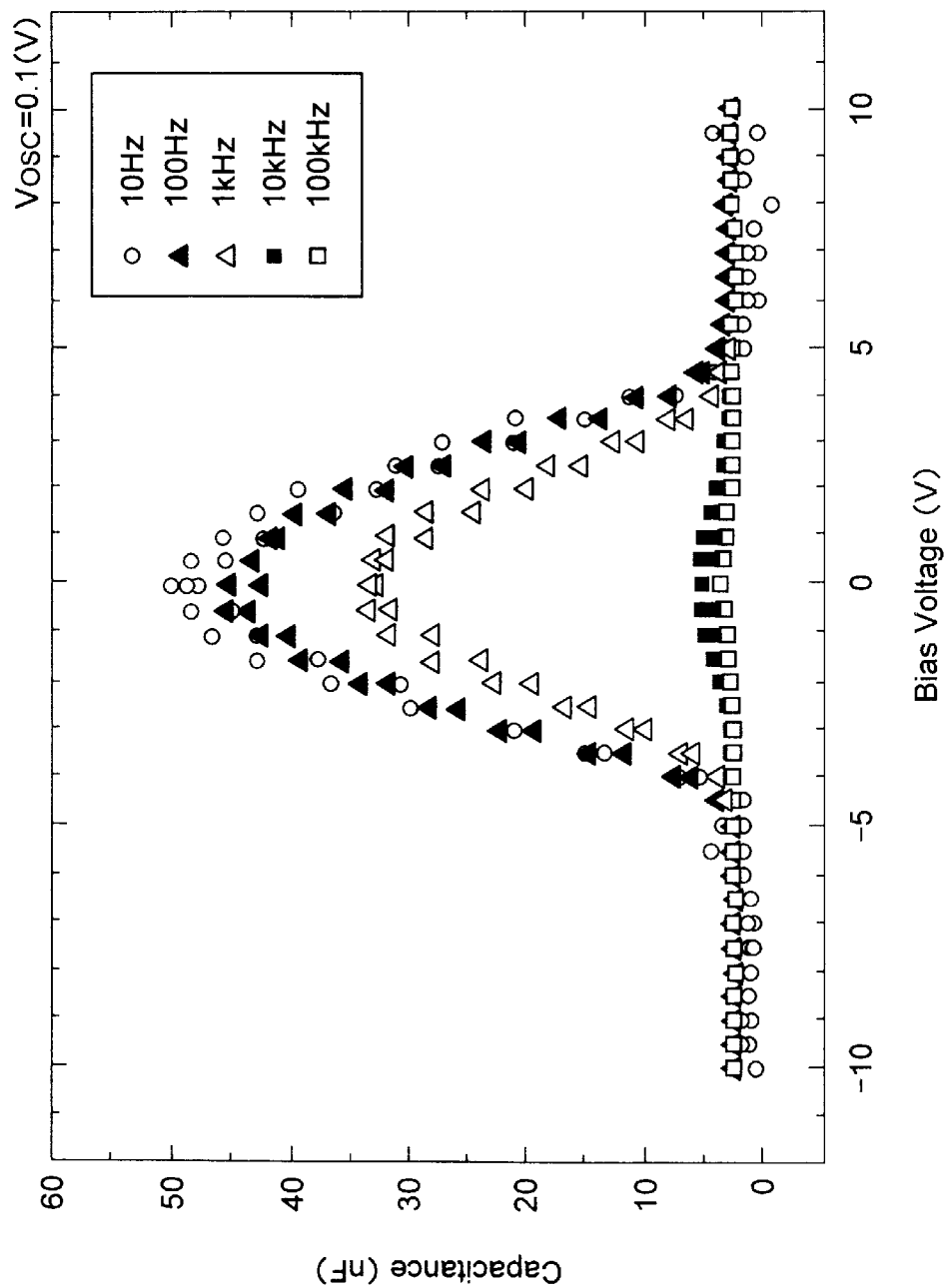
FIG. 39 is a diagram showing relationship between electric capacitance of liquid crystal having a spontaneous polarization, and applied voltage and frequency.

The liquid crystal display device of an eleventh embodiment has a rough constitution shown in FIG. 19. FIG. 20 shows a plan view of a pixel portion of the first substrate.

On a first substrate 1 consisting of a glass or the like, a wiring consisting of a gate line 2, a storage capacitance line 3, a reset line 38 and a signal line 4 is formed. The gate line 2, the storage capacitance line 3 and a reset line 38 are formed in the same layer and consisting of a metal such as Al, Al—Y alloy, Al—Nd alloy, Mo—W alloy or the like. The signal line 4 is formed to be orthogonal to the gate line 2, and consisting of a metal such as Al, Al—Y alloy, Al—Nd alloy or the like.

In the neighborhood of an intersection of the gate line 2 and the signal line 4, a switching element 5 consisting of a TFT is formed for addressing the signal. The gate electrode thereof is formed as the same layer with the gate line 2 and connected to the gate line 2. The channel layer of the switching element 5 for addressing the signal is consisting of an amorphous Si film and, through the contact layer, connected to the signal line 4 and the pixel electrode 11 consisting of a transparent conductive film such as ITO or the like. The storage capacitance line 3 is connected with the storage capacitance electrode 30 consisting of metal or low resistance silicon and forms a storage capacitance between with the pixel electrode 11. In addition, separately from the switching element 5 for addressing signal, another switching element 39 for resetting purpose is formed, and the gate electrode thereof is connected to the reset line 38. The channel layer of the switching element 39 for resetting is consisting of an amorphous Si film and connected through the contact layer to the storage capacitance line 3 and the pixel electrode 11. Further, on the pixel electrode 11, an alignment film 53a consisting of polyimide or the like is disposed.

The opposite substrate is constituted as identical as the embodiment 7, therefore the description will be omitted.

Further, the gate line 2, the reset line 38 and the signal line 4 are connected to the peripheral drive circuits such as a gate line driver 21, a reset line driver 40 and a signal line driver 22, respectively. For these peripheral drive circuits, an integrated circuit formed on a single crystal Si may be used.

The number of the wiring disposed in matrix, for the signal line 4 of longitudinal direction was 640×3 (RGB) lines, and for the gate line 2 of transversal direction was 480 lines. The disposition period of the adjacent gate lines 2 was 300 µm, and the disposition period of the signal lines 4 was 100 µm. In this constitution, the area A of the pixel electrode 11 was approximately $2 \times 10^{-10}$ m².

To the gate line 2, the reset line 38 and the signal line 4 of the liquid crystal display device of such a structure, the voltage waveforms such as shown in FIG. 16 were applied. The frame period $T_{frame}$ with which the signal is applied to the gate is $1.67 \times 10^{-2}$ s (1/60 s). The gate selection time $T_{gon}$ is $3.4 \times 10^{-5}$ s (34 µs), and the reset selection time $T_r$ was set at 5 times the $T_{gon}$, that is, $1.7 \times 10^{-4}$ s (170 µs) and designed to be input immediately before the gate selection time.

The voltage addressed to the pixel electrode is the voltage of the storage capacitance line that is identical to the counter electrode potential $V_{com}$ during the period of $T_r$ and the voltage for addressing corresponding to the display level during the period of $T_{gon}$, and during the period of $T_r$, the resetting to the black-level is carried out. The gate pulse voltage $T_{gon}$ was set at +30 V, $V_{goff}$ is –10 V, $V_{sig-c}$ is 5 V, and $V_{com}$ was 5 V, the amplitude of the voltage applied to the signal line was 5 V, and storage capacitance was 0.5 pF. In this case, the maximum voltage E applied between the pixel electrode and the counter electrode becomes 5 V. The mobility of the channel layer consisting of the amorphous silicon was 0.6 cm²/(V·s).

In the liquid crystal display device of the aforementioned constitution, when the electrostatic capacitance $C_{LC}$ of one pixel in the saturation alignment of the liquid crystal material was 0.5 pF, the saturation voltage $V_{sat}$ of the liquid crystal display device was 2.5 V, and 5 V was applied between the pixel electrode and the counter electrode, the response time τ of the liquid crystal was approximately 0.3 ms.

By substituting the above values in the equation (9), to obtain the maximum brightness, it is found that the spontaneous polarization $P_s$ is required to be 10.8 nC/cm² or less. Further, by substituting the above values in the equation (10), for the display to be uniform, the $P_s$ is found necessary to be 5.4 nC/cm² or less.

Based on this result, with liquid crystal materials of different spontaneous polarization, the liquid crystal display devices were driven. When driven with the liquid crystal material of $P_s$ of 5 nC/cm², the maximum brightness was obtained and the display of excellent in-plane uniformity was obtained. On the other hand, when driven with the liquid crystal material of the $P_s$ of 10 nC/cm², at the portion close to the peripheral circuits and free of the wiring delay, the maximum brightness was obtained. However, the image sticking and flickering occur, resulting in the display of poor in-plane uniformity. Further, when driven with a liquid crystal material of $P_s$ of 15 nC/cm², over the whole plane, only the brightness of lower than the maximum brightness was obtained. Further, the image sticking and the flickering occur, resulting in poor in-plane uniformity.

Embodiment 12

The constitution of the liquid crystal display device relating to embodiment 12 is identical as that of the embodiment 10, accordingly the description of the constitution will be omitted.

With the liquid crystal display device having such a constitution, the frame inversion drive is carried out.

The number of the wiring disposed in matrix was, for a signal line of longitudinal direction, 640×3 (RGB) lines, and for a gate line of transversal direction, 480 lines. The disposition period of the adjacent gate lines was 300 µm, and the disposition period of the signal lines was 100 µm. In this constitution, the area A of a pixel electrode was approximately $2 \times 10^{-10}$ m².

To the gate line and the signal line of the liquid crystal display device of such a structure, the voltage waveforms such as shown in FIG. 17 were applied. The frame period $T_{frame}$ with which the signal is applied to the gate is $1.67 \times 10^{-2}$ s (1/60 s). The gate selection time $T_{gon}$ is $3.2 \times 10^{-5}$ s (32 µs). To the signal line, the voltage of which polarity is reversed for every $T_{frame}$ is applied, and during the gate selection time $T_{gon}$, the voltage corresponding to the display level is addressed to the pixel. The gate pulse voltage $V_{gon}$ was set at +30 V, $V_{goff}$ was –10 V, $V_{sig-c}$ was 5 V, and $V_{com}$ was 5 V, the amplitude of the voltage applied to the signal line was 5 V, and storage capacitance was 0.5 pF. In this case, the maximum voltage E applied between the pixel electrode and the counter electrode becomes 5 V. The mobility of the channel layer consisting of the amorphous silicon was 0.6 cm²/(V·s).

In the liquid crystal display device of the aforementioned constitution, when the electrostatic capacitance $C_{LC}$ of one pixel in the saturation alignment of the liquid crystal material was 0.5 pF, the saturation voltage $V_{sat}$ of the liquid crystal display device was 2.5 V, and 5 V was applied between the pixel electrode and the counter electrode, the response time τ of the liquid crystal was approximately 0.3 ms.

By substituting the above values in the equation (9), to obtain the maximum brightness, it is found that the spontaneous polarization $P_s$ is required to be 10.8 nC/cm² or less. Further, by substituting the above values in the equation (10), for the display to be uniform, the $P_s$ is found necessary to be 5.4 nC/cm² or less.

Based on this result, with liquid crystal materials of different spontaneous polarization, the liquid crystal display devices were driven. When driven with the liquid crystal material of $P_s$ of 3 nC/cm², the maximum brightness was obtained and the display of excellent in-plane uniformity was obtained. On the other hand, when driven with the liquid crystal material of the $P_s$ of 20 nC/cm², over the whole plane, only the brightness lower than the maximum brightness was obtained, in addition, the image sticking and flickering occur, resulting in the display of poor in-plane uniformity.

Embodiment 13

As will be shown in the following, a liquid crystal display device of a cross section shown in FIG. 1B is prepared. That is, on the interior surfaces of a first substrate 1 thereon switching elements 5 consisting of a TFT and a pixel electrode 11 consisting of a transparent conductive film such as ITO are formed in matrix, and a second substrate 14 thereon a CF layer 15 and a counter electrode 16 consisting of a transparent conductive film such as ITO are formed, thin films of a soluble polyimide are printed with the off-set printing method, respectively, and baked with a hot-plate at 90° C. for 3 min, and further for another 30 min at 180° C. in a N₂ oven to obtain alignment films 13a and 13b consisting of 35 nm thick polyimide film, respectively.

Then, while heating the first substrate 1 and the second substrate 14 at 100° C., the rubbing is given to the alignment films 13a and 13b. Due to this rubbing, even on the-step portion due to the TFT, elongation and alignment of the polyimide alignment film become sufficient to result in a smectic phase of homogeneous alignment.

Then, on the first substrate 1, spacer particles (spherical pearl) 19 are scattered. Further, on the periphery of the second substrate 14, a sealant 20 consisting of an ultra-violet light curing resin is printed. Then thus obtained first substrate 1 and second substrate 14 are disposed oppositely, irradiated by ultra-violet light while pressurizing to cure the sealant 20, thereafter, heated at 160° C. for 1 hour, to form a cell. Then, this cell is introduced into a vacuum chamber and an anti-ferroelectric liquid crystal 17, MLC-0049

(product of Mitsui Chemical Co.), is injected from an inlet, thereafter the inlet is sealed with epoxy resin. Thereafter, on the exterior surfaces of the first substrate 1 and the second substrate 14, polarizers 18a and 18b are disposed, respectively. Thus, a liquid crystal display device of a diagonal length of 10 inch is prepared.

The liquid crystal display devices thus prepared are driven by the frame inversion method in which the polarity of the applied voltage is reversed for every frame under the conditions of the frame frequency of 60 Hz, frame period $T_{frame}$ of $1.67 \times 10^{-2}$ s (16.7 ms), and addressing time of 34 μs to evaluate display quality.

Comparative Example 1

A liquid crystal display device is prepared as identical as the embodiment 13 except that, by setting the thickness of the alignment film at 100 nm, the combined capacitance $C_{cell}$ consisting of the capacitance due to the spontaneous polarization of the liquid crystal and the capacitance of the alignment layer are changed. The liquid crystal display devices thus obtained are evaluated of the display quality by driving as identical as the embodiment 13.

Embodiment 14

In order to change the combined capacitance $C_{cell}$ consisting of the capacitance due to the spontaneous polarization of the liquid crystal and the capacitance of the alignment layers, the thickness of the alignment film was set at 32 nm. A liquid crystal display device is prepared as identical as the embodiment 13 except for the change of the thickness of the alignment film as described above. Then, the liquid crystal display device, with the frame frequency of 60 Hz, the frame period $T_{frame}$ of $1.67 \times 10^{-2}$ s (16.7 ms) and the addressing time of 34 μs, is driven by applying the frame inversion method in which the polarity of the applied voltage is reversed for every frame to evaluate the display quality.

Comparative Example 2

A liquid crystal display device is prepared with the identical constitution as the embodiment 14 except for the magnitude of the storage capacitance $C_s$ being varied. This liquid crystal display device is evaluated of the display quality as identical as the liquid crystal display device of embodiment 14.

Embodiment 15

As will be shown in the following, a liquid crystal display device of a cross section shown in FIG. 1B is prepared. That is, on the interior surfaces of a first substrate 1 thereon switching elements 5 consisting of a TFT and a pixel electrode 11 consisting of a transparent conductive film such as ITO are formed in matrix, and a second substrate 14 thereon a CF layer 15 and a counter electrode 16 consisting of a transparent conductive film such as an ITO are formed, thin films of soluble polyimide are printed with the off-set printing method, respectively, and baked with a hot-plate at 80° C. for 3 min, and further for another 30 min at 220° C. in a $N_2$ oven to obtain alignment films 13a and 13b consisting of 25 nm thick polyimide film, respectively.

Then, while heating the first substrate 1 and the second substrate 14 at 80° C., the rubbing is given to the alignment films 13a and 13b. Due to this rubbing, even on the step portion due to the TFT, elongation and alignment of the polyimide alignment film become sufficient to result in a smectic phase of a homogeneous alignment.

Then, on the first substrate 1, spacer particles (spherical pearl) 19 are scattered. Further, on the periphery of the second substrate 14, a sealant 20 consisting of an ultra-violet light curable resin is printed. Then thus obtained first substrate 1 and second substrate 14 are disposed oppositely each other, irradiated by ultra-violet light while pressurizing to cure the sealant 20, thereafter, heated at 160° C. for 1 hour, to form a cell. Then, this cell is introduced into a vacuum chamber and an anti-ferroelectric liquid crystal 17, MLC-0068 (product of Mitsui Chemical Co.), is injected from an inlet, thereafter the inlet is sealed with an epoxy resin. Thereafter, on the exterior surfaces of the first substrate 1 and the second substrate 14, polarizers 18a and 18b are stuck, respectively. Thus, a liquid crystal display device of a diagonal length of 12 inch is prepared.

The liquid crystal display devices thus prepared are driven by the frame inversion driving method in which the polarity of the applied voltage is reversed for every frame under the conditions of the frame frequency of 60 Hz, frame period $T_{frame}$ of $1.67 \times 10^{-2}$ s (16.7 ms), and addressing time of 34 μs to evaluate display quality.

Comparative Example 3

A liquid crystal display device is prepared with the identical constitution as the embodiment 15 except that the parasitic capacitance $C_{gs}$ between the gate electrode and the pixel electrode is changed. This liquid crystal display device is evaluated of the display quality by driving as identical as the embodiment 15.

The evaluation results of the liquid crystal display devices prepared in embodiments 13 through 15 and in comparative examples 1 through 3 are shown in Table 6. All the evaluation was carried out for various contrast levels under the back light illumination of a brightness of 2000 cd/m². Fifty testees made subjective judgement on the flickering (selection from "clearly discernible", "a little discernible" and "hardly discernible") and the results are summarized in the Table.

TABLE 6

| | Value of the left side of equation (11) $5 \times C_{gs} \times \Delta V_g$ (pC) | Value of the right side of equation (11) $(C_s + C_{cell}) \times V_{sat}$ (pC) | Relation between the left and right sides of equation (11) | Flickering |
|---|---|---|---|---|
| Embodiment 13 | 4.0 | 4.4 to 20 | < | hardly discernible |
| Comparative example 1 | 4.0 | 3.4 to 8.0 | > or < | a little discernible |
| Embodiment 14 | 4.0 | 6.0 to 20 | < | hardly discernible |
| Comparative example 2 | 4.0 | 3.0 to 17 | > or < | a little discernible |
| Embodiment 15 | 4.0 | 4.8 to 36 | < | hardly discernible |
| Comparative example 3 | 8.0 | 4.8 to 36 | > or < | clearly discernible |

In this Table 6, the second and third columns show the values of the left and the right sides of the equation (11), respectively. Here, the reason why the values of the third column are shown with a certain ranges is due to variation of the value of $C_{cell}$ for every display gray scale. For the liquid crystal display devices of embodiments 13 to 15, the equation (11) holds, accordingly they relate to the implementation of the present invention. On the other hand, the equation (11) does not necessarily hold for comparative examples 1 to 3, accordingly they do not relate to the implementation of the present invention. From the results of the flickering test shown in the table 6, the liquid crystal display devices of the embodiments 13 to 15 are evident to be superior to that of the comparative examples 1 to 3 in display quality and display reliability.

Therefore, according to the present invention, a liquid crystal display device in which liquid crystal having an inherent spontaneous polarization or a spontaneous polarization induced by application of an electric field is interposed between the pixel electrode disposed in matrix and the counter electrode is driven. Thereby, an excellent display of high contrast and fast response speed can be obtained, and power consumption can be reduced.

In addition, the display of high brightness during white display and of excellent uniformity can be obtained. Still further, the display of excellent quality is realized.

What is claimed is:

1. A liquid crystal display device comprising:

a first substrate having one major surface;

pixel electrodes arranged in matrix fashion on the major surface of the first substrate;

storage capacitors connected to the pixel electrodes;

switching elements connected to the pixel electrodes;

a liquid crystal layer provided close to the pixel electrodes arranged in matrix fashion, the liquid crystal having an inherent spontaneous polarization or a spontaneous polarization induced by application of an electric field;

a common electrode formed on the liquid crystal layer; and a second substrate formed on the common electrode;

wherein an electrostatic capacitance of one pixel in a saturation alignment state of the liquid crystal is $C_{LC}$ (F), a spontaneous polarization of the liquid crystal per unit area is $P_s$ (C/m$^2$), a voltage applied between the pixel electrode and the common electrode is E (V), a pixel electrode area of one pixel is A (m$^2$), and a storage capacitance for one pixel is $C_s$ (F), they satisfy the following equation;

$$P_s \times A \leq 5 \times (C_s + C_{LC}) \times E \qquad (1).$$

2. The liquid crystal display device as set forth in claim 1, wherein, when $P_1 = 5 \times 10^{-6}$ (C/m$^2$), the following equation holds, $$P_s \geq P_1 \qquad (2).$$

3. The liquid crystal display device as set forth in claim 1, wherein the following equation is satisfied, $$(C_s + C_{LC}) \times E/5 \leq P_s \times A \qquad (3).$$

4. The liquid crystal display device as set forth in claim 1, wherein the following equations are further satisfied, $$E \geq V_{sat} \qquad (4)$$

and $$F \leq 1 \qquad (4')$$

where $V_{sat}$ (V) denotes a saturation voltage of a liquid crystal display device and the following equation is satisfied; $F = P_s \times A \times \exp(-(T_{gon} \times \log_e 10/\tau))/((C_s + C_{LC}) \times (E - V_{sat}))$ where $T_{gon}$ (s) is a time period during which the switching element is selected for addressing a display signal to the pixel electrode; and $\tau$ (s) is a response time of a liquid crystal cell when a voltage E (V) is applied between the pixel electrode and the common electrode.

5. The liquid crystal display device as set forth in claim 4, wherein, when $P_1 = 5 \times 10^{-6}$ (C/m$^2$), the following equation is further satisfied, $$P_s \geq P_1 \qquad (5).$$

6. The liquid crystal display device as set forth in claim 1, wherein the liquid crystal display device has a thin film transistor (TFT) as the switching element.

7. The liquid crystal display device as set forth in claim 6, wherein the thin film transistor has a polycrystalline silicon layer.

8. The liquid crystal display device as set forth in claim 6, wherein the thin film transistor has an amorphous silicon layer.

9. The liquid crystal display device as set forth in claim 6, wherein the following equation is satisfied;

$$(P_s \times A + (C_s + C_{LC}) \times E)/(2 \times T_{gon}) \leq I_{on} \qquad (6)$$

where $T_{gon}$ (s) is in one frame time a time period during which the gate electrode of the thin film transistor is selected; and $I_{on}$ (A) is the maximum value of a current that flows between a source and drain electrodes of the thin film transistor while the gate electrode is selected.

10. The liquid crystal display device as set forth in claim 9, wherein the following equations hold;

$$I_{on} \leq I_{max} \qquad (7)$$

and $$I_{max} 3 \times 10^{-4} (A) \qquad (7')$$

where $I_{max}$ is the maximum value of an electric current that the thin film transistor can flow.

11. The liquid crystal display device as set forth in claim 6, further comprising:

a frame memory for memorizing a potential being applied to a signal line to apply a potential to the liquid crystal;

wherein one frame time is consisting of a plurality of sub-frame times, and within the respective sub-frame times, a gate line is selected on-state once.

12. A liquid crystal display device comprising:

a first substrate having one major surface;

pixel electrodes arranged in matrix fashion on the major surface of the first substrate;

storage capacitors connected to the pixel electrodes;

switching elements connected to the pixel electrodes;

a liquid crystal layer provided close to the pixel electrodes arranged in matrix fashion, the liquid crystal having an inherent spontaneous polarization or a spontaneous polarization induced by application of an electric field;

a common electrode formed on the liquid crystal layer; and a second substrate formed on the common electrode; and wherein the following equations are satisfied;

$$E \geq V_{sat} \text{ and } F \leq 1,$$

where $V_{sat}$ (V) is a saturation voltage of a liquid crystal display element; $C_{LC}$ (F) is an electrostatic capacitance of one pixel in a saturation alignment of the liquid crystal; $P_s$ (C/m$^2$) is a spontaneous polarization of the liquid crystal per unit area is; E (V) is a voltage applied between the pixel electrode and the common electrode; A (m$^2$) is an pixel electrode area for one pixel; $C_s$ (F) is a storage capacitance for one pixel; $T_{gon}$ (s) is a time period during which the switching element is selected for addressing display signal to the pixel electrode; and τ (s) is a response time of a liquid crystal cell when a voltage E (V) is applied between the pixel electrode and the common electrode and the following relation is satisfied;

$$F = P_s \times A \times \exp(-(T_{gon} \times \log_e 10/\tau))/((C_s + C_{LC}) \times (E - V_{sat})).$$

13. The liquid crystal display device as set forth in claim 12, wherein, when $P_1 = 5 \times 10^{-6}$ (C/m$^2$), further the following equation holds;

$$P_s \geq P_1.$$

14. The liquid crystal display device as set forth in claim 12, wherein the liquid crystal display device has a thin film transistor as the switching element.

15. The liquid crystal display device as set forth in claim 14, wherein the thin film transistor has a polycrystalline silicon layer.

16. The liquid crystal display device as set forth in claim 15, wherein the following equation is satisfied, $$F \leq \tfrac{1}{2} \qquad (8).$$

17. The liquid crystal display device as set forth in claim 14, wherein the thin film transistor has an amorphous silicon layer.

18. The liquid crystal display device as set forth in claim 17, wherein the following equation is satisfied, $$F \leq \tfrac{2}{3} \qquad (9).$$

19. The liquid crystal display device as set forth in claim 17, wherein the following equation is satisfied, $$F \leq \tfrac{1}{3} \qquad (10).$$

20. A liquid crystal display device comprising:

a first substrate having one major surface;

pixel electrodes arranged in matrix fashion on the major surface of the first substrate;

storage capacitors connected to the pixel electrodes;

switching elements connected to the pixel electrodes;

a liquid crystal layer provided close to the pixel electrodes arranged in matrix fashion, the liquid crystal having an inherent spontaneous polarization or a spontaneous polarization induced by application of an electric field;

a common electrode formed on the liquid crystal layer; and a second substrate formed on the common electrode;

wherein the following equation is satisfied;

$$5 \times C_{gs} \times \Delta V_g \leq (C_s + C_{cell}) \times V_{sat} \qquad (11)$$

where $C_{cell}$(F) is a combined capacitance for one pixel consisting of a ferroelectric capacitance due to the spontaneous polarization of the liquid crystal and a capacitance of an alignment film; $C_{gs}$(F) is a parasitic capacitance for one pixel between the gate electrode of the thin film transistor and the pixel electrode; $C_s$(F) is the storage capacitance for one pixel; $\Delta V_g$ (V) is a potential difference of the gate electrode upon on/off; and $V_{sat}$ (V) is a saturation voltage of a liquid crystal display element.

* * * * *

CERTIFICATE OF CORRECTION

PATENT NO. : 6,046,790

DATED : April 4, 2000

INVENTOR(S): Yujiro HARA et al.

It is certified that an error appears in the above-identified patent and that said Letters Patent is hereby corrected as shown below:

Column 8, line 11, change "PS" to --$P_s$--.

Column 29, line 28, change "$A=1.8 \times 10^{31}$" to --$A=1.8 \times 10$--.

Signed and Sealed this

Nineteenth Day of December, 2000

Attest:

Q. TODD DICKINSON

*Attesting Officer*   *Commissioner of Patents and Trademarks*